(12) United States Patent
Ishizaki et al.

(10) Patent No.: US 7,050,691 B2
(45) Date of Patent: May 23, 2006

(54) OPTICAL WAVEGUIDE AND METHOD OF MANUFACTURING THE SAME

(75) Inventors: Mamoru Ishizaki, Tokyo (JP); Hatsune Hara, Tokyo (JP); Jun Sasaki, Tokyo (JP); Shinichi Inoue, Tokyo (JP); Takehito Tsukamoto, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 10/874,292

(22) Filed: Jun. 24, 2004

(65) Prior Publication Data

US 2004/0234224 A1 Nov. 25, 2004

Related U.S. Application Data

(63) Continuation of application No. PCT/JP03/11770, filed on Sep. 16, 2003.

(30) Foreign Application Priority Data

Sep. 20, 2002 (JP) .............................. 2002-274670

(51) Int. Cl.
*G02B 6/10* (2006.01)
*G02B 6/18* (2006.01)
*C03B 37/022* (2006.01)
*B29D 11/00* (2006.01)

(52) U.S. Cl. ...................... 385/132; 385/129; 385/130; 65/386; 65/403; 264/1.24; 264/2.1; 264/2.2; 264/2.3; 264/2.4

(58) Field of Classification Search ...... 264/1.24–1.25, 264/1.27, 2.1–2.5; 65/385–386, 395, 397, 65/404, 426, 430, 440; 438/31–32; 385/129–132, 385/147
See application file for complete search history.

(56) References Cited

U.S. PATENT DOCUMENTS

| | | | | |
|---|---|---|---|---|
| 5,259,926 A | * | 11/1993 | Kuwabara et al. ............. | 216/54 |
| 5,265,184 A | * | 11/1993 | Lebby et al. ................ | 385/132 |
| 5,313,545 A | * | 5/1994 | Kuo et al. ................... | 385/129 |
| 5,462,700 A | * | 10/1995 | Beeson et al. .............. | 264/1.27 |
| 5,481,633 A | * | 1/1996 | Mayer ......................... | 385/49 |
| 5,512,131 A | * | 4/1996 | Kumar et al. ............... | 438/738 |
| 5,772,905 A | * | 6/1998 | Chou ........................... | 216/44 |

(Continued)

FOREIGN PATENT DOCUMENTS

EP 1099964 A2 * 5/2001

(Continued)

OTHER PUBLICATIONS

"Fabrication of large-core 1/spl times/16 optical power splitters in polymers using hot-embossing process", Choon-Gi Choi; Sang-Pil Han; Byeong Cheol Kim; Seung-Ho Ahn; Myung-Yung Jeong; Photonics Technology Letters, IEEE vol. 15, Issue 6, Jun. 2003.*

(Continued)

*Primary Examiner*—Frank G. Font
*Assistant Examiner*—Ryan Lepisto

(57) ABSTRACT

A method of manufacturing an optical waveguide having a core and a clad. The method includes forming a first clad by applying a resin on a substrate and curing the resin, applying a core material between a recessed mold which has a recess having a shape identical to a shape of the core and the first clad which is provided on the substrate, curing the core material applied, thereby forming a core pattern having a shape corresponding to that of the recess, and peeling the recessed mold from the core pattern and the first clad.

17 Claims, 36 Drawing Sheets

U.S. PATENT DOCUMENTS

| | | | |
|---|---|---|---|
| 5,858,051 A * | 1/1999 | Komiyama et al. | 65/386 |
| 6,355,198 B1 * | 3/2002 | Kim et al. | 264/259 |
| 6,361,718 B1 * | 3/2002 | Shinmo et al. | 264/1.21 |
| 6,375,870 B1 * | 4/2002 | Visovsky et al. | 264/1.31 |
| 6,500,603 B1 * | 12/2002 | Shioda | 430/321 |
| 6,517,995 B1 * | 2/2003 | Jacobson et al. | 430/320 |
| 6,653,030 B1 * | 11/2003 | Mei et al. | 430/5 |
| 6,660,192 B1 * | 12/2003 | Kim et al. | 264/1.27 |
| 6,813,077 B1 * | 11/2004 | Borrelli et al. | 359/486 |
| 6,847,773 B1 * | 1/2005 | Korenaga et al. | 385/132 |
| 6,887,792 B1 * | 5/2005 | Perlov et al. | 438/703 |
| 2002/0064896 A1 * | 5/2002 | Zhao et al. | 438/31 |
| 2002/0115002 A1 * | 8/2002 | Bailey et al. | 430/5 |
| 2003/0217804 A1 * | 11/2003 | Guo et al. | 156/230 |
| 2004/0021237 A1 * | 2/2004 | Shimizu et al. | 264/1.28 |
| 2004/0081416 A1 * | 4/2004 | Akutsu et al. | 385/129 |
| 2004/0245660 A1 * | 12/2004 | Ohtsu et al. | 264/1.27 |
| 2005/0008286 A1 * | 1/2005 | Ahn et al. | 385/24 |

FOREIGN PATENT DOCUMENTS

| | | |
|---|---|---|
| JP | 56-122001 | 9/1981 |
| JP | 2-131202 | 5/1990 |
| JP | 10-90544 | 4/1998 |
| JP | 10-268152 | 10/1998 |
| JP | 2001-154049 | 6/2001 |
| JP | 2001-185752 | 7/2001 |
| JP | 2001-318257 | 11/2001 |
| JP | 2002-71993 | 3/2002 |
| JP | 2002-311273 | 10/2002 |

OTHER PUBLICATIONS

"Fabrication of ridge waveguides by UV embossing and stamping of sol-gel hybrid materials", Woo-Soo Kim; Jong-Hwan Lee; Sang-Yung Shin; Byeong-Soo Bae; Young-Cheol Kim; Photonics Technology Letters, IEEE vol. 16, Issue 8, Aug. 2004.*

Patent Abstract and Translation of JP 10-090544.*

W.J. Oh et al., "Fabrication of Multimode Polymer Optical Waveguides by Using UV Curable Resins and Transfer Molding Process," Seventh Optoelectronics and Communications Conference (OECC 2002) Technical Digest, pp. 534-535, Jul. 2002.

Tohru Maruno, Technical Survey, "Polymer Optical Waveguide Devices", Journal of the Society of Electronic Data Communication, vol. 84, No. 9, pp. 656-662.

* cited by examiner

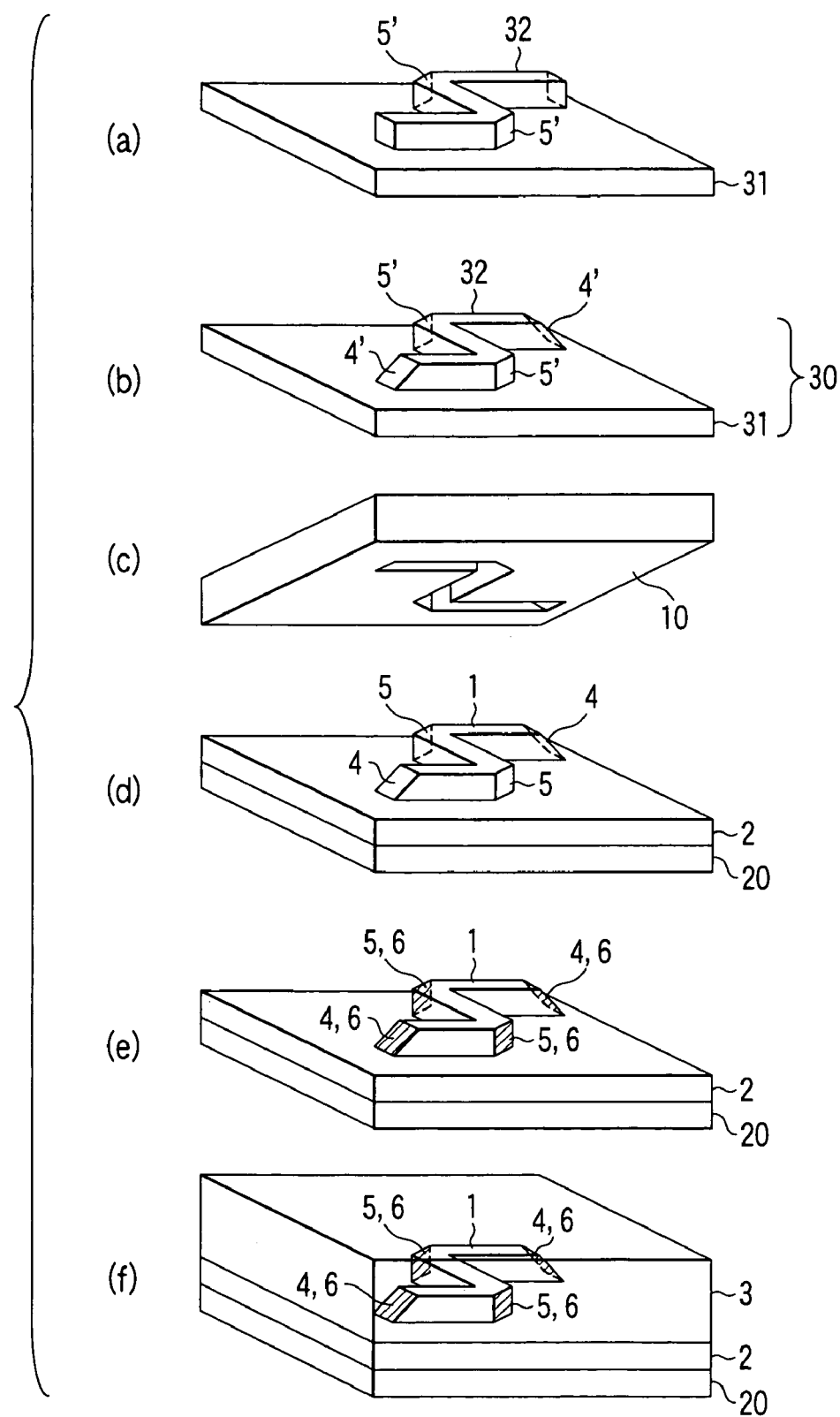
F I G. 29

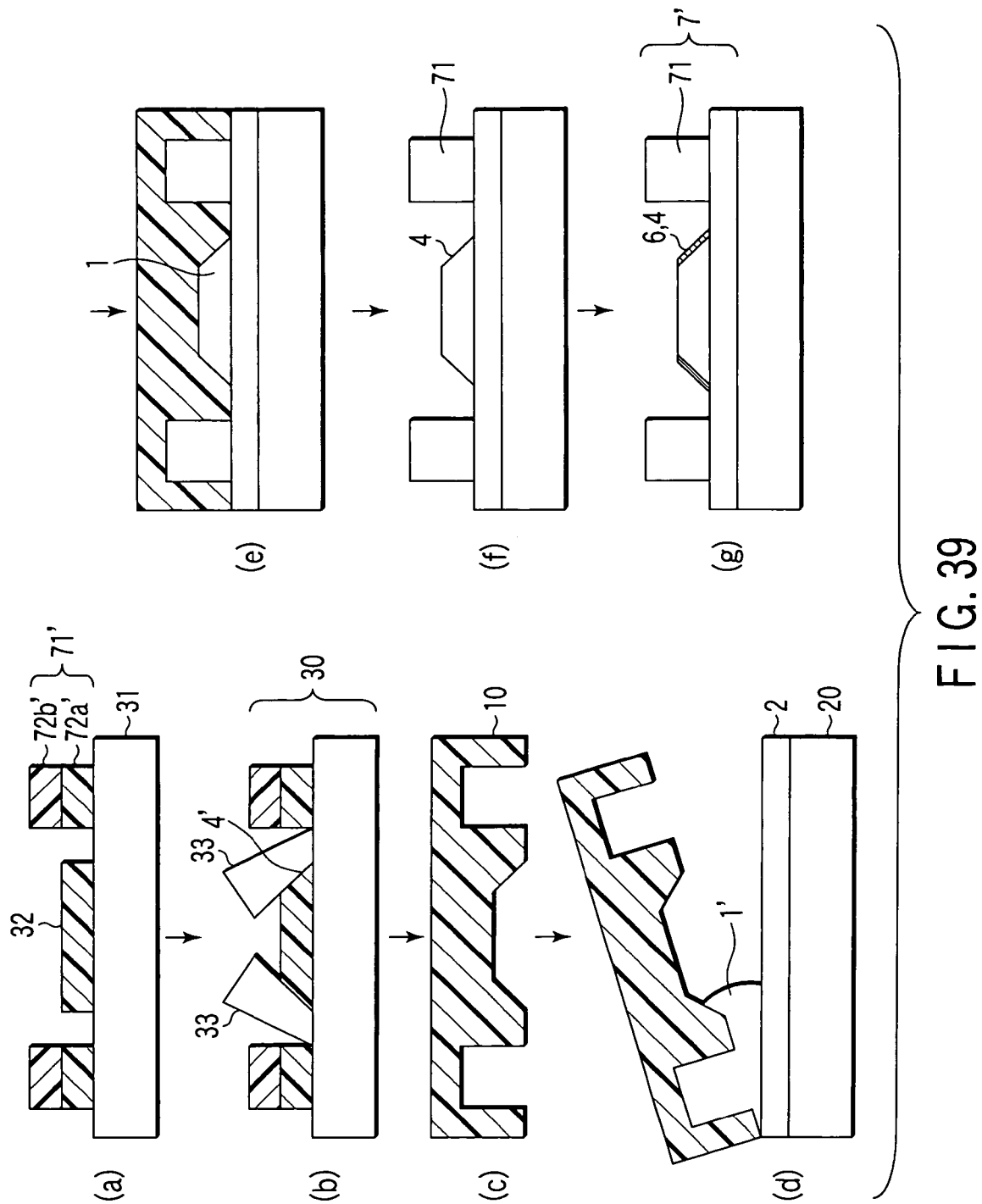
F I G. 39

OPTICAL WAVEGUIDE AND METHOD OF MANUFACTURING THE SAME

CROSS-REFERENCE TO RELATED APPLICATIONS

This is a Continuation Application of PCT Application No. PCT/JP03/11770, filed Sep. 16, 2003, which was not published under PCT Article 21(2) in English.

This application is based upon and claims the benefit of priority from prior Japanese Patent Application No. 2002-274670, filed Sep. 20, 2002, the entire contents of which are incorporated herein by reference.

BACKGROUND OF THE INVENTION

1. Field of the Invention

The present invention relates to an optical waveguide for use in optical interconnections and the like, and a method of manufacturing the optical waveguide.

2. Description of the Related Art

Recent years have seen a remarkable progress of the optical communications technology. It has been proved that the optical communication is advantageous over the electric communication. As the signal-processing speed in LSI and the like has increased, techniques for replacing electric signals with optical signals are being developed. It is expected that media for transmitting optical signals will be polymer optical waveguides that have been developed in recently years.

The polymer optical waveguide can be formed to have a large area. Attempts have been made to apply the polymer optical waveguide to optical interconnections of the order of 1 cm to 1 m. The polymer optical waveguide may have, at one end, an optical-path changing mirror. This makes it possible to mount optical components on a surface just above the optical-path changing mirror.

(Method of Manufacturing the Waveguide)

The polymer optical waveguide is manufactured, generally by a method that uses dry etching as shown in FIG. 44 or by a method that utilizes pattern exposure and development as shown in FIG. 45.

More specifically, in the method using dry etching, a first clad 2 is formed on a substrate 50 and a core 1 is formed on the first clad 2, as is illustrated at (a) in FIG. 44. As depicted at (b) in FIG. 44, a silicon-containing resist 51 is formed on a part of the core 1. As shown at (c) in FIG. 44, reactive ions 52 are applied to the silicon-containing resist 51 and the core 1, thereby etching that part of the core 1 which is not covered with the silicon-containing resist 51. As shown at (d) in FIG. 44, the silicon-containing resist 51 is removed, forming a core 1 projecting upwards. As depicted at (e) in FIG. 44, a second clad 3 is formed on the projecting core 1 and the first clad 2.

In the method utilizing pattern exposure and development, a first clad 2 is formed on a substrate 50 as shown at (a) in FIG. 45, and a core material 1' is formed on the first clad 2 as illustrated at (b) in FIG. 45. As shown at (c) in FIG. 45, ultraviolet rays are applied to the core material 1' through a photo mask 35, thus curing a part of the core material 1'. As depicted at (d) in FIG. 45, that part of the core material 1' which has not been cured is removed by means of development, forming a core 1 that projects upwards. As shown at (e) in FIG. 45, a second clad 3 is formed on the projecting core 1 and the first clad 2.

The optical-path changing mirror is formed, as in most cases, by a mechanical process that uses a dicing saw as illustrated in FIG. 46. In the mechanical process using a dicing saw, a substrate 50 is prepared as shown at (a) in FIG. 46. The substrate 50 has clads 2 and 3 in which a core 1 is embedded as is illustrated at (e) in FIG. 44 or (e) in FIG. 45. As shown at (b) in FIG. 46, both ends of the core 1 are cut slantwise with a dicing blade 54. At the same time, the clads 2 and 3 are cut slantwise with the dicing blade 54. As a result, both ends of the core 1 make total-reflecting mirrors 55 as depicted at (c) in FIG. 46. At this time, an optical path is formed, through which signal light 8 applied to one end of the core 1 passes until it emerges from the other end of the core 1.

The waveguide shown in FIG. 44 or FIG. 45 and the optical-path changing mirror shown in FIG. 46 are manufactured in separate processes. Inevitably, the manufacture of the system is complex and requires a high cost.

To manufacture the waveguide and the mirror at the same time, a method using a mold has been devised (see, for example, Jpn. Pat. Appln. KOKAI Publication No. 2001-154049, pages 8 and 9, FIGS. 2 and 3). In the method using a mold, the entire surface of a substrate that has a recess is coated with a core. The core is then removed from the substrate, but not from the recess. A first clad is formed on the entire surface of the substrate, covering the core remaining in the recess. The core and the first clad are transferred onto a separate substrate. Thereafter, a second clad is formed on the first clad.

In this method, the core applied to the entire surface of the substrate is removed, but not from the recess. The use efficiency of core material is therefore low. The cost of the method is high.

A method in which the core material is used at high efficiency is available (see, for example, Jpn. Pat. Appln. KOKAI Publication No. 10-90544, page 7, FIGS. 1 to 5). This method uses a recessed mold that is transparent to light and has a light-shielding film on its surface, but not over the recess. Hence, light is applied through the recessed mold, curing only the core pattern. However, the recessed mold, which is made of resin, will likely be deformed by temperature deviation. The core pattern is inevitably deformed.

A similar technique is disclosed in W. J. Oh, M. S. Kim, H. H. Byum, J. W. Kim, K. S. Han, J. H. Oh, M. S. Kwon and S. Y. Shin, "Fabrication of Multimode Polymer Optical Waveguides by Using UV Curable Resins and Transfer Molding Process," Seventh Optoelectronics and Communications Conference (OECC 2002), Technical Digest, pp. 534–535, July 2002. This technique uses light applied through a recessed mold, too; the thesis reads, "The PDMS mold is transparent to UV light (page 534, right column, lines 11–12)." Since light is applied through the recessed mold, the mold made of resin is inevitably deformed.

(Mounting of an Optical Component)

The optical waveguide has a core on which an optical-path changing mirror is provided. An optical component, which is a light-emitting element or a light-receiving element, is mounted on the surface of the optical waveguide lies on the optical axis of the mirror.

In most cases, the optical-path changing mirror is a plane mirror. The plane mirror is disadvantageous in that the connection efficiency is low when it guides light to the core from a light-emitting element such as a vertical-cavity surface-emitting laser (VCSEL) or to a light-receiving element such as a photodiode (PD). The plane mirror is disadvantageous also in that the displacement tolerance is small.

To connect the light-emitting element to the core, a convex lens is used, as in most cases, to convert the diverging light coming from the light-emitting element to focused light, which is applied to the optical-path changing mirror. To connect the core to the light-receiving element, a convex lens converts the light coming from the optical-path changing mirror to focused light, which is applied to the PD, in order to increase the connection efficiency and the displacement tolerance for the light-receiving element (see, for example, Jpn. Pat. Appln. KOKAI Publication No. 2001-185752).

In these methods, however, it is necessary to provide an optical path between the core and the convex lens, which is longer than the diameter of the core. This inevitably renders the entire system large and complex. Further, the medium outside the lens must be one having a small refractive index, and air is usually used. Thus, no highly reliable structure, such as a transparent resin capsule, can be used.

Both the light-emitting element 40 and the light-receiving element 41 may be provided near optical-path changing mirrors 4 and 6, as shown in FIG. 47, establishing the relation of the diameter of beam emitting area<the diameter of the core<the diameter of beam receiving area. Thus, the light beam reaches the light-receiving element 41 before it greatly diverges. This renders it unnecessary to use the convex lens. This method is not so desirable, however. The light beam receiving area has a large diameter, and the light-receiving element 41 can respond but slowly.

(Mounting of the Waveguides)

As FIG. 48 shows, straight waveguides, curved waveguides and inclined mirrors, each at the end of any waveguide, have been hitherto used (see, for example, p. 662, FIG. 8, Journal of the Society of Electronic Data Communication, Vol. 84, No. 9, pp. 656–662, September 2001). Straight waveguides are fundamental. A curved waveguide is used to change the position or orientation of a straight waveguide. Incline mirrors are used to connect waveguides to surface-emitting elements or light-emitting elements (hereinafter, referred to as "external elements").

Many cores are required in complex circuit. In a complex circuit, it is difficult to amount straight waveguides and curved waveguides in high density. This is because each curved waveguide cannot have a small radius of curvature; the smaller the radius of curvature, the greater the loss of light. Since the curved waveguides need to have a large radius of curvature, a large area is required to change the direction of the optical path. It is therefore difficult to increase the density at which the waveguides may be mounted.

Further, in complicated circuits, the setting must be repeated many times to process mirrors by laser cutting.

In summary, any structure comprising straight waveguides, curved waveguides and inclined mirrors, each provided at the end of each waveguide, is not considered to be fit for providing cores that connect many points at various positions.

(Bonding to Another Substrate)

How an optical waveguide 7 is made in the form of a film and bonded to another substrate will be described below.

How a film, or optical waveguide 7, is formed as is illustrated in at (a) to (f) in FIG. 49. As shown at (a) in FIG. 49, a first clad 2 is formed on a substrate 20. As depicted at (b) in FIG. 49, alignment marks 79 are formed on selected parts of the first clad 2. Then, as shown at (c) in FIG. 49, a core 1 is formed on the first clad 2, not overlapping the alignment marks 70. At (c) in FIG. 47, the core 1 is depicted as if overlapping the alignment marks 70. However, the core 1 is displaced from the marks 70 in the direction perpendicular to the plane of the drawing. As shown at (d) in FIG. 49, a second clad 3 is formed on the core 1 and the first clad 2. The waveguide 7 is thus provided on the substrate 20. Thereafter, as shown at (e) in FIG. 49, inclined, total-reflection mirrors 55 are formed at the ends of the core 1. The substrate 20 is peeled off the optical waveguide 7. The optical waveguide 7, shaped like a film as depicted at (f) in FIG. 49, is therefore manufactured.

Next, as shown at (g) in FIG. 49, the optical waveguide 7 is bonded with adhesive 62 to another substrate (e.g., a wiring board) 60, with one alignment mark 70 aligned with alignment marks 61 that are provided on the substrate 60. This completes the bonding of the optical waveguide 7 to the other substrate 60.

This bonded structure can hardly be controlled, however, in the thickness of the adhesive layer 62. The distance between the optical waveguide 7 and the other substrate 60 may change in accordance with the thickness of the adhesive layer 62. Further, the precision of positioning the waveguide 7 with respect to the substrate 60 is low because the alignment mark 70 is spaced apart from the alignment marks 61 by a long distance.

BRIEF SUMMARY OF THE INVENTION

An object of this invention is to provide a method of manufacturing an optical waveguide which is inexpensive and in which the core is used at high efficiency and scarcely deformed.

Another object of the invention is to provide an optical waveguide that excels in mirror-connection efficiency, which has a large tolerance for element displacement and which is simple in structure and inexpensive.

Still another object of the invention is to provide an optical waveguide in which a core can be easily formed to connect many given points.

A further object of the present invention is to provide an optical waveguide, which can be spaced from, and positioned with respect to, another substrate and which is therefore fit to be bonded to the substrate.

According to a first aspect of this invention, there is provided a method of manufacturing an optical waveguide that has a core and clads. The method comprises: a step of forming a first clad by applying a resin on a substrate and curing the resin; a step of applying a core material between a recessed mold having a recess identical to a shape of the core and the first clad provided on the substrate; a step of curing the core material thus applied, thereby forming a core pattern having a shape identical to that of the recess; and a step of peeling the recessed mold from the core pattern and the first clad.

Since the core material is pressed into the recess of the mold, its use efficiency is high. Since no light is applied through the recessed mold, the core is hardly deformed. Therefore, the method can manufacture the optical waveguide at low cost.

According to a second aspect of this invention, there is provided an optical waveguide in which a core is interposed between clads. The optical waveguide comprises a concave mirror which is provided at one end of the core and which guides signal light applied in a direction perpendicular to the waveguide, into the core. The concave mirror has a focal distance that is substantially equal to a distance from a center point of the concave mirror to a light-emitting point of a light-emitting element that generates the signal light.

Having such a concave mirror, the optical waveguide excels in mirror-connection efficiency, can have a large tolerance for element displacement, and is simple in structure and inexpensive.

According to a third aspect of this invention, there is provided an optical waveguide that has a plurality of cores interposed between clads. The first core comprises a plurality of straight waveguides extending in at least two directions and connected to each other with an in-plane mirror. Another core comprises a straight waveguide extending in a direction that is substantially identical to one of the directions in which the straight waveguides included in the first core extend.

The use of the in-plane mirror can reduce the area required to change the direction of the optical path. Further, the cores are standardized to have a straight waveguide that may extend in the two directions. This reduces the number of times the setting of the laser cutting process should be repeated. Hence, in the optical waveguide, each core can be easily formed to connect many given points.

According to a fourth aspect of this invention, there is provided an optical waveguide that can be bonded to another substrate. This optical waveguide comprises: a first clad; a core formed on a part of the first clad; a base formed on a part of the first clad and having a top at a level equal to or higher than a top of the core; an alignment mark formed on the top of the base; and a second clad formed on the first clad and covering the core.

Having a base and an alignment mark, this optical waveguide can be precisely positioned with respect to another substrate, at a desired distance from the substrate. Thus, the optical waveguide is fit to be bonded to the substrate.

BRIEF DESCRIPTION OF THE SEVERAL VIEWS OF THE DRAWING

FIG. 29 is a diagram for explaining a method of manufacturing the optical waveguide according to the fourth embodiment;

FIGS. 36 to 43 are sectional views explaining a method of manufacturing an optical waveguide according to a fifth embodiment of the invention;

DETAILED DESCRIPTION OF THE INVENTION

Modes and embodiments of this invention will be described in detail, with reference to the accompanying drawings. The embodiments can be combined one with any other. The first and second embodiments relate mainly to methods of manufacturing optical waveguides. The third embodiment is concerned mainly to the mounting of external elements. The fourth embodiment relates chiefly to the forming of a complex circuit. The fifth embodiment relates mainly to the bonding of optical waveguides to another substrate.

FIRST EMBODIMENT

Figure 1:
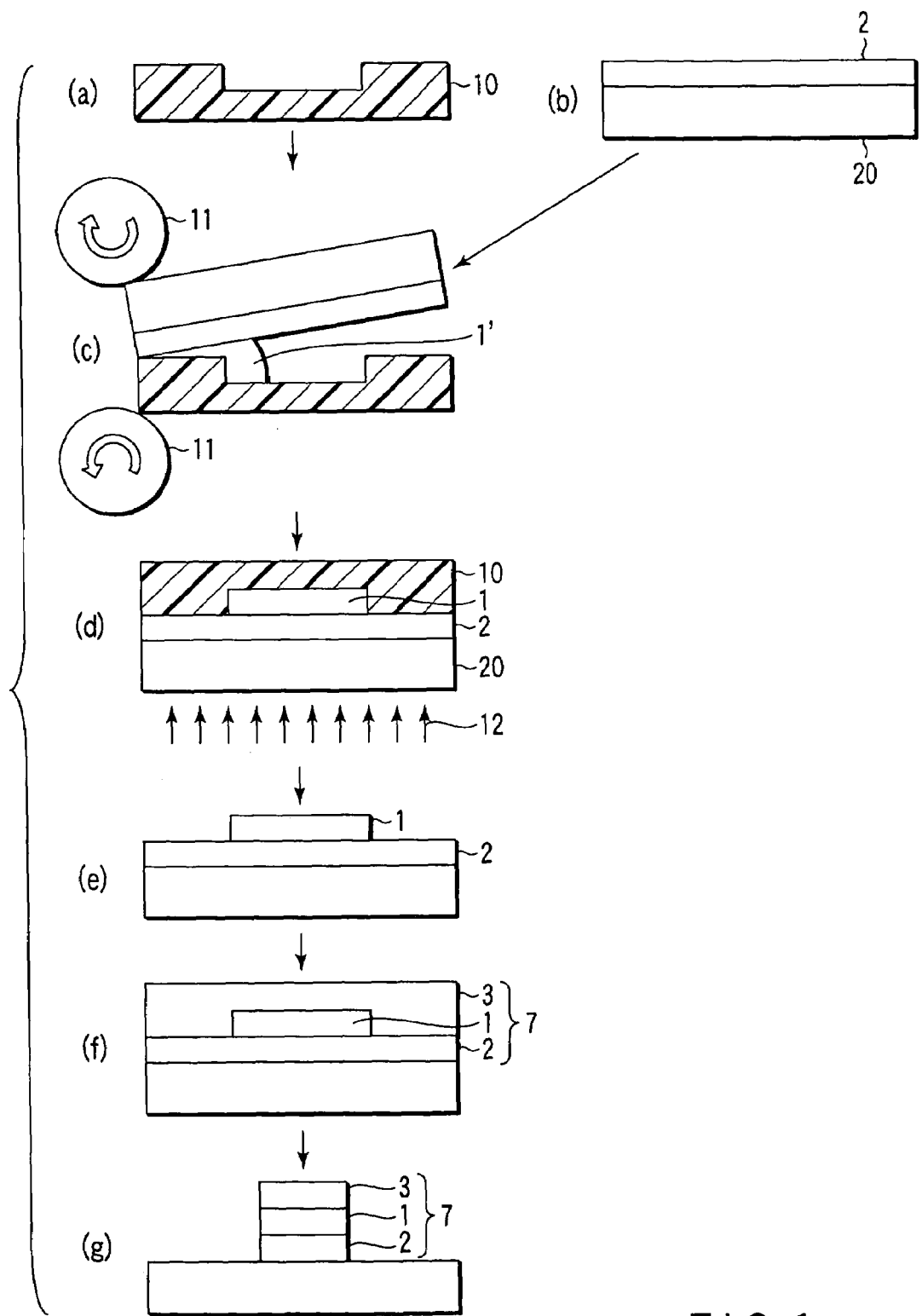
FIG. 1 is sectional views explaining a method of manufacturing an optical waveguide according to a first embodiment of the present invention.

FIG. 1 is sectional views explaining a method of manufacturing an optical waveguide according to a first embodiment of the present invention.

First, a recessed mold 10 is prepared. As shown at (a) in FIG. 1, the mold 10 has a recess having the shape of a core pattern to be formed. At least the surface regions of the mold 10 are made of silicone or fluororesin. Meanwhile, a substrate 20 is prepared, and a first clad 2 is formed on the substrate 20 and cured, as is illustrated at (b) in FIG. 1.

As shown at (c) in FIG. 1, a core material 1' is laid between the recessed mold 10 and the substrate 20. Rolls 11, for example, press the core material 1', recessed mold 10 and substrate 29 together. The core member 1' is thereby pressed into the recess of the mold 10.

Then, as depicted at (d) in FIG. 1, ultraviolet rays are applied to the substrate 20, curing the core material 1'. A core pattern 1 is thereby formed.

The recessed mold 10 is removed. As a result, the core pattern 1 is mounted on the first clad 2 as shown at (e) in FIG. 1.

This structure can function as a waveguide, because air serves as upper clad. Nonetheless, it is desired that the core pattern 1 and the first clad 2 be covered with a second clad 3 as shown at (f) in FIG. 1, in order to form a waveguide. If the waveguide need not have mirrors, its input and output ends are bare, as is illustrated at (g) in FIG. 1.

Figure 2:
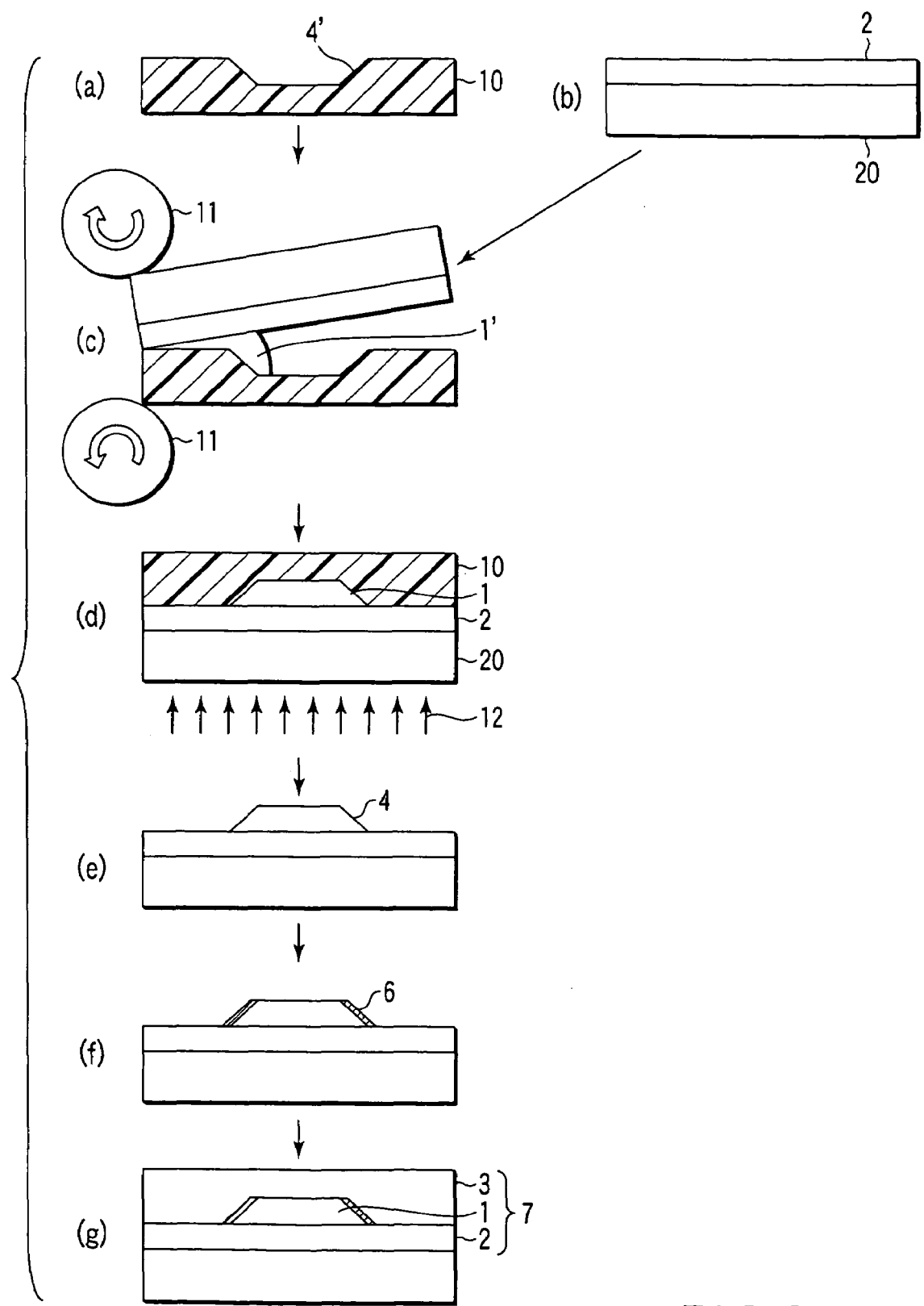
FIGS. 2 and 3 are sectional views explaining a modification of the method of manufacturing the first embodiment.
Figure 3:
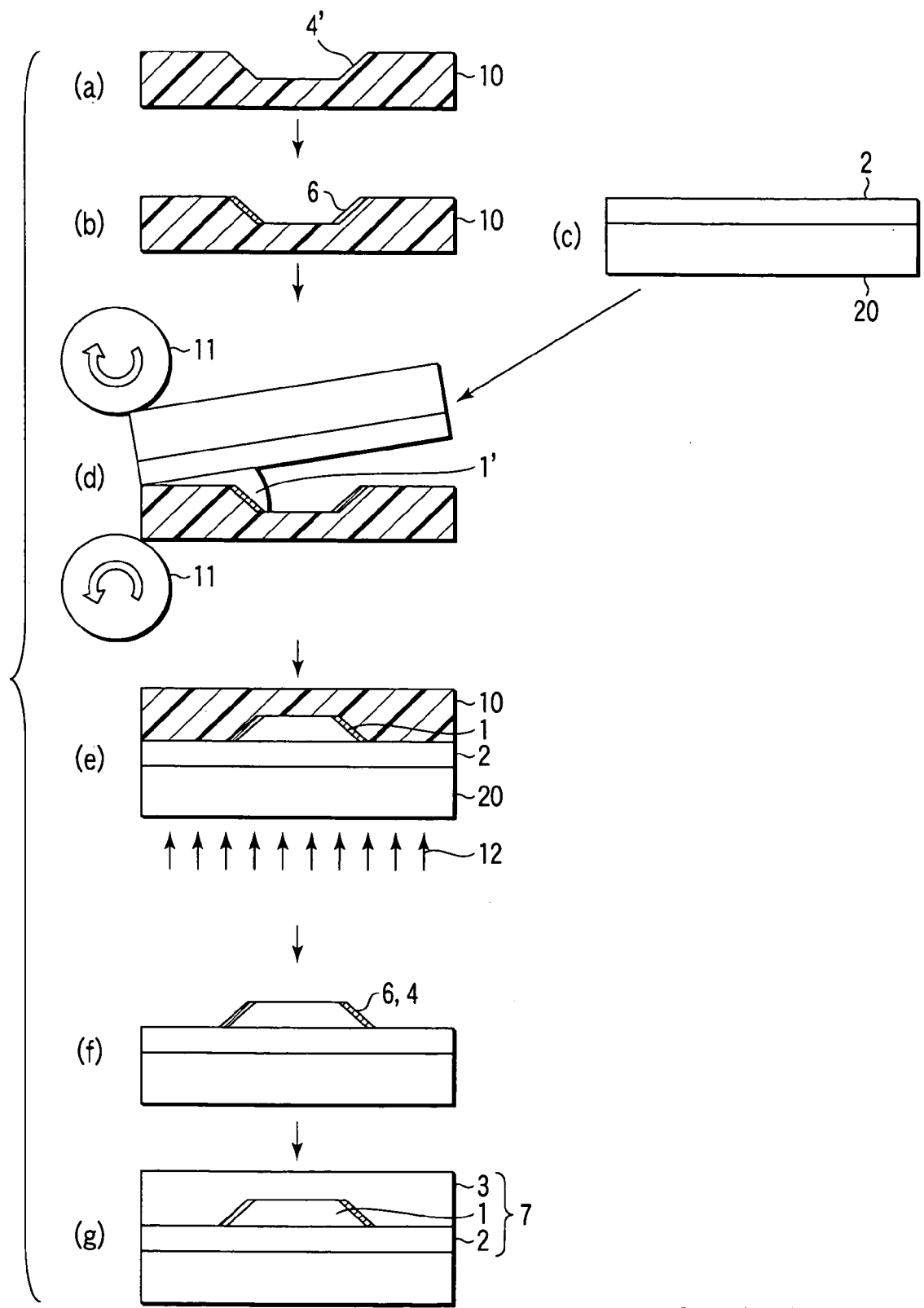

The waveguide 7 may be formed by using a mold 10 having a recess that has mirror-equivalent surfaces 4' inclined at 45° as shown in FIGS. 2 and 3. This recessed mold 10 has been made as will be describe later, with reference to FIG. 4(a–e). The recessed mold 10 is not limited to one that has inclined mirror-equivalent surfaces 4' at ends as shown at (f) in FIG. 4. Rather, it may be one that has not only inclined mirror-equivalent surfaces 4', but also a surface 5' equivalent to an in-plane mirror, at the middle part of the recess as is illustrated at (g) in FIG. 4.

Figure 4:
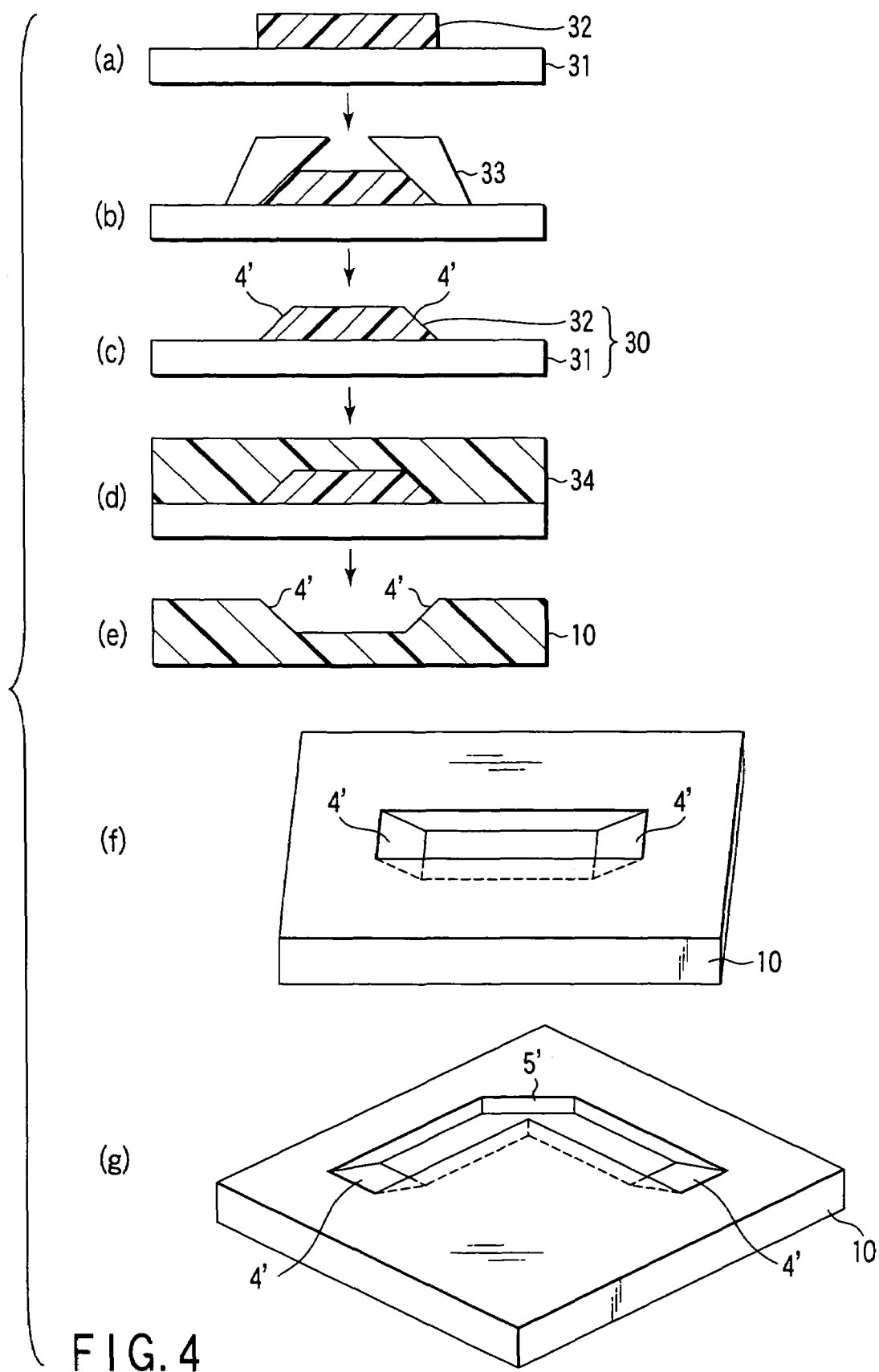
FIG. 4 is sectional views and perspective views, explaining a method of manufacturing a recessed mold for use in the first embodiment.
Figure 5:
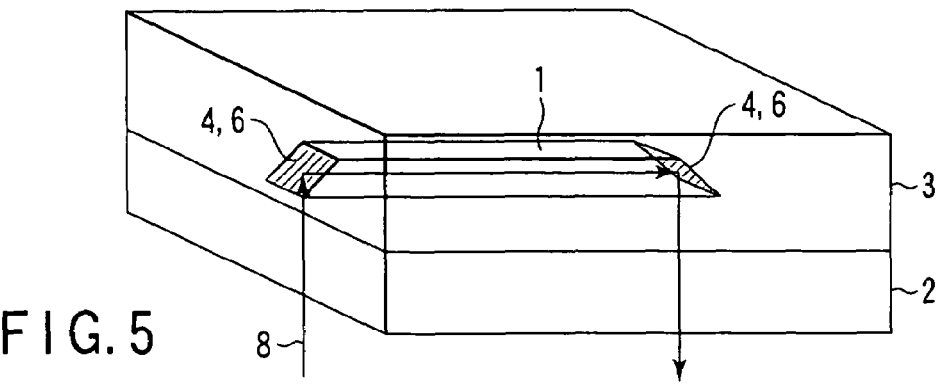
FIGS. 5 and 6 are perspective views of two types of optical waveguides that may be used in the first embodiment.

The mold 10 having surfaces 4' equivalent to inclined mirrors, as shown at (f) in FIG. 4 may be used to form the waveguide 7. In this case, inclined mirror surfaces 4 for changing the optical path can be formed at the ends of the core pattern 1 as is illustrated in FIGS. 2, 3 and 5, at the same time the core pattern 1 is formed.

The mold 10 having surface 5' equivalent to in-plane mirror, as shown at (g) in FIG. 4, may be used instead. In this case, in-plane mirror surface 5 for changing the optical path can be formed on the core pattern 1 at the same time the core pattern 1 is formed.

A method of producing the recessed mold 10 will be explained.

First, a projection having the shape of a core pattern to produce is formed on a substrate 31 as illustrated at (a) to (c) in FIG. 4. The projection can be formed easily, by first coating the substrate 31 with a photosensitive resin layer 32 (e.g., a photo-resist), then exposing the layer 32 to light with photomask and finally developing the layer 32.

Mirror-equivalent surfaces 4' inclined at 45° for changing the optical path can be formed at the ends of the core pattern. More specifically, the surfaces 4' equivalent to inclined mirrors are provided by a laser cutting process in which a laser beam 33 is obliquely applied as shown at (b) in FIG. 4. The laser process uses KrF excimer laser, an ArF excimer laser, a femto-second laser, a UV-YAG laser or the like, which emits a beam consisting of high-energy photons, having a wavelength in the ultraviolet region and capable of cutting molecules. A surface 5' equivalent to an in-plane mirror for changing the optical path can be provided at the middle part of the core pattern. The surfaces 5' equivalent to in-plane mirrors may be formed either by exposure and development at the same time or by laser cutting after the core pattern is made.

Thus, a projecting mold 30 having a projection with two surfaces 4' equivalent to inclined mirrors at the ends, respectively, is formed as shown at (c) in FIG. 4.

Next, silicone or fluororesin, in the form of liquid, is poured onto the projecting mold as shown at (d) in FIG. 4. The silicone or fluororesin is cured at room temperature or by heating to provide a recessed mold 10.

After the silicone or fluororesin is cured, the projecting mold 30 is removed. As a result, a recessed mold 10 is made as is illustrated at (e) in FIG. 4.

The recessed mold 10 has a recess that may have mirror-equivalent surfaces 4's shown at (f) in FIG. 4 or mirror-equivalent surface 5' as depicted at (g) in FIG. 4.

Description shall be reverted to the manufacture of the waveguide. The waveguide 7 may be made by using the recessed mold 10 having surfaces 4' equivalent to inclined mirrors, as shown in FIG. 2. If this is the case, it is desirable to provide reflecting films 6 on the mirror surfaces 4 and 5 of the core pattern 1 as illustrated at (f) in FIG. 2. The reflecting films 6 are preferably metal films (Al, Ag, Cu or the like). Each film 6 may be a multi-layer film. The reflecting films 6 can be formed by various methods, such as vapor deposition through mask, etching process or lift-off process. (The etching process is performed after a film is formed on all exposed surfaces of the core pattern 1.)

Alternatively, the reflecting films 6 may be first formed on the mirror-equivalent surfaces 4' and 5' of the recessed mold 10 and then transferred to the mirror-equivalent surfaces 4 and 5 of the core pattern 1 as the mold 10 is removed from the core pattern 1.

Preferably, the clads 2 and 3 are made of epoxy resin. To cure the clads 2 and 3, ultraviolet rays or heat is applied to the clads 2 and 3. Instead, both ultraviolet rays and heat can be applied to the clads 2 and 3.

To fill the core material 1', press-rolling is performed as desirable process. More precisely, the rolls 11 are rotated and moved over the core material 1', while applying a pressure on the core material 1'. The press rolling can therefore press the core material 1' into the recess of the mold 10, which has the same shaped as a core pattern to be made. The process can remove bubbles from the core material 1'. In FIGS. 1 to 3, the recessed mold 10 lies beneath the substrate 20. Instead, the substrate 20 may be positioned beneath the recessed mold 10.

Figure 6:
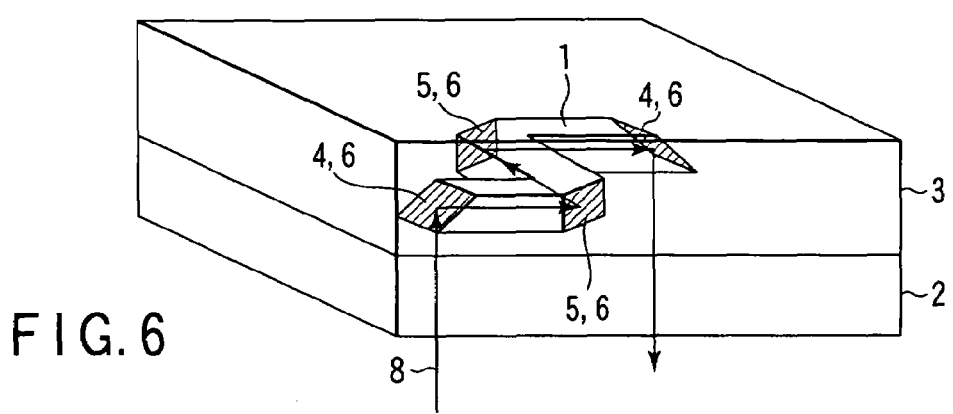
Figure 7:
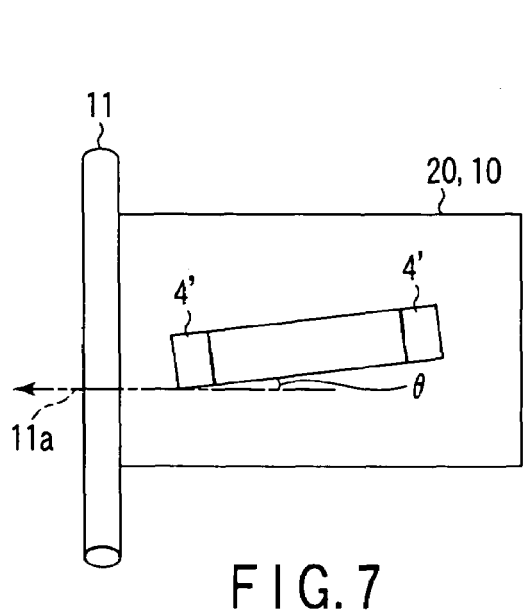
FIGS. 7 and 8 are schematic diagrams showing the angles at which press rolls may be moved in the first embodiment.
Figure 8:
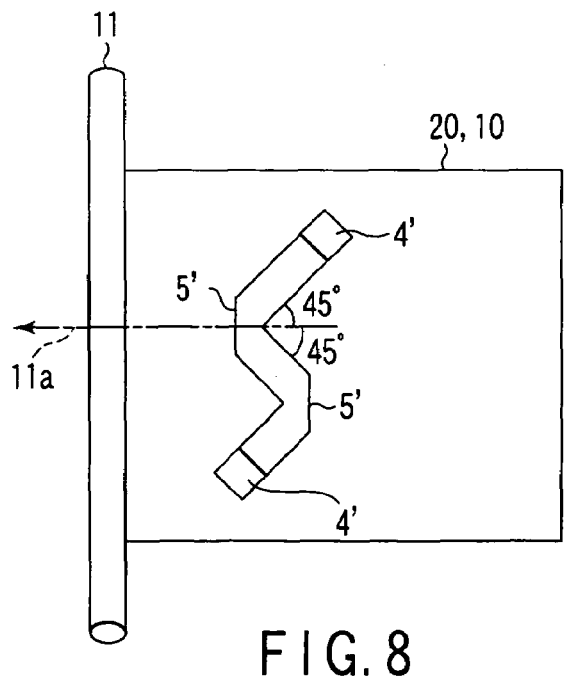

As FIG. 7 shows, it is desired the angle θ between the straight part of the waveguide and the direction 11a in which the press rolls move should be as small as possible. If this angle is equal to or smaller than 45°, the core material 1' can be pressed into the recess as is desired. As FIG. 6 depicts, the straight waveguide may have two parts extending in two directions that are at right angles to each other. In this case, as shown in FIG. 8, the two parts of the waveguides are inclined at about 45° to the direction 11a in which the press rolls are moved. Then, the core material 1' can be pressed well into the recess of the mold 10.

The core material 1' should better be made of epoxy resin or acrylic resin. Ultraviolet rays or heat, or both may be applied to the core to cure the same. Application of ultraviolet rays is particularly important because it can minimize the temperature change to achieve a high precision of size.

Figure 9A:
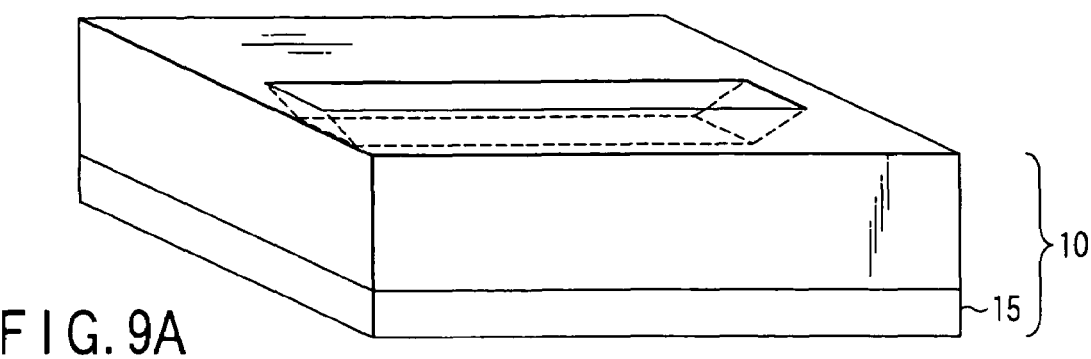
FIGS. 9A and 9B are perspective views of a type of a recessed mold that may be used to manufacture the first embodiment.
Figure 9B:
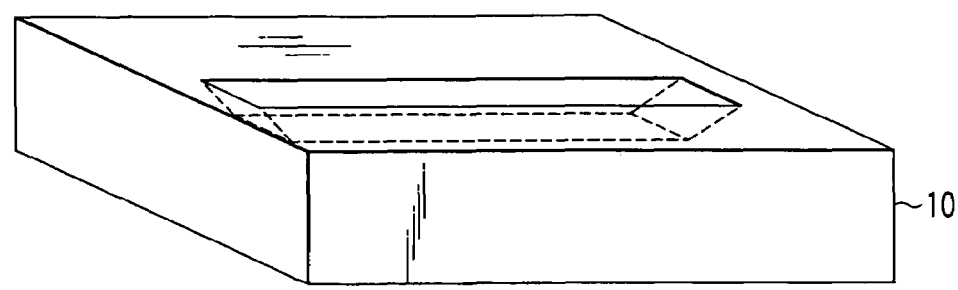

To enhance the size precision, it is necessary to suppress the shrinking of the recessed mold 10 in the curing process of mold. In order to suppress the mold shrinking, the recessed mold 10 needs to have a backplate 15 as is illustrated in FIG. 9A. The backplate 15 may be made of material having a smaller thermal expansion coefficient than the resin 34 that is the material of the recessed mold 10. That is, the backplate 15 may be made of inorganic material such as metal. Then, the change in size can also be controlled, which results from the temperature changes that occur as the core is cured. It would be the best if the backplate 15 were made of material that has the same heat expansion coefficient as the substrate 20 that has the clad 2.

Since the recessed mold 10 described above is used, it is important to apply ultraviolet rays 12 to the core material 1' through the substrate 20. This is because ultraviolet rays can hardly pass through the backplate 15, which is made of metal or the like. Thus, the substrate 20 should be made of material that is transparent to ultraviolet rays. Preferred as material transparent to ultraviolet rays is, for example, glass.

Figure 10:
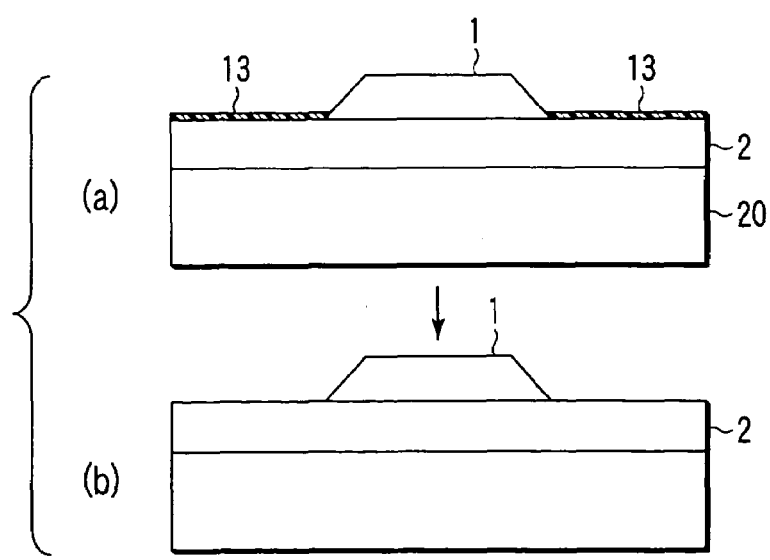
FIGS. 10 and 11 are sectional views explaining a modification of the method of manufacturing the first embodiment.

When the core material 1' is interposed, a thin core 13 remains on the entire surface, as shown at (a) in FIG. 10. The core 13 can be made as thin as about 1 μm by means of optimization. Being so thin, the core 13 scarcely makes a problem to the optical waveguide. If the core pattern 1 is very close to an adjacent one, however, the core 13 will cause a cross talk.

In view of this, the core 13 is removed as shown at (b) in FIG. 10, after the recessed mold 10 is peeled off. The core 13 can be removed by subjecting the entire structure to, for example, oxygen-plasma process. Alternatively, the core 13 can be removed by lightly treating the entire structure with chemicals. Then, the cross talk can be reduced even if the core patterns 1 are arranged in short pitches. Since the core 13 remains in the form of a layer as thin as 1 μm, it can be removed in a short time, making no problems in the manufacture of the optical waveguide.

Figure 11:
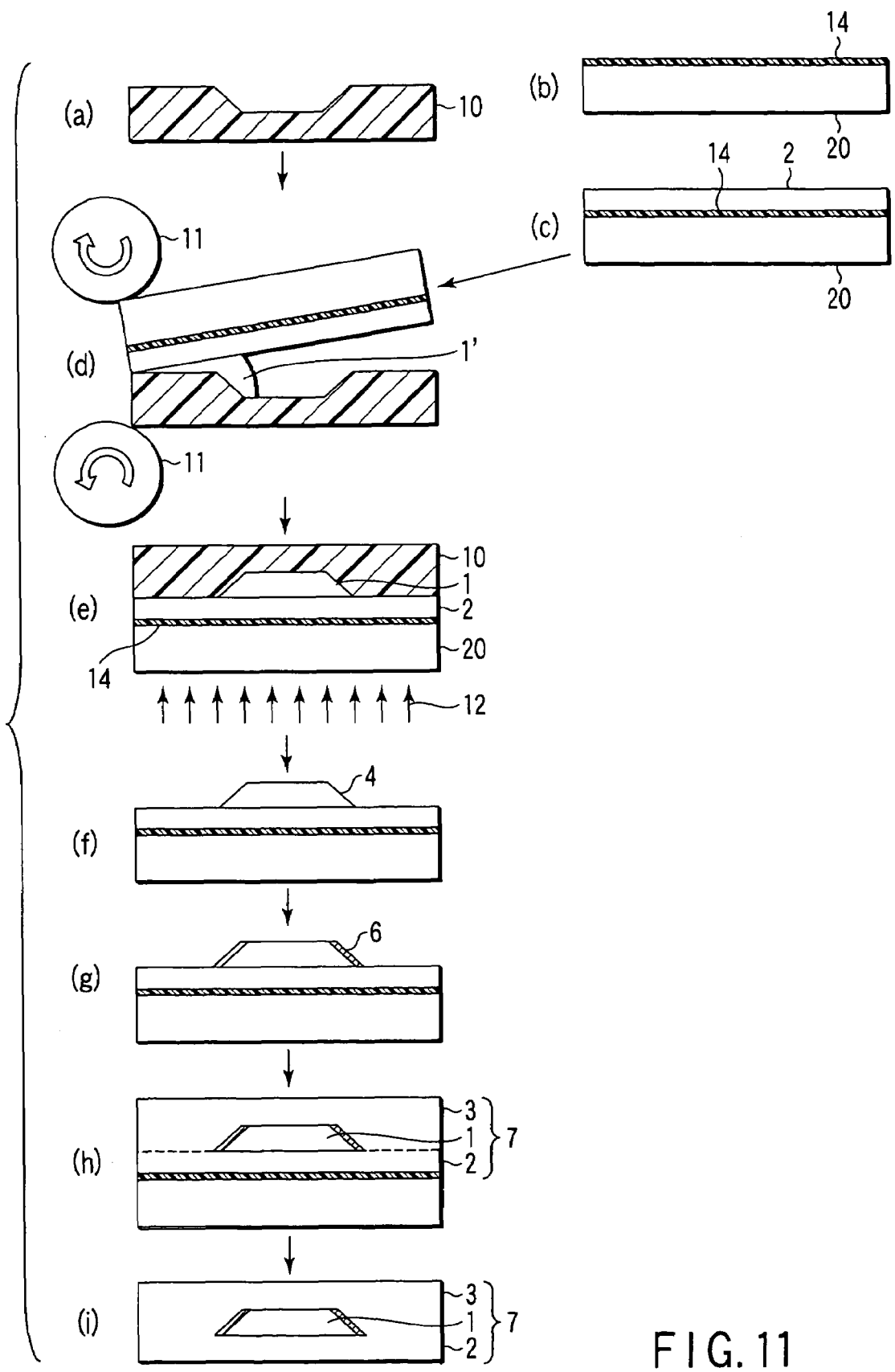

As shown at (b) in FIG. 11, a separation layer 14 may be formed on the substrate 20 before the waveguide 7 is manufactured. After the waveguide 7 is manufactured, the separation layer 14 is removed from the clad 2, thus removing the substrate 20. Thus, the waveguide 7 can be an individual film as is shown at (i) in FIG. 11.

Ultraviolet rays may be applied through the substrate 20 to cure the core. Then, it is desired that the separation layer 14 is transparent to ultraviolet rays 12. The separation layer 14 can be a thin photoresist or a water-soluble adhesive layer.

Examples 1 to 9 of the first embodiment described above will be described. Examples 1, 4 and 9 are concerned with the recessed mold. Examples 2, 3 and 5 are related to the optical waveguide. Examples 6 and 7 are related to the press rolling and the orientation of the waveguide. Example 8 is concerned with the technique of providing the waveguide in the form of a film. These examples will be described, one by one.

EXAMPLE 1

Recessed Mold 1

Example 1 of the first embodiment will be explained, with reference to FIG. 4. First, a dry film resist was laminated to the substrate 31 (made of glass) as is illustrated at (a) in FIG. 4. The resist was exposed to light through photomask and developed. A projecting pattern, or photosensitive-resin pattern 32, was thereby formed. The pattern 32 was shaped like a core and its height and width were 40 μm.

Next, as shown at (b) in FIG. 4, a KrF excimer laser applied as a laser beam 33 obliquely, thus forming mirror surfaces 4'. A projecting mold was formed as illustrated at (c) in FIG. 4.

Then, silicone resin 34 in liquid state was applied to the projecting mold and cured as shown at (d) in FIG. 4. Thereafter, the projecting mold was removed from the silicon resin layer 34, forming a recessed mold 10 as shown at (e) in FIG. 4.

EXAMPLE 2

Waveguide 1

Example 2 of the first embodiment will be described, with reference to FIG. 2. At first, a recessed mold 10 (made of silicone resin) made in Example 1 is prepared as shown at (a) in FIG. 2.

Next, a substrate 20 (made of glass) is prepared. Ultraviolet-curable epoxy resin was applied, as clad material, to the substrate 20 by means of spin coating. Ultraviolet rays were applied to the entire surface of the substrate at intensity of 4 J/cm$^2$, curing the clad material. A first clad 2 having a thickness of 30 μm was thereby formed on the substrate 20, as is illustrated at (b) in FIG. 2.

Then, ultraviolet-curable epoxy resin was dripped, as core material 1' onto the recessed mold 10. As shown at (c) in FIG. 2, the substrate 20 having the clad 2 was laid on the recessed mold 10 and was passed, together with the mold 10, through a roll laminator.

The rolls pressed the recessed mold 10 and the substrate 20 having the clad 2, pushing the core material 1' into the recess of the mold 10.

As depicted at (d) in FIG. 2, ultraviolet rays 12 are applied through the substrate 20 at intensity of 8 J/cm$^2$. The core material 1' was thereby cured, forming a core pattern 1.

As shown at (e) in FIG. 2, the recessed mold 10 was removed. Using a mask, Al was vapor-deposited as shown at (f) in FIG. 2, thus forming reflecting films 6 on the inclined mirror surfaces 4 of the core pattern 1.

Further, ultraviolet-curable epoxy resin was applied, forming a second clad 3. Ultraviolet rays were applied at intensity of 4 J/cm$^2$. As a result, a waveguide 7 was formed as illustrated at (g) in FIG. 2.

EXAMPLE 3

Optical Waveguide 2

Example 3 of the first embodiment will be described, with reference to FIG. 3. First, a recessed mold 10 (made of silicone resin) made in Example 1 is prepared as shown at (a) in FIG. 3. Using a mask, Al was vapor-deposited as shown at (b) in FIG. 3. Reflecting films 6 were thereby formed on the inclined mirror-equivalent surfaces 4'. Then, a core pattern 1 was formed on the first clad 2 as shown at (c) to (e) in FIG. 3, in the same way as depicted at (b) to (d) in FIG. 2. Nonetheless, the core material 1' was one made of ultraviolet-curable acrylic resin.

Next, the Al films, i.e., reflecting films 6, were transferred to the inclined mirror surfaces 4 of the core pattern 1 as shown at (f) in FIG. 3, when the recessed mold 10 was removed. Then, a second clad 3 was formed in the same way as already explained, as illustrated at (g) in FIG. 3. As a result, a waveguide 7 was manufactured.

EXAMPLE 4

Recessed Mold 2

Example 4 of the first embodiment will be described, with reference to FIG. 4. First, ultraviolet-curable epoxy resin is applied on a substrate 31 (made of glass). The resultant structure was exposed to light through photomask and developed with a solvent. A projecting pattern 32 made of photosensitive resin was thereby formed as is illustrated at (a) in FIG. 4.

This pattern's height and width were 40 μm. The pattern was not only straight line but had a surface 5' (not shown) equivalent to an in-plane mirror, too.

Next, laser beams 33 emitted from a femto-second laser were obliquely applied, to the pattern 32 made of photosensitive resin, forming surfaces equivalent to inclined mirrors, as shown at (b) in FIG. 4. As a result, a projecting mold 30 was obtained as illustrated at (c) in FIG. 4.

As depicted at (d) in FIG. 4, fluororesin 34 was applied on the projecting mold 30 and cured with heat. The resultant fluororesin layer 34 was removed from the projecting mold 30. A recessed mold 10 made of fluororesin was thereby made as is shown at (e) in FIG. 4.

EXAMPLE 5

Optical Waveguide 3

Example 5 of the first embodiment will be described, with reference to FIG. 2. Example 5 is a waveguide 7 that was made as shown at (b) to (g) in FIG. 2, first by preparing a recessed mold 10 (made of fluororesin) produced in Example 4 as is illustrated at (a) in FIG. 2.

EXAMPLE 6

Press-Rolling and Orientation 1 of Waveguide

A recessed mold 10 having a straight core pattern as shown at (f) in FIG. 4 was used.

Test was repeated, changing the angle θ between the orientation of the straight recess of the recessed mold 10 and the direction in which the mold 10 was moved through the roll laminator, as is illustrated in FIG. 7 and at (c) in FIG. 2.

The core material 1' could be pressed into the recess as is desired, when the angle θ was 0°, 30° and 45°. When the angle θ was 60°, some bubbles were observed in the core material 1'. When the angle θ was 90°, many bubbles were observed in the core material 1'.

EXAMPLE 7

Press-Rolling and Orientation 2 of Waveguide

A recessed mold 10 that had two straight grooves extending at right angles to each other and a surface 5' equivalent to an in-plane mirror, as is illustrated at (g) in FIG. 4, was used.

As shown at (c) in FIG. 2, press rolling was performed such that the angle between the direction in which the roll laminator was moved and the directions in which the straight grooves of the recessed mold 10 was almost 45°. As a result, the core material 1' was pressed into the recess as is desired.

EXAMPLE 8

Making the Waveguide as an individual Film

What is shown at (a) in FIG. 11 is identical to what is shown at (a) in FIG. 2. As depicted at (b) in FIG. 11, a positive resist was applied to a substrate 20, forming a separation layer 14 having a thickness of 1 μm. After the resultant structure was baked, a waveguide was made as shown at (c) to (h) in FIG. 11, in the same way as in Example 2.

The waveguide thus produced was immersed in a peeling liquid, dissolving the separation layer 14 as is illustrated at (i) in FIG. 11. Thus, the waveguide was shaped as an individual a film.

Infrared rays having wavelength of 0.85 μm were applied through optical fibers to one inclined mirror surface 4. The infrared rays were observed to emerge from the other inclined mirror surface 4.

EXAMPLE 9

Recessed Mold 3

At first, a projecting mold 30 was formed in the same manner as in Example 1. Next, silicone resin in liquid state was poured onto the projecting mold 30, and a stainless steel plate was laid, as backplate 15, on the silicone layer 34.

The silicone layer 34 was cured at room temperature in this condition. Then, the projecting mold 30 was peeled off. A recessed mold 10 was thereby made as is illustrated in FIG. 9A.

Using the recessed mold 10 having the backplate 15, a waveguide 7 was manufactured in the same way as in Example 2. This waveguide 7 had a core pattern 1 that had almost the same size as the mask pattern.

Meanwhile, a recessed mold 10 having no backplate was used, thus making a core pattern 1 in the same way as in Example 2. This core pattern was smaller by 0.5% than the mask pattern.

As described above, the first embodiment and Examples 1 to 9 thereof are advantageous in the following respects.

First, the deformation of the core pattern 1 can be suppressed because the recessed mold 10 is made of silicone or fluororesin 34. Further, since the core material 1' has been pressed into the recess of the mold 10, the use efficiency of the core member is high, making it possible to manufacture the waveguide at low cost.

Secondly, the mirror surfaces 4 and 5 can be provided at the same time the core pattern 1 is formed, because the recessed mold 10 has mirror-equivalent surfaces 4' and 5'.

Thirdly, the core 13 remaining on the entire surface after the recessed mold 10 is peeled off can be easily removed, because it is thin.

SECOND EMBODIMENT

Figure 12:
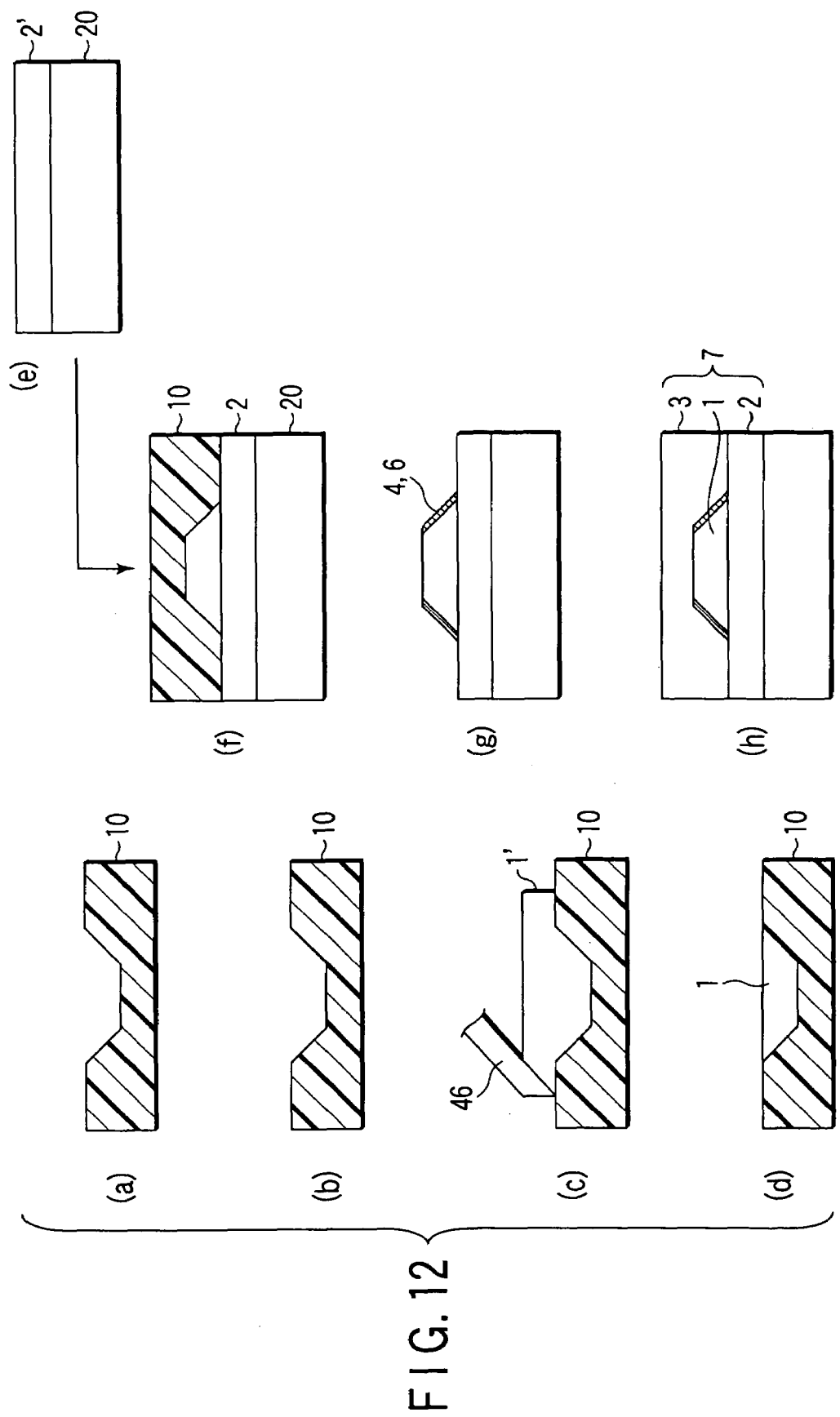
FIG. 12 is sectional views showing a method of manufacturing an optical waveguide according to a second embodiment of the present invention.

FIG. 12 is sectional views that illustrate a method of manufacturing an optical waveguide according to a second embodiment of this invention. First, a recessed mold 10 is prepared as shown at (a) in FIG. 12.

The recessed mold 10 serves as a mold for forming the optical waveguide. The recessed mold 10 has a patterned recess. Not only the core pattern of the optical waveguide, but also mirror-equivalent parts, a diffraction grating or optical circuits such as a branch or an arrayed waveguide grating can be pressed into the patterned recess.

Preferably, the recessed mold 10 is made of silicone resin. This is because silicone resin is soft, rendering it easy to put the core pattern to a substrate having a clad and to peel the mold from the substrate, and not damaging the core pattern.

The recessed mold 10 may be made of silicone resin in its entirely. Preferably, at least its surface region having the patterned recess is made of silicone resin.

Next, a surface treatment is performed on the recessed mold 10 as shown at (b) in FIG. 12. The surface treatment can enhance the affinity of the recessed mold 10 for the core material 1'. To be more specific, the angle at which the core material 1' contacts the recessed mold 10 is set at 45° or less. The core material 1' can therefore be pressed into the recess reliably. As the surface treatment, an oxygen-plasma process is preferable.

Then, as shown at (c) to (d) in FIG. 12, the core material 1' is filled in only the patterned recess made in the substrate. It is preferred that the core material 1' be made of, for example, epoxy resin. Particularly, ultraviolet-curable epoxy resin is desirable.

The core material 1' can be filled in the recess by various methods. For example, a spatula 46 may be used to scrape off the excessive part of the core material. After that, ultraviolet rays are applied, curing the core material 1'. A core pattern 1 is thereby obtained.

A substrate 20 is prepared as depicted at (e) in FIG. 12. Clad material 2' is applied to the entire surface of the substrate 20. As shown at (f) in FIG. 12, the recessed mold 10 having the core pattern 1 is laid on the substrate 20 to which the clad material 2' has been applied. In this condition, ultraviolet rays are applied, curing the clad material 2' and forming a first clad 2. Thereafter, the recessed mold 10 is peeled off, thus transferring the core pattern 1 to the substrate 20.

It is desired that the clad material 2' is ultraviolet-curable epoxy resin. The core material 1' and the clad material 2' may be cured by methods other than application of ultraviolet rays.

The optical-path changing mirrors are metal mirrors 4 and 6 formed by depositing metal on the inclined surfaces 4 of the core pattern 1 as is sown at (g) in FIG. 12. To deposit the metal exclusively on the inclined surfaces, the vapor deposition through mask or the lift-off method may be employed. The optical-path changing mirrors are not limited to the type that change an optical path to one that extends perpendicular to the optical waveguide layer. They may be of the configuration shown in FIG. 6, which changes an optical path to one that extends at any angle in the plane of the optical waveguide layer.

Next, as depicted at (h) in FIG. 12, clad material 3' is applied to the entire surface of the resultant structure. The clad material 3' is cured, forming a second clad 3. A single-layer optical waveguide 7 is thereby manufactured. The second clad 3 may not be formed. In this case, air is used as a clad.

Figure 13:
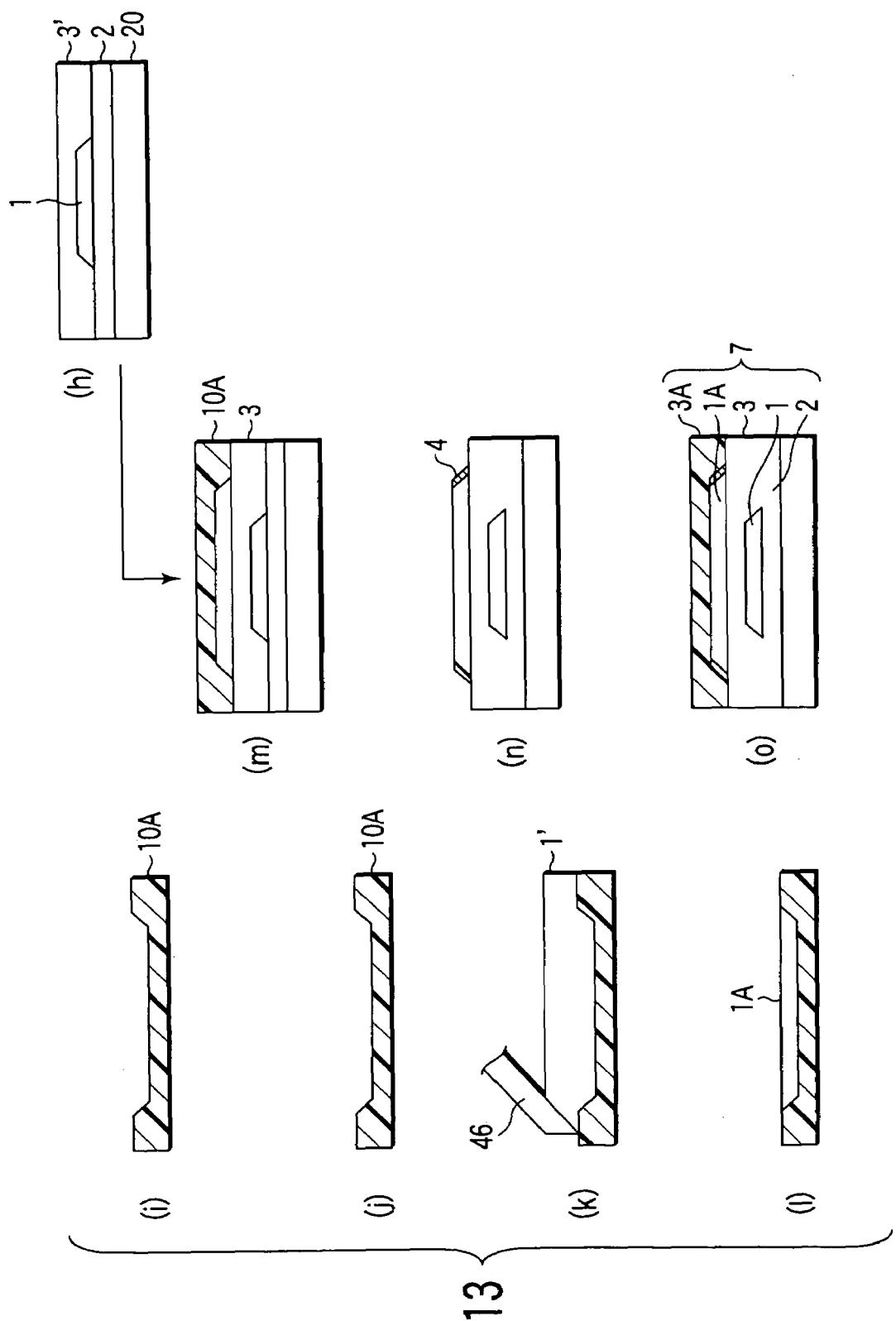
FIGS. 13 to 15 are sectional views illustrating a modification of the method of manufacturing the optical waveguide according to the second embodiment.

As FIG. 13 illustrates, a core pattern 1A may be formed in another recessed pattern 10A and then be transferred, thereby providing a multi-layer optical waveguide 7. What is shown at (h) in FIG. 13 corresponds to what is depicted at (h) in FIG. 12.

To form the multi-layer optical waveguide 7 or to transfer a single- or multi-layer optical waveguide to another substrate (e.g., electric wiring board), it is desirable to use alignment marks (not shown) made on the substrate 20 or the first clad 2.

The single- or multi-layer optical waveguide may be used in the form of an individual film. In this case, it is desired that a separation layer (not shown) be interposed between the substrate 20 and the clad 2. After the optical waveguide has been made, the separation layer is removed from the clad 2, thus providing the optical waveguide in the form of a film. It is also desired that the substrate 20 and the separation layer, (or the recessed mold 10,) be transparent to ultraviolet rays.

To manufacture the recessed mold 10, a projecting mold 30 may be first made, silicone resin 34 or the like may then be applied to the mold 30, curing, and the mold 30 may be removed from the layer.

The core pattern may, as in most cases, have an aspect ratio (height/width) of about 1. In this case, the mirror that changes the optical path to one extending perpendicular to the optical waveguide layer looks almost square when viewed from above. It means the clearances of component alignment are almost same in both x- and y-directions. Nonetheless, the waveguide can perform its function even if the aspect ratio of the core pattern is not 1. In fact, the inventors hereof have confirmed that waveguides work well though their core patterns have an aspect ratio ranging from 0.27 to 2.

Figure 14:
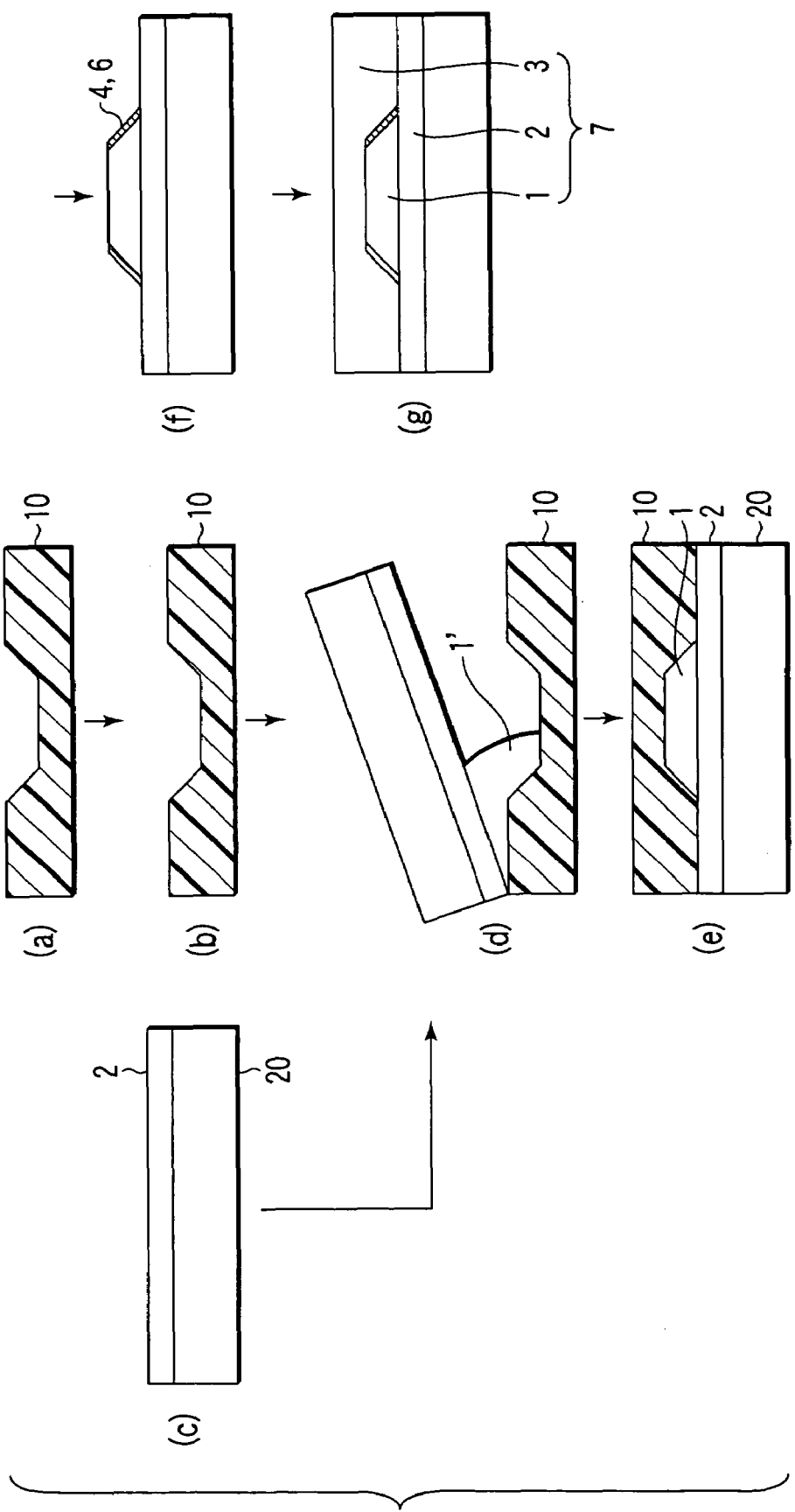

As described above, the core material 1' is filled in the patterned recess only, cured and laid on the substrate 20 having a raw clad. Instead, as shown in FIG. 14, the core material 1' may be clamped between the recessed mold 10 and the substrate 20 having a cured clad, thereby to manufacture a waveguide. More specifically, a recessed mold 10 is prepared as shown at (a) in FIG. 14 and surface-treated as depicted at (b) in FIG. 14. Next, a substrate 20 having a clad is prepared as depicted at (c) in FIG. 14. Then, core material 1' is sandwiched between the recessed mold 10 and the substrate 20, as is illustrated at (d) in FIG. 14.

As shown at (e) in FIG. 14, the core material 1' is cured by, for example, applying ultraviolet rays through the substrate 20 and/or the recessed mold 10. A core pattern 1 is thereby formed. The recessed mold 10 is removed, and the core pattern 1 is transferred to the substrate 20. Then, as shown at (f) in FIG. 14, metal is vapor-deposited on the inclined surfaces of the core pattern 1, forming metal mirrors 4 and 6. A second clad 3 may be formed, covering the core pattern 1 and the first clad 2 as in most cases, as is illustrated at (g) in FIG. 14. In this case, too, a surface treatment can provide a reliable core. This method can manufacture multilayer waveguides, too.

Not only the recessed mold 10, but also a projecting mold 16 can be used as will be described with reference to FIG. 15. First, a clad 2 having a patterned recess is made by using the projecting mold 16 that has been surface-treated, as is illustrated at (a) to (e) in FIG. 15. Next, metal mirrors 4 and 6 are formed, a core 1 is then embedded and covered with a clad 3, as is depicted at (f) to (i) in FIG. 15. This method can manufacture a waveguide, too.

A method of manufacturing an optical waveguide according to this invention will be described in detail, with reference to Examples 10 to 13.

EXAMPLE 10

Preparation of the Mold

A recessed mold 10 was made as shown in FIG. 4. The mold 10 had a plurality of grooves that define the shape of an optical waveguide to manufacture. Each of the grooves had a height of 40 µm and a width ranging 20 m to 150 µm.

Manufacturing of Optical Waveguide 1

How an optical waveguide was manufactured will be explained, with reference to FIGS. 12 and 16. At first, a recessed mold 10 (made of silicone resin) was prepared as shown at (a) in FIG. 12. Next, an oxygen-plasma process was performed on a substrate having a patterned recess, as is illustrated at (b) in FIG. 12. The apparatus employed to carry out the process was OPM-SQ600 (model number) manufactured by Tokyo Ohka Kogyo Co., Ltd. In the process, oxygen was applied for 2 minutes at flow rate of 100 SCCM, pressure of 60 Pa and plasma power of 100 W.

Then, ultraviolet-curable epoxy resin was applied to the entire surface of the mold 10 in order to form core 1. All epoxy resin, but that part filled in the recess, was scraped with a spatula 46. Ultraviolet rays were applied to the entire surface, curing the core material 1'. Core patterns 1 are thereby formed.

Figure 16:
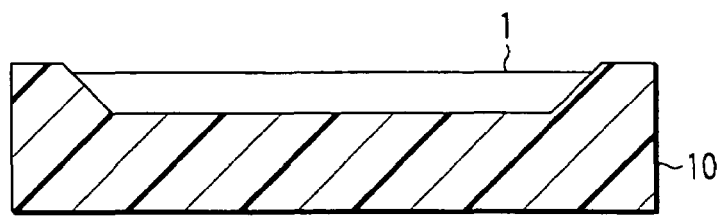
FIG. 16 is a sectional view of the core pattern provided in the second embodiment.

The core patterns 1 formed in grooves were continuous and had core widths ranging from 20 μm to 150 μm as is desired, shown in FIG. 16.

Meanwhile, a substrate 20 (made of glass) was prepared as shown at (e) in FIG. 12. Ultraviolet-curable epoxy resin was applied, as clad material 2', to the entire surface of the substrate 20 by mean of spin coating.

As shown at (f) in FIG. 12, the mold 10 and the clad 2 are laid one on the other. Ultraviolet rays are applied through the substrate 20, thus bonding the core pattern 1' and the clad material 2' to each other. At the same time, the clad material 2' was cured, forming a clad 2.

The recessed mold 10 is peeled off as is depicted at (g) in FIG. 12. Then, Al is deposited on the inclined surfaces by means of deposition through mask, thereby forming mirrors 4 and 6. Further, as shown at (h) in FIG. 12, ultraviolet-curable epoxy resin, or clad material 3', was applied to the entire surface of the resultant structure. Ultraviolet rays were then applied, thus manufacturing an optical waveguide 7.

EXAMPLE 11

Manufacturing of Optical Waveguide 2

The contact angle of the core material to the mold was measured, while maintaining the conditions of oxygen-plasma process, i.e., the oxygen flow rate at 100 SCCM and the pressure at 60 Pa, and changing the plasma power ranging from 20 W to 400 W and the process time ranging from 1 second to 10 minutes.

Figure 17:
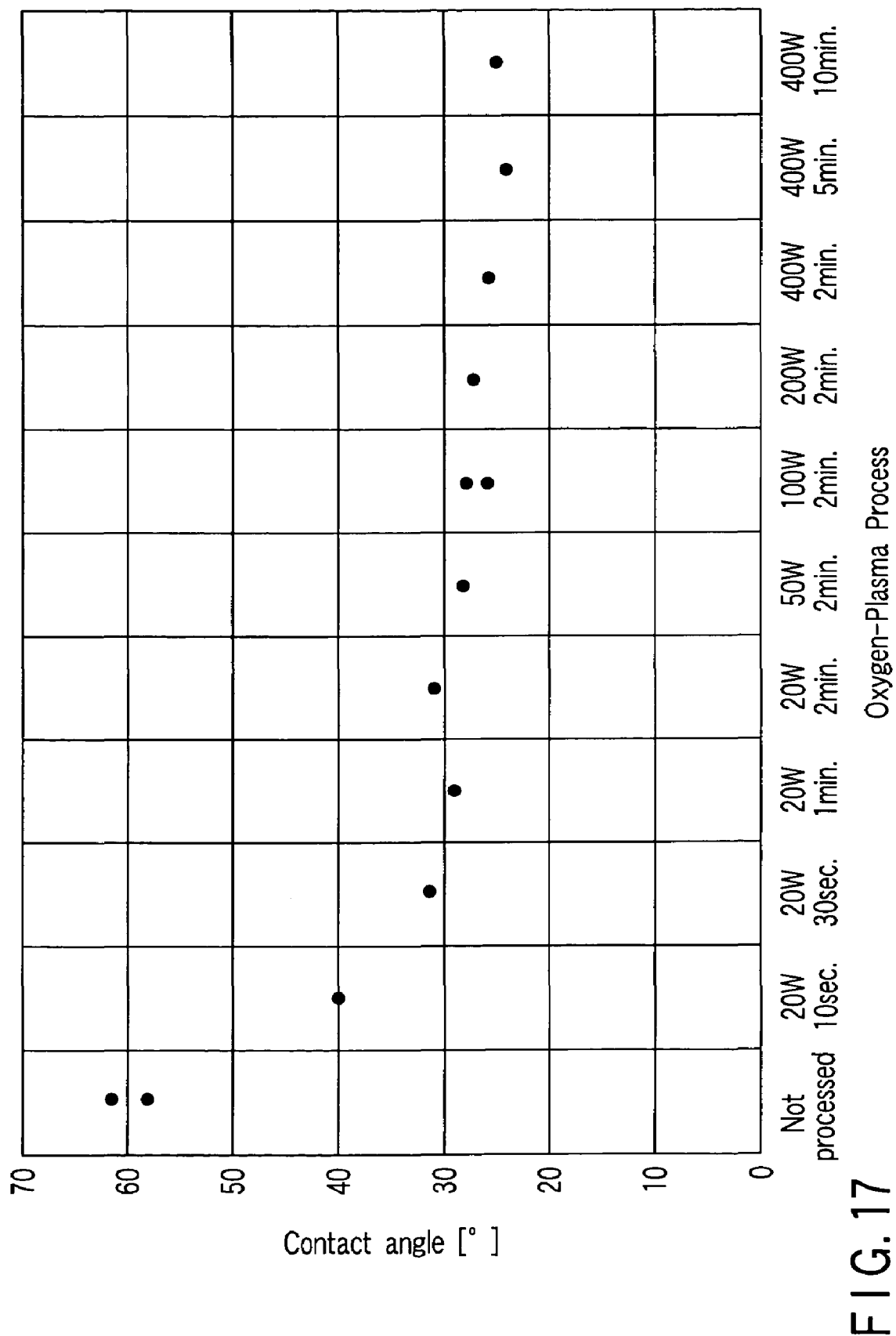
FIG. 17 is a diagram explaining how the contact angle changes as the oxygen-plasma process proceeds in manufacturing the second embodiment.

The results were shown in FIG. 17. The angle was about 60° when the core material was not processed yet. After the core material was subjected to the oxygen-plasma process, the angle changed to about 400 to 25°. Whichever recessed mold 10 that had been subjected to the oxygen-plasma process illustrated in FIG. 17 was used, an optical waveguide could be manufactured in the same way as Example 10.

EXAMPLE 12

Manufacturing of Optical Waveguide 3

How an optical waveguide was manufactured will be explained, with reference to FIG. 14. First, a recessed mold 10 was prepared in the same way as in Example 10, as is illustrated at (a) in FIG. 14. Then, as depicted at (b) in FIG. 14, oxygen-plasma process was performed on the recessed mold 10.

In the meantime, a substrate 20 (made of glass) was prepared as shown at (c) in FIG. 14. Ultraviolet-curable epoxy resin was applied, as clad material 2', to the entire surface of the substrate 20 by mean of spin coating, and UV-cured.

Then, as shown at (d) and (e) in FIG. 14, core material 1' is applied between the recessed mold 10 and the substrate 20 having a clad 2. Ultraviolet rays were applied through the substrate 20, thus forming a core pattern 1.

After peeling the recessed mold 10, Al was deposited on the inclined surfaces by means of masked vapor deposition, forming metal mirrors 4 and 6 as illustrated at (f) in FIG. 14. As shown at (g) in FIG. 14, ultraviolet-curable epoxy resin was applied, as clad material 3', on the entire surface. Ultraviolet rays were applied, curing the clad material. Thus, an optical waveguide 7 was manufactured.

EXAMPLE 13

Manufacturing of Optical Waveguide 4

This example will be explained with reference to FIG. 15. First, a projecting mold 16 (made of silicone) was prepared as shown at (a) in FIG. 15, by a method similar to the method of preparing Example 10. Then, as depicted at (b) in FIG. 15, an oxygen-plasma process was performed on the projecting mold 16.

Figure 15:
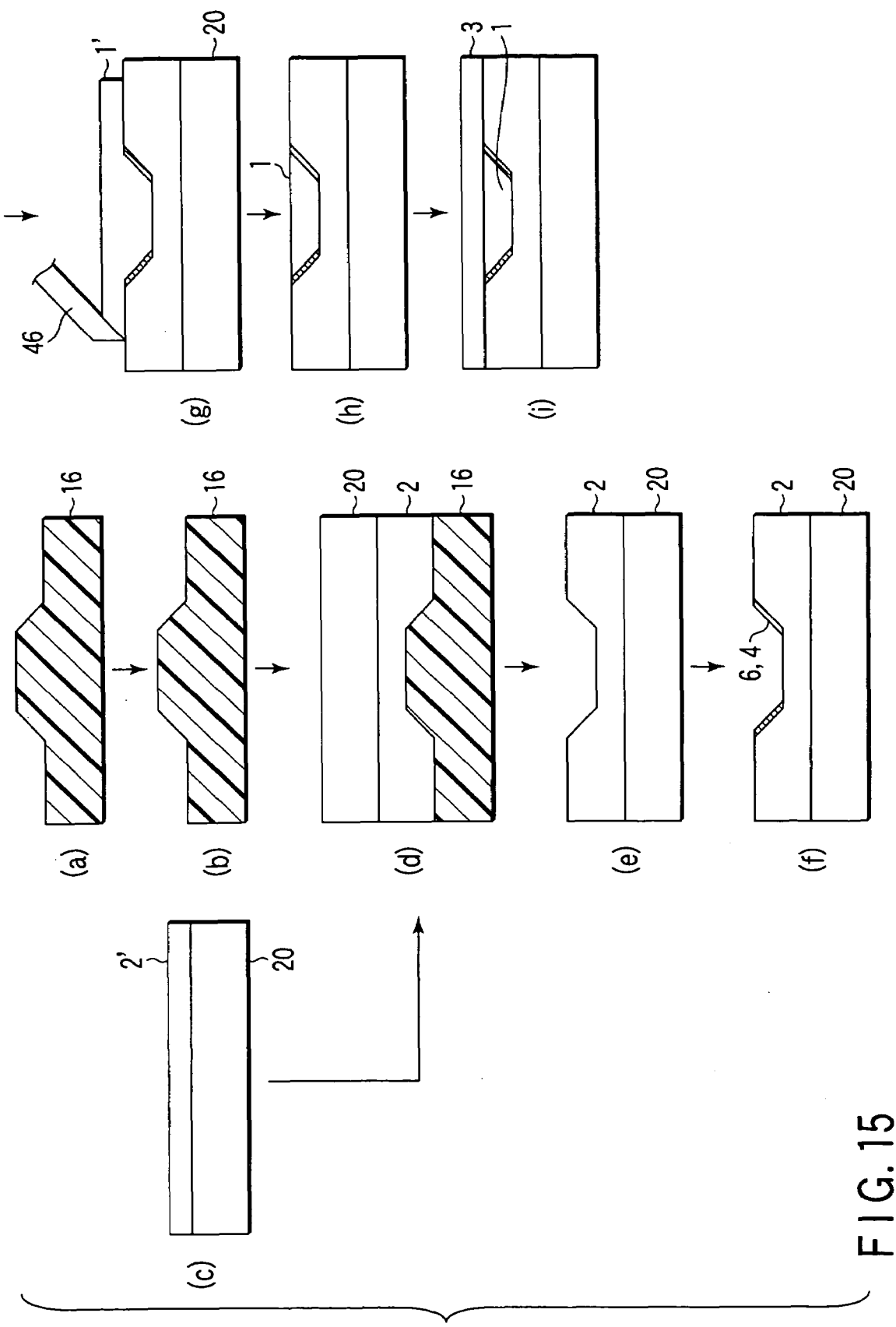

Meanwhile, a substrate 20 (made of glass) was prepared as shown at (c) in FIG. 15. Ultraviolet-curable epoxy resin was applied, as clad material 2', to the entire surface by means of spin coating. As shown at (d) in FIG. 15, the substrate 20 was laid on the projecting mold 16, with the clad material 2' contacting the mold 16. Ultraviolet rays were applied, transforming the material 2' to a clad 2.

Then, as depicted at (e) in FIG. 15, the projection mold 16 is peeled off. Al was deposited on the inclined surfaces by means of masked vapor deposition, forming metal mirrors 4 and 6 as illustrated at (f) in FIG. 15.

Further, as shown at (g) to (h) in FIG. 15, ultraviolet-curable epoxy resin was applied, as clad material 1', on the entire surface. All epoxy resin, but that part filled in the recess, was scraped with a spatula 46. Ultraviolet rays are applied to the entire surface, curing the core material 1'. A core pattern 1 is thereby formed.

Finally, as shown at (i) in FIG. 15, ultraviolet-curable epoxy resin was applied, as clad material 3', on the entire surface. Ultraviolet rays are applied, curing the core material 3'. An optical waveguide 7 was thereby manufactured.

COMPARATIVE EXAMPLE

Manufacturing of Optical Waveguide 5

A comparative example will be described with reference to FIG. 18. First, a substrate 20 (made of silicone) having a patterned recess was prepared as shown at (a) in FIG. 18, in the same way as in Example 10.

Figure 18:
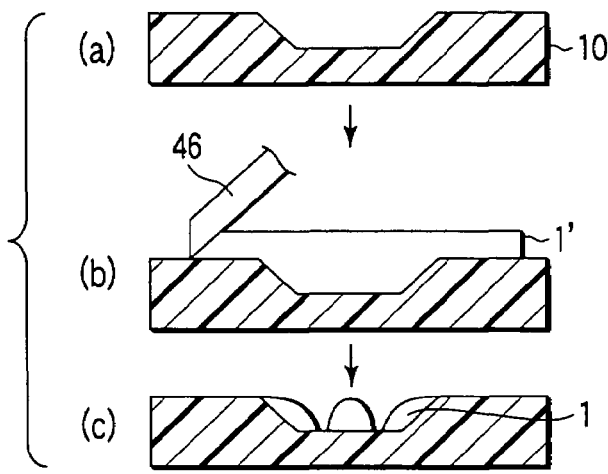
FIG. 18 is sectional views showing a method of manufacturing an optical waveguide prepared for comparison with the optical waveguide according to the second embodiment.

Next, as depicted at (b) and (c) in FIG. 18, ultraviolet-curable epoxy resin was applied, as core material 1', on the entire surface, not carrying out a surface treatment as in Example 10. All epoxy resin, but that part filled in the recess, was scraped with a spatula 46. Ultraviolet rays are applied to the entire surface, curing the core material 1'. A core pattern 1 is thereby formed.

Core patterns 1 having a width of 100 μm or more and being continuous could easily be made. However, core patterns 1 having a width of 50 µm or less were hard to be continuous. Core patterns having such a small width, if formed, were discontinuous.

As described above, a reliable core pattern can easily be made in the second embodiment and in Examples 10 to 13. This is because the substrate undergoes a surface treatment to enhance its affinity for the core material, before the core material is filled in the patterned recess of the substrate. Since the core pattern has inclined surfaces on which optical-path changing mirrors will be provided, no process must be performed to make such inclined surfaces after molding. Metal can therefore be vapor-deposited on the inclined surfaces right after the core pattern has been made. In addition, the use efficiency of core material is as high as in the first embodiment.

Thus, polymer optical waveguides that are reliable can be manufactured at low cost.

THIRD EMBODIMENT

Figure 47:
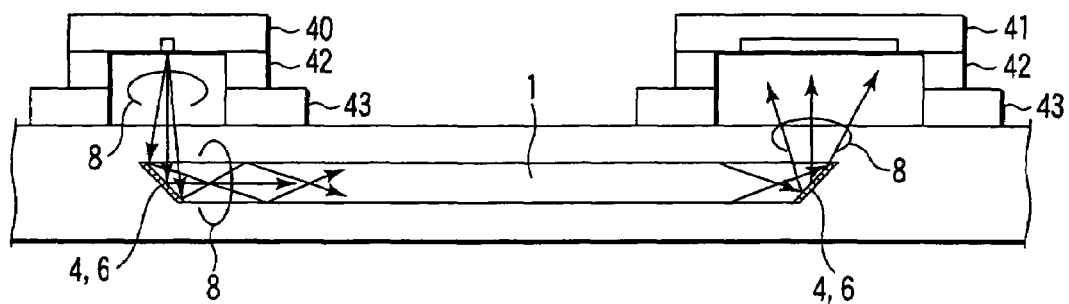
FIG. 47 is a sectional view of a conventional optical waveguide.

A third embodiment of this invention will be described. In the third embodiment, the light from the light source is converted to parallel beams, which go into a core 1 and improve the connection efficiency. If the plane mirrors 4 and 6 as depicted in FIG. 47 were used, the light from the light-emitting element 40 goes into the core 1, preserving its angular distribution. The signal light 8 propagates, preserving the angular distribution, and diverges at a large angle when it emerges.

Figure 19:
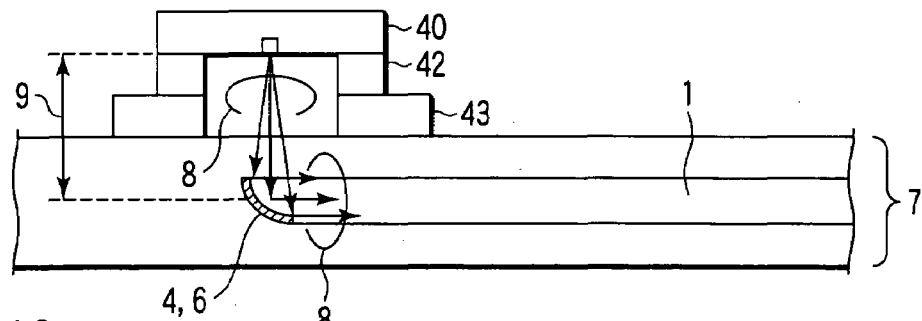
FIGS. 19 and 20 are sectional views schematically illustrating an optical waveguide according to a third embodiment of the present invention.

When the mirrors 4 and 6 are concave mirrors, having the focal point set almost at the light-emitting point of the light-emitting element 40, the light beams reflected by the concave mirrors go parallel into the core, as illustrated in FIG. 19. The light emerging from the core diverges but at a small angle. This increases the connection efficiency of light, from the core to the light-receiving element.

FIG. 19 is a sectional view, showing the focusing of light in only the plane of the drawing. If the concave mirror is curved in the plane perpendicular to the drawing, the light is focused in this plane, too. Either characterizes the present invention. When the concave mirrors have a radius of curvature of 300 µm, the focal distance is about 100 µm. The phrase "the focal point set almost at the light-emitting point" means that the component positions in the ±30% region of focal distance.

The term "focal distance" usually means the distance that parallel beams applied perpendicular to a mirror and reflected therefrom travel until they meet at a point. For this embodiment of the invention, however, the term means the distance that parallel beams applied at 45 to a mirror and reflected therefrom travel until they meet at a point. The focal distance of this definition can not only be measured, but also be calculated from the shape of the mirror.

In the present embodiment, displacement tolerance of the light-receiving element 41 can be increased, by focusing the light from the core 1 to the light-receiving element 41. More precisely, concave mirrors 4 and 6 are so formed that their focal distance 9 is longer than half the distance between the light-receiving element 41 and the mirror. The light 8 can then be almost focused at the surface of the light-emitting element 41. Thus, the displacement tolerance increases. The displacement tolerance is maximal if the focal distance 9 is nearly equal to the distance between the concave mirrors and the light-receiving element 41.

Figure 20:
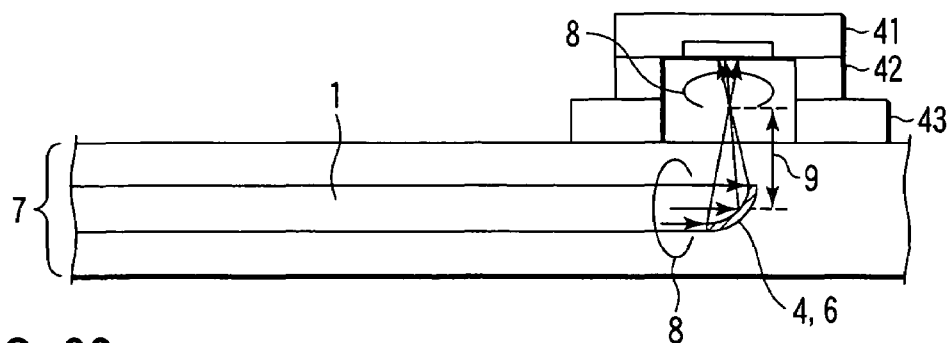

FIG. 20 is a sectional view, showing the focusing of light in only the plane of the drawing. If the concave mirror is curved in the plane perpendicular to the drawing, the light is focused in this plane, too. Either characterizes the present invention. Even if the light is focused in only the plane of the drawing or the plane perpendicular thereto, an advantage can be accomplished, which also characterizes this invention.

If the focal distance 9 is shorter than half the distance between each concave mirror and the light-receiving element 41, the light will diverge, reducing the displacement tolerance and thus decreasing the connection efficiency.

In most cases, the term "focal distance" means the distance from the center point of a curved mirror to the point, where light beams meets reflected by the mirror meets when parallel light beams are applied to the mirror. For the present embodiment, however, the term is used to mean the distance from the center point of a curved mirror to the point where light beams reflected by the mirror meet when parallel light beams are applied at 45° to the direction perpendicular to the mirror. The focal distance of this definition can not only be measured, but also be calculated on the basis of the shape of the mirror. The elements 40 and 41 can easily be adjusted in position, by changing the size of electrodes or spacers 42 and 43.

A method of manufacturing the optical waveguide having concave mirrors will be described briefly. At first, a pattern 32 is formed on a substrate 31 as shown at (a) in FIG. 21. The pattern 32 is made of photosensitive resin and has mirror-equivalent surfaces (convex surfaces) 4' at ends.

Figure 21:
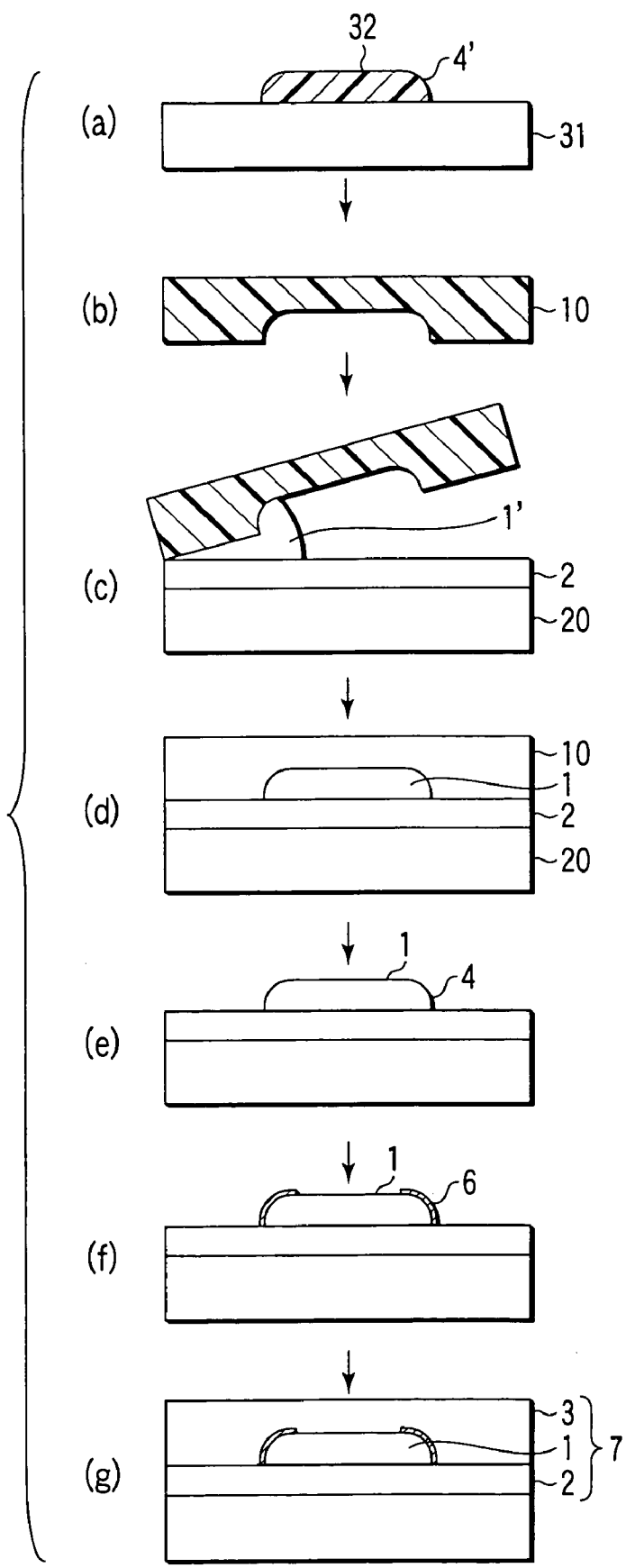
FIG. 21 is sectional views depicting a method of manufacturing the optical waveguide according to the third embodiment.

Next, using the pattern 32, a recessed mold 10 is formed as shown at (b) in FIG. 21. At least the surface region of the mold 10 is made of silicon resin. Using the recessed mold 10, an optical waveguide is manufactured as described below.

More specifically, core material 1' in the form of liquid is interposed between the recessed mold 10 and a substrate 20 having a clad 2, as illustrated at (c) in FIG. 21. The core material 1' is cured as depicted at (d) in FIG. 21. Then, as shown at (e) in FIG. 21, the recessed mold 10 is peeled off, providing a core pattern 1 that has mirror surfaces 4.

Next, as shown at (f) in FIG. 21, reflecting films 6 are formed on the mirror surfaces. Further, as depicted at (g) in FIG. 21, a clad 3 is formed, covering the entire surface of the resultant structure.

This method can produce a core pattern that has inclined convex surfaces at the ends. These inclined convex surfaces will be concave mirrors. Namely, the convex surfaces serve as convex mirrors for the light travelling in the core pattern. The reflecting films may be metal films or multi-layer dielectric films. Nonetheless, metal films are preferred because their fluctuation of thickness doesn't influence the reflection.

The pattern for forming the inclined convex surfaces can be made by the following three methods.

In the first method, photolithography, for example, is performed, forming a resist pattern made of photosensitive resin. Thereafter, as shown at (a) to (c) in FIG. 22, laser beams 33 are applied to either end of a photosensitive resin layer 32 formed on the substrate 31. A mask blocks some of the laser beams 33, casting a substantially circular shadow on the end of the resin layer 32. An end part of the resin layer 32 is thereby evaporated, forming a mirror-equivalent surface 4'. The surface 4' can collect light beams about the direction perpendicular to both traveling optical axes. The region outside the "substantially circular shadow" is an area that is irradiated with laser beams. The adjective phrase "substantially circular" means any curved lines including a quadric curve.

Figure 23:
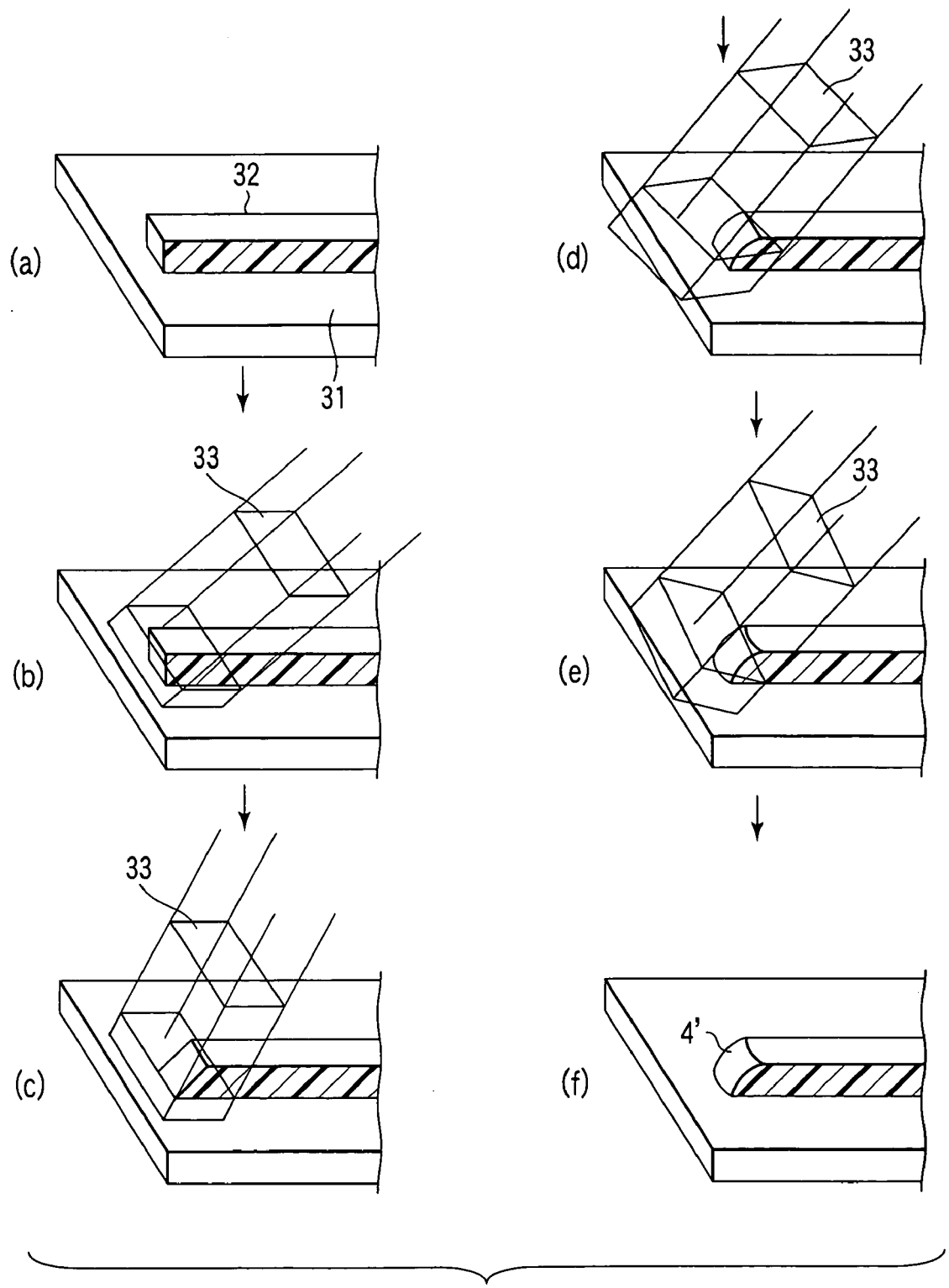

In the second method, photolithography is carried out, forming a resist pattern, as shown at (a) in FIG. 23. Then, as depicted at (b) to (f) in FIG. 23, a laser process is repeated several times, applying laser beams to either end of a resist, in a different direction each time. An inclined convex surface is therefore formed. Instead, the laser process may be repeated only a few times, each time applying laser beams 33 which have a substantially circular shadow, as is illustrated at (a) to (d) in FIG. 24.

Figure 25:
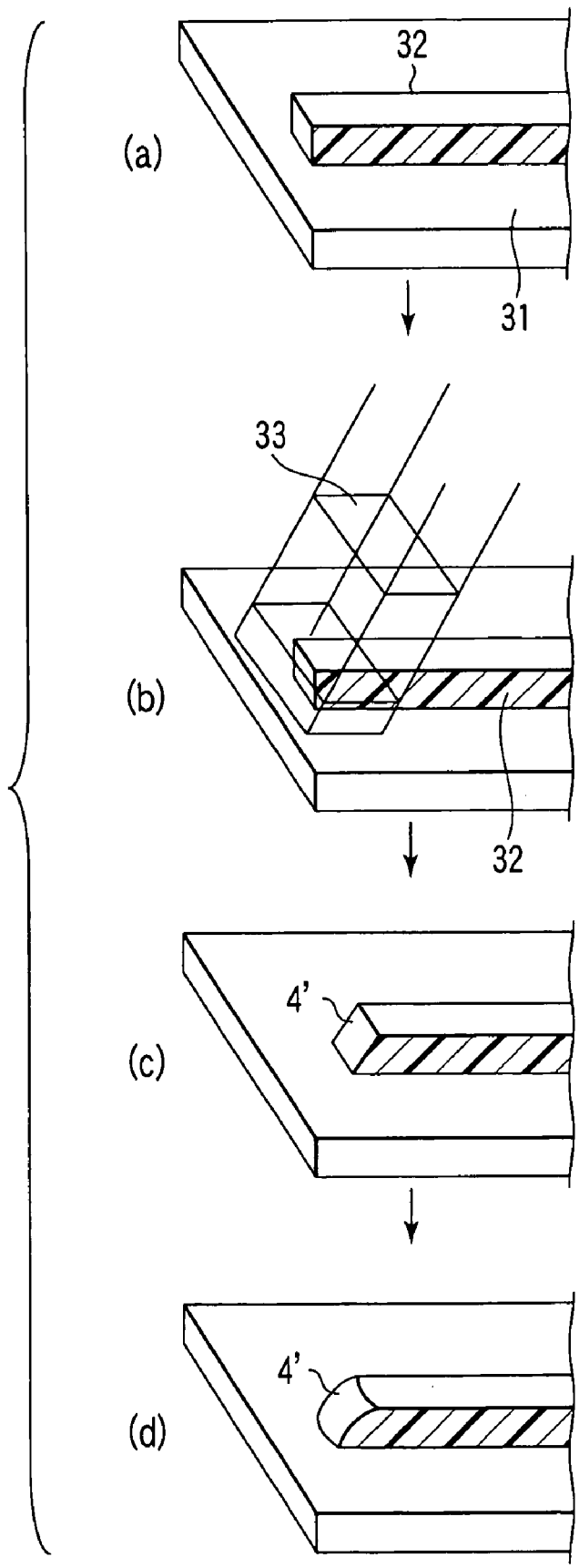

In the third method, photolithography is carried out, forming a resist pattern as shown at (a) in FIG. 25. Thereafter, a laser process is performed, forming an inclined surface, as illustrated at (b) and (c) in FIG. 25. Then, the temperature is raised, causing the resist to flow, forming a convex surface. The resist can be of either a positive type or a negative type.

EXAMPLE 14

Laser Process Casting a Substantially Circular Shadow

Figure 22:
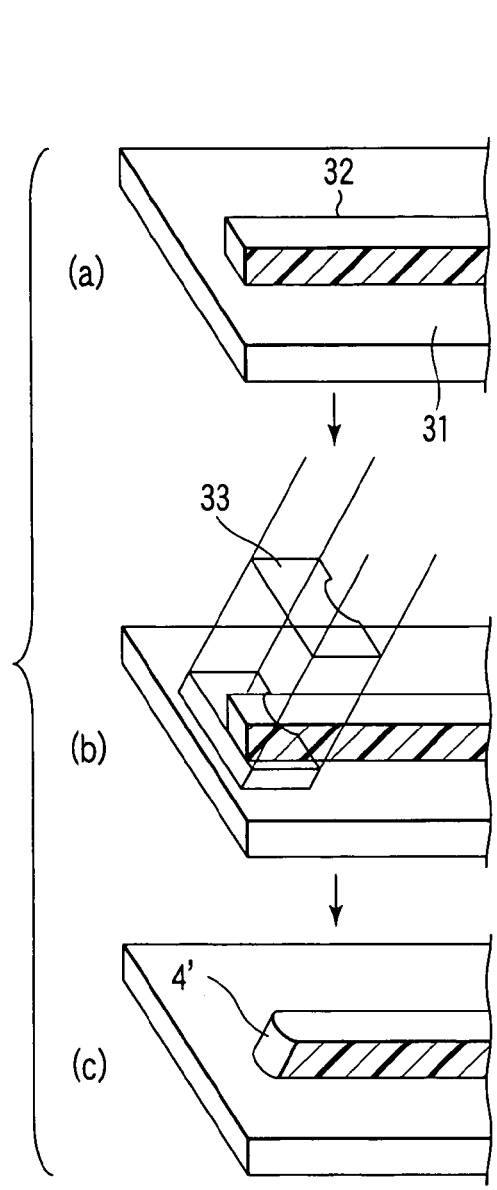
FIGS. 22 to 25 are perspective views explaining a method of forming a recessed surface in the third embodiment.

Example 14 of the third embodiment will be described, with reference to FIG. 22. As depicted at (a) in FIG. 22, a dry film resist was laid on a substrate 31 (made of glass). The film resist was then exposed to light through photomask and further developed. A photosensitive resin layer 32 was thereby shaped into a core pattern and its height and width were 40 µm.

Next, laser beams 33 were obliquely applied, from a KrF excimer laser. A mask blocks some of these beams, casting a substantially circular shadow on either end of the resin layer 32, as is illustrated at (b) in FIG. 22. A surface 4' equivalent to a convex mirror is thereby formed at either end of the resin layer 32. A projecting mold 30 is thereby provided. The circular shadow defined by the laser beams blocked by the mask had a radius of curvature of 300 µm. The resist processed had a radius of curvature of about 300 µm.

EXAMPLE 15

Irradiation Repeated Several Times

Example 15 according to the third embodiment will be described with reference to FIG. 24. As shown at (a) in FIG. 24, a dry film resist was laminated to the substrate 31 (made of glass). Using the resist, a photosensitive resin layer 32 was exposed to light and developed. A core pattern was thereby formed, height and width of which were 40 µm.

Next, laser beams 33 were obliquely applied, from a KrF excimer laser. A mask was used, blocking some of these beams, casting a substantially circular shadow on either end of the resin layer 32, as is illustrated at (b) in FIG. 24. Thus, a laser process was carried out for the first time.

Figure 24:
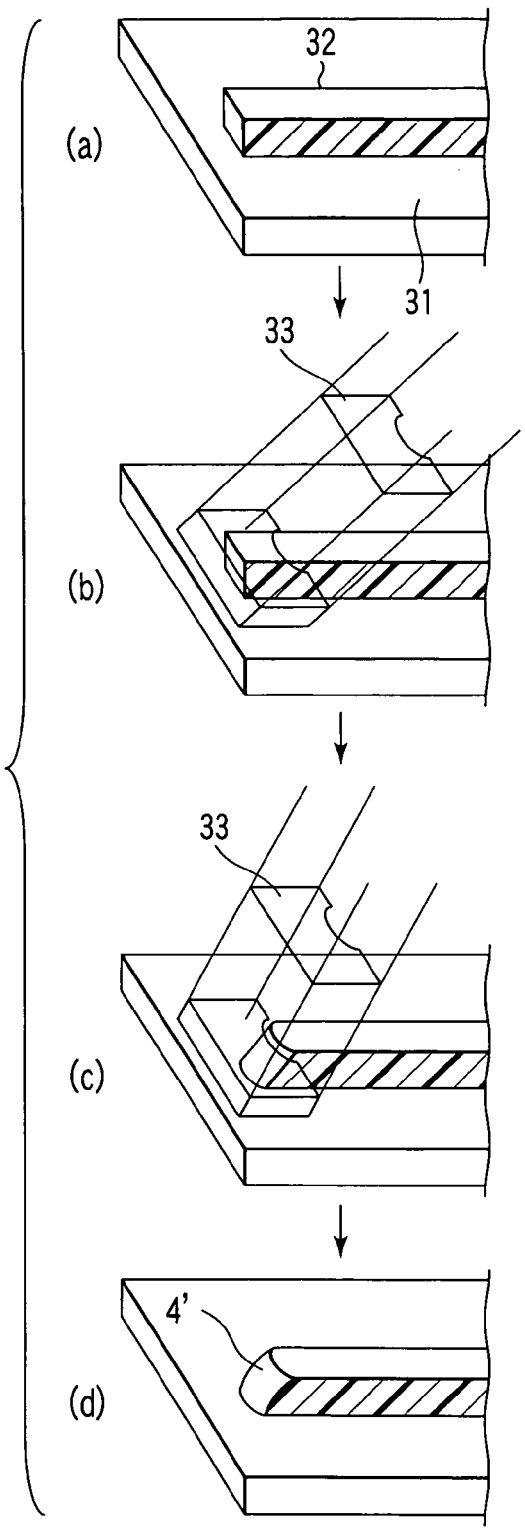

Then, as shown at (c) in FIG. 24, the laser process was performed for the second time. At this time, laser beams were obliquely applied, at an angle that was 100 more or less than in the laser process performed first. As a result, a surface 4' equivalent to an inclined convex mirror was formed as is illustrated at (d) in FIG. 24. The circular shadow defined by the laser beams 33 blocked by the mask had a radius of curvature of 300 µm. The resist processed had a radius of curvature of about 300 µm, too.

EXAMPLE 16

Reflow

Example 16 according to the third embodiment will be described with reference to FIG. 25. As shown at (a) in FIG. 25, a resist in liquid state was applied to a substrate 31 (made of glass). Using the resist, a photosensitive resin layer 32 was exposed to light and developed. A core pattern was thereby formed, height and width of which were 40 µm.

Next, laser beams 33 were obliquely applied, from a KrF excimer laser. A mask was used, blocking some of these beams, casting a rectangular shadow on either end of the resin layer 32, as is illustrated at (b) in FIG. 25. Thus, an inclined flat surface was formed at either end of the layer 32. Then, a heat treatment was performed at 130° C. for 10 minutes. As a result, the resin flowed at the end of the layer 32, forming surface 4, equivalent to an inclined convex mirror, as shown at (c) in FIG. 25. The resist processed had a radius of curvature of about 300 µm.

EXAMPLE 17

Manufacturing of the Optical Waveguide

Silicone resin in liquid state was applied to the projecting mold 30 depicted at (a) in FIG. 21 made by the method of Example 15. The resin was cured at room temperature. Then, the projecting mold 30 was peeled off. A recessed mold 10 was thereby made as is illustrated at (b) in FIG. 21.

Next, a substrate 20 (made of glass) was prepared, and ultraviolet-curable epoxy resin was applied, as clad material 2', to the entire surface by means of spin coating. Ultraviolet rays are applied to the entire surface at intensity of 4 J/cm$^2$. The clad material 2' was thereby cured, forming a film (not shown) having a thickness of 30 µm.

Then, as shown at (c) in FIG. 21, ultraviolet-curable epoxy resin was dripped, as core material 1' onto the recessed mold 10. The substrate 20 having a clad 2 was laid on the recessed mold 10 and pressed. As shown at (d) in FIG. 21, the core material 1' was thereby embedded into the recess of the recessed mold 10. In this condition, ultraviolet rays 12 were applied through the substrate 20 at intensity of 8 J/cm$^2$. The core material 1' was thereby cured, forming a core pattern 1. Then, the recessed mold 10 was peeled off as shown at (e) in FIG. 21. As depicted at (f) in FIG. 21, Al was deposited on the inclined surfaces 4 by means of masked vapor deposition. Further, as shown at (g) in FIG. 21, ultraviolet-curable epoxy resin was applied as second clad material 3'. Ultraviolet rays were applied at intensity of 4 J/cm$^2$ to the entire surface. An optical waveguide 7 was thereby formed.

EXAMPLE 18

Evaluation of the Input-Side Mirror

An optical waveguide having a concave mirror at one end and a plane mirror at the other end was manufactured by the method of Example 17. A vertical-cavity surface-emitting laser (VCSEL) that emits a beam having a wavelength of 850 nm was positioned at a distance of 100 µm from the center of the waveguide at which the concave mirror was provided (i.e., 50 µm from the surface of the waveguide).

On the other hand, a PD having a diameter of 80 µm was located at a distance of 100 µm from the center of the waveguide at which the plane mirror was provided (i.e., 50 μm from the surface of the waveguide).

The space between the VCSEL and the optical waveguide and the space between the optical waveguide and the PD were filled with transparent resin that has almost the same refractive index as the clad.

The optical signal output from the VCSEL was reflected by the concave mirror, traveled in the core and reflected by the plane mirror. The optical signal was then applied to the PD. The signal light the PD received had intensity 1.5 times greater than the signal light that emerged from a waveguide that had plane mirrors at both ends.

EXAMPLE 19

Evaluation of the Output-Side Mirror

An optical waveguide having concave mirrors at both ends was manufactured by the method of Example 17. A VCSEL that emits a beam having a wavelength of 850 nm and a PD having a diameter of 80 μm was positioned at a distance of 100 μm from the center of the waveguide (i.e., 50 μm from the surface of the waveguide), respectively.

The space between the VCSEL and the optical waveguide was filled with transparent resin that has almost the same refractive index as the clad. The space between the optical waveguide and the PD was filled with a liquid that has almost the same refractive index as the clad.

The optical signal output from the VCSEL was reflected by the concave mirror at one end, traveled in the core and reflected by the other end. The optical signal was then applied to the PD.

The tolerance of the displacement transverse to the PD (i.e., the displacement at which the signal intensity falls to 90%) was 30 μm. On the other hand, the displacement tolerance for the waveguide having a plane mirror at the output end was 10 μm.

Examples 14 to 19 of the third embodiment, described above, are advantageous in the following respects.

First, the simple structure having concave mirrors used as optical-path changing mirrors can enhance the connection efficiency and can increase the displacement tolerance.

Secondly, the core having concave mirrors can easily be made by using a mold.

Thirdly, the laser process casting a substantially circular shadow, the laser process performed repeatedly, or the reflow technique can manufacture a mold of core pattern having concave mirrors.

FOURTH EMBODIMENT

A fourth embodiment of this invention will be described. The fourth embodiment is designed so that optical waveguides may easily be mounted.

Figure 26:
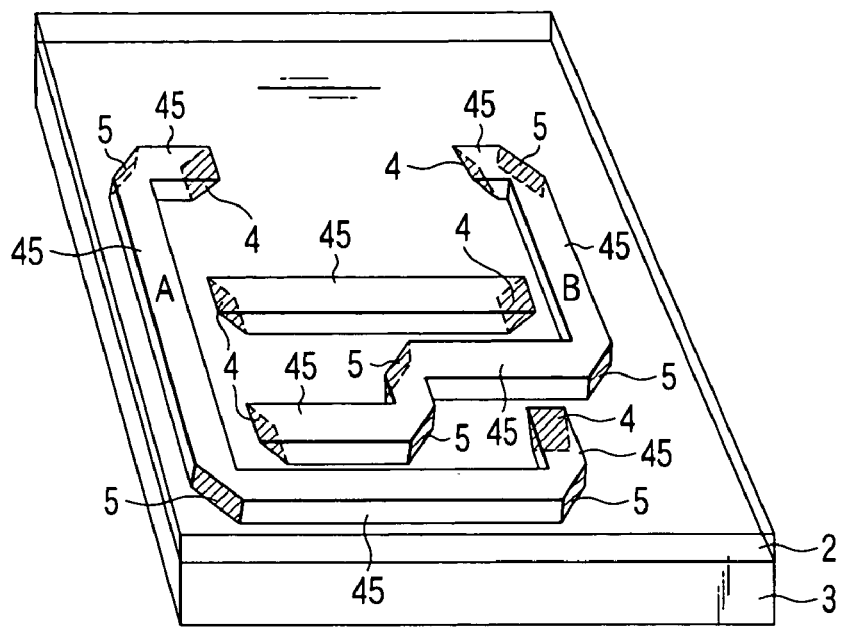
FIG. 26 is a perspective view illustrating an optical waveguide according to a fourth embodiment of the invention.

A first characterizing feature of the fourth embodiment is that, as shown in FIG. 26, at least two straight waveguides 45 included in the first core A extend in almost the same direction as at least one straight waveguide 45 included in the other core B.

That some waveguides extend in almost the same direction as the other waveguides means the difference in direction falls within 10°. An in-plane mirror 5 is provided at the intersection of the two straight waveguides included in the first core. The in-plane mirror 5 connects the straight waveguides to each other. Preferably, an inclined mirror 4 is provided at the end of the waveguide, to connect the waveguide to an external element.

This structure has the following merits.

The first merit is a decrease in the minimum area that is required to change the path direction. This is accomplished by the use of the in-plane mirror 5.

The second merit is caused by a decrease in the number of directions in which the straight waveguide 45 may extend. If the number of directions is reduced to two, for example, the number of direction of the in-plane mirror can be decreases to four, and the number of angles at which the optical path is changed can be reduced to two.

Figure 27A:
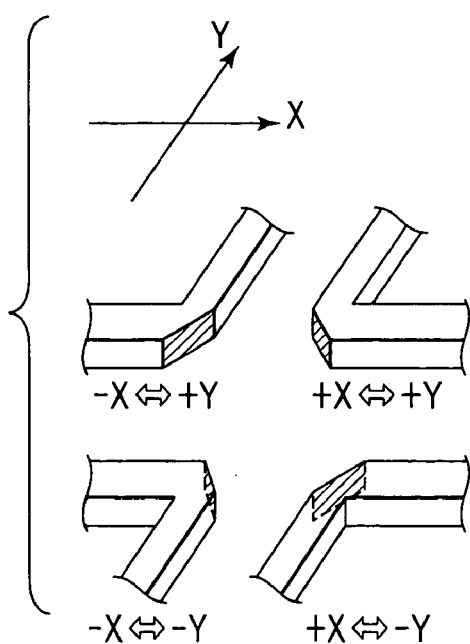
FIGS. 27A and 27B and FIGS. 28A and 28B show various types of in-plane mirrors and various types of inclined mirrors, which may be used in the fourth embodiment.

For example, the straight waveguide 45 may extend in the X-direction and the Y-direction as is illustrated in FIG. 27A. Then, the in-plane mirror 5 can change the direction of the optical path in four different manners. That is, it changes the direction from +X-direction to +Y-direction, or vice versa; from +X-direction to −Y-direction, or vice versa; from −X-direction to +Y-direction, or vice versa; or from −X-direction to −Y-direction, or vice versa. The angle by which the +X-direction is changed to +Y-direction, or vice versa, is equal to the angle by which the −X-direction is changed to the −Y-direction, or vice versa. And the angle by which the +X-direction is changed to the −Y-direction, or vise versa, is equal to the angle by which the −X-direction is changed to the +Y-direction, or vice versa. Thus, there are two angles by which one direction is changed to another. As FIG. 27B shows, each inclined mirror can extend in four directions, i.e., +X-direction, −X-direction, +Y-direction and −Y-direction.

Figure 27B:
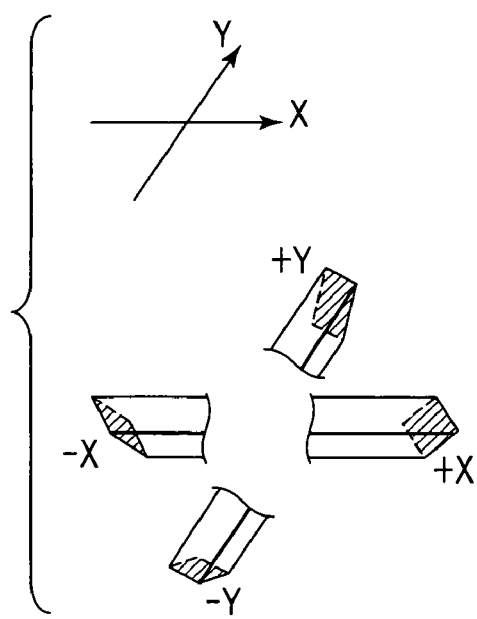
Figure 28A:
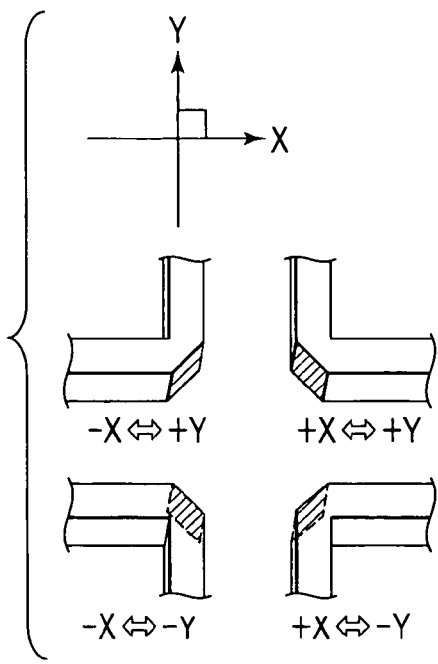
Figure 28B:
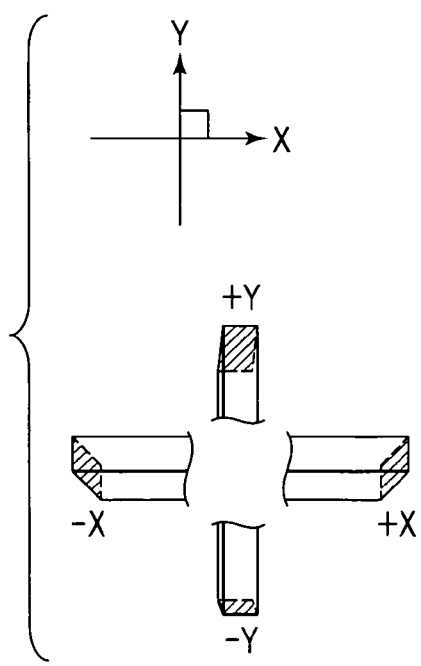

As displayed in FIGS. 27A and 27B, the X-direction and the Y-direction need not intersect at right angles. Nonetheless, if they intersect at right angles as shown in FIG. 28A, the in-plane mirror will change the direction of the optical path by an angle (i.e., 90°). As FIG. 28B shows, four types of inclined mirrors 4 are available.

This configuration renders it easy to provide a surface 5' and a surface 4' that are equivalent to an inclined mirror and an inclined mirror, respectively.

To form mirror-equivalent surfaces at a time by means of a laser process, the process needs to be repeated four times to form surfaces 5' equivalent to the in-plane mirrors, and four times to form surfaces 4' equivalent to the inclined mirrors. Namely, it suffices to repeat the laser process only eight times in all. If the surfaces 5' equivalent to the in-plane mirrors are formed by another method, the laser process needs to be carried out four times only.

A laser may be used to process a sample point by point. In this case, too, it suffices to set the sample only eight times. To form the surfaces equivalent to in-plane mirrors, it suffices to set the sample only four times.

The sample needs to be set but less times, depending on the pattern of the sample. The structure of FIG. 26, for example, has four in-plane mirrors and three inclined mirrors. To produce a mold for this structure, the laser process must be repeated seven times, or the sample must set seven times. If the surfaces 5' equivalent to the in-plane mirrors are formed by another method, it suffices to perform the laser process or the sample setting only three times.

Figure 48:
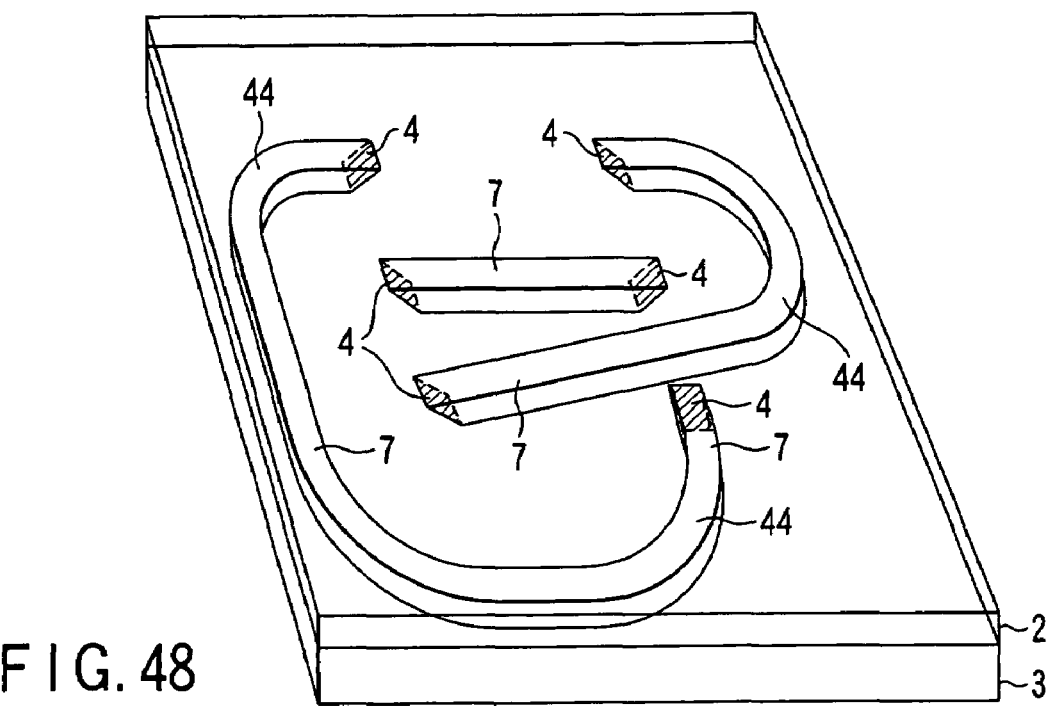
FIG. 48 is a perspective view of an conventional optical waveguide.
Figure 49:
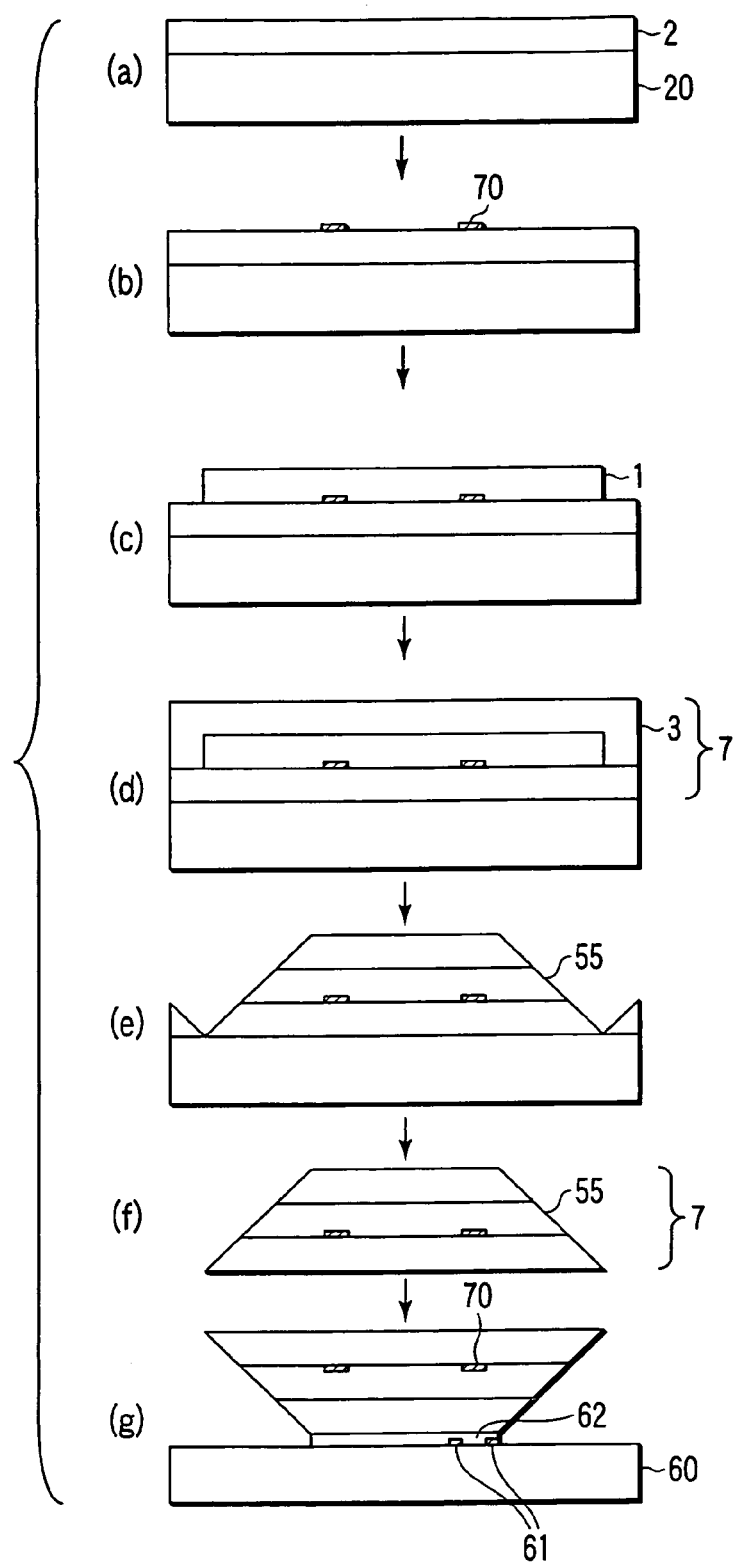
FIG. 49 is sectional views showing a conventional method of manufacturing an optical waveguide.

By contrast, the waveguide needs large area and the laser process must be repeated many times, or the sample must be set many times, in order to manufacture the conventional waveguide shown in FIG. 48. This is because this waveguide has inclined mirrors that are orientated in various directions.

A second characterizing feature of the fourth embodiment is the core width of the in-plane mirrors 5. As FIG. 29 shows, a core 1 is formed on the first clad 2. Reflecting films 6 are formed on those parts of the core 1 which will be inclined mirrors 4 and in-plane mirrors 5. A second clad 3 is then formed, covering the first clad 2 and the core 1. In this structure, the shapes of the mirrors are important in the manufacture of this waveguide.

Figure 30:
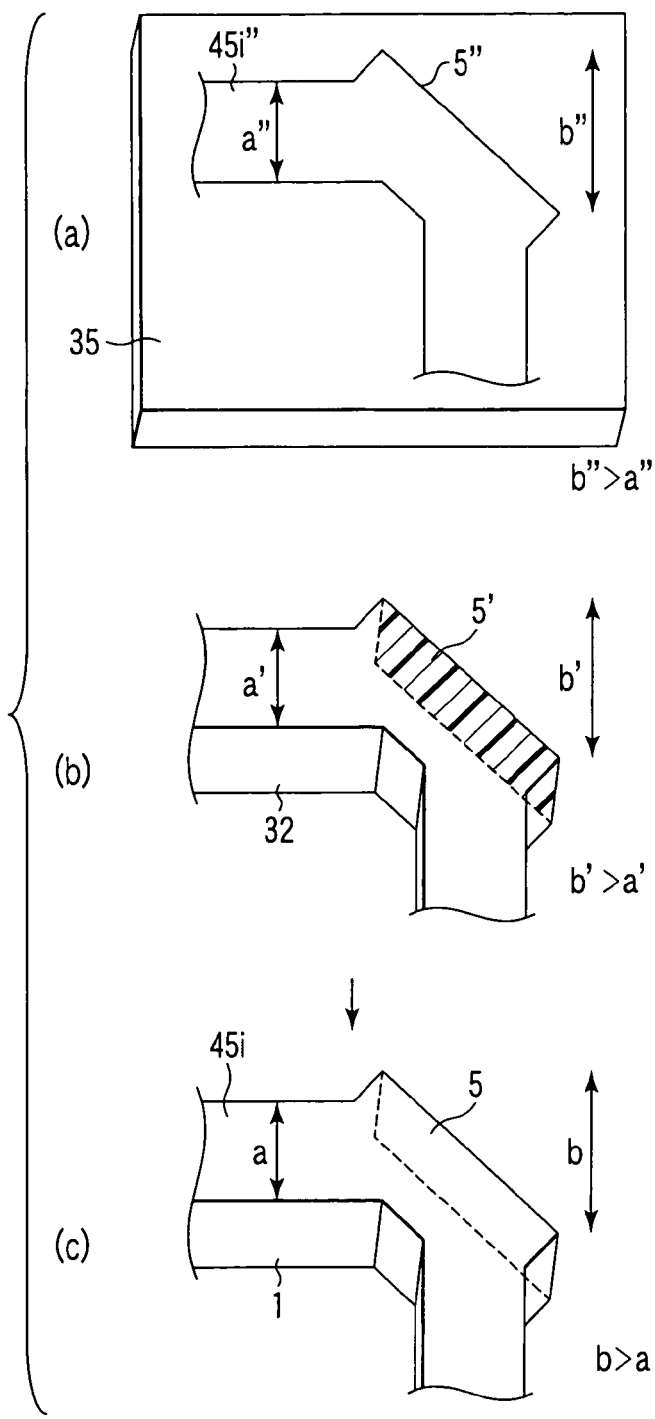
FIGS. 30 and 31 are perspective views showing the shape of the in-plane mirror used in the fourth embodiment and a method of manufacturing the in-plane mirror.

As shown in FIG. 30, the projection of the in-plane mirror 5, on a plane extending at right angles to the input-side straight waveguide 45i, has a width b that is greater than the width a of the core of the input-side straight waveguide 45i. This reduces a loss at the in-plane mirror 5.

Figure 31:
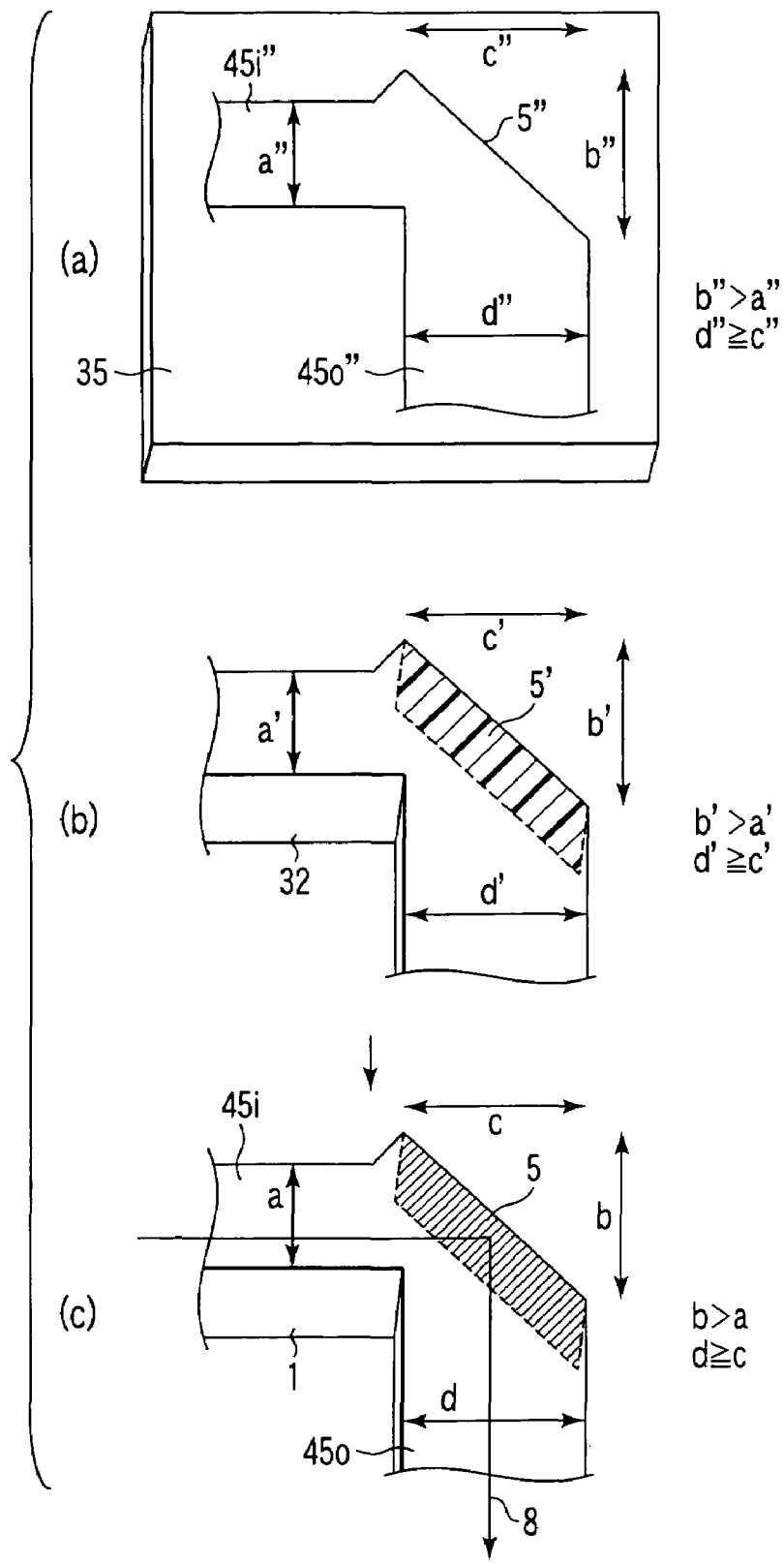

Moreover, the output-side straight waveguide 45o may have a core width d greater than the projection width c of the in-plane mirror 5 on a plane perpendicular to the output-side straight waveguide 45o, as is illustrated in FIG. 31.

Why it should be so will be explained. In any waveguide, light guided at a little cladside from the boundary, so most of light travels in the core, but a little in cladside. If the width b is equal to the projection width a of the input-side straight waveguide 45i, the part of the light in the clad would not be reflected. It would inevitably be lost or become a crosstalk.

In the present embodiment, a loss of light is small. This is because the light in the clad temporarily enters the core since the projection width b of the in-plane mirror 5 on the plane perpendicular to the input-side straight waveguide 45i, is greater than the core width a of the input-side straight waveguide 45i.

There is another function. An example will be described, in which the core pattern is produced by means of photolithography. If a projecting mold 30 is be made by using a photomask 35 in which b"=a" as shown at (a) in FIG. 32, b' will be less than a' in the projecting mold 30 as is illustrated at (b) FIG. 32. This phenomenon is likely to occur due to diffraction and defocus or fast development at any bending portion.

Width b" of the photomask 35 pertains to the mask pattern 5" of the in-plane mirror, projected on the input-side straight waveguide. Width a" of the photomask 35 pertains to the mask pattern 45i of the input-side waveguide 45i. Width b' of the photo-sensitive resin layer 32 of the projecting mold 30 pertains to the surface 5' projected, which is equivalent to the in-plane mirror located at the bending portion. Width a' of the photosensitive resin layer 32 of the projecting mold 30 is the width a' of the straight waveguide.

There is the tendency of: b'<a'. Hence, the width b of the in-plane mirror 5 of the core 1, projected, is less than the width a of the straight waveguide.

This phenomenon can be cancelled out if the core pattern of the photomask 35 is so shaped that width b" is greater than width a" (b">a") as depicted in FIG. 30 and FIG. 31.

In the photolithography performed to from a core pattern, it is desirable to use a plurality of straight waveguide patterns and a photomask having the pattern of the in-plane mirror like this.

Figure 33:
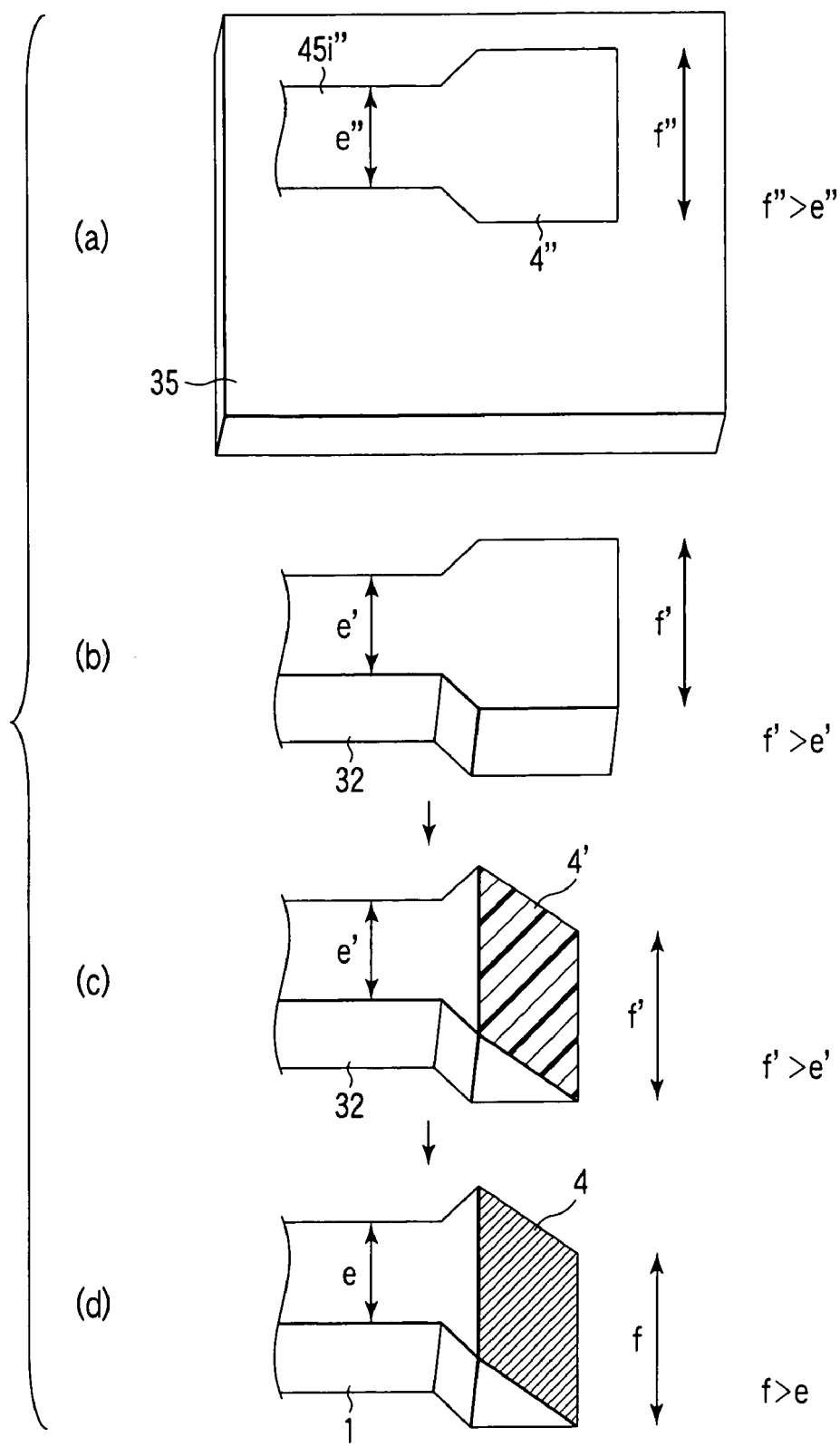
FIGS. 33 and 34 are perspective views illustrating the shape of an inclined mirror provided in the fourth embodiment and explaining a method of forming the inclined mirror.
Figure 34:
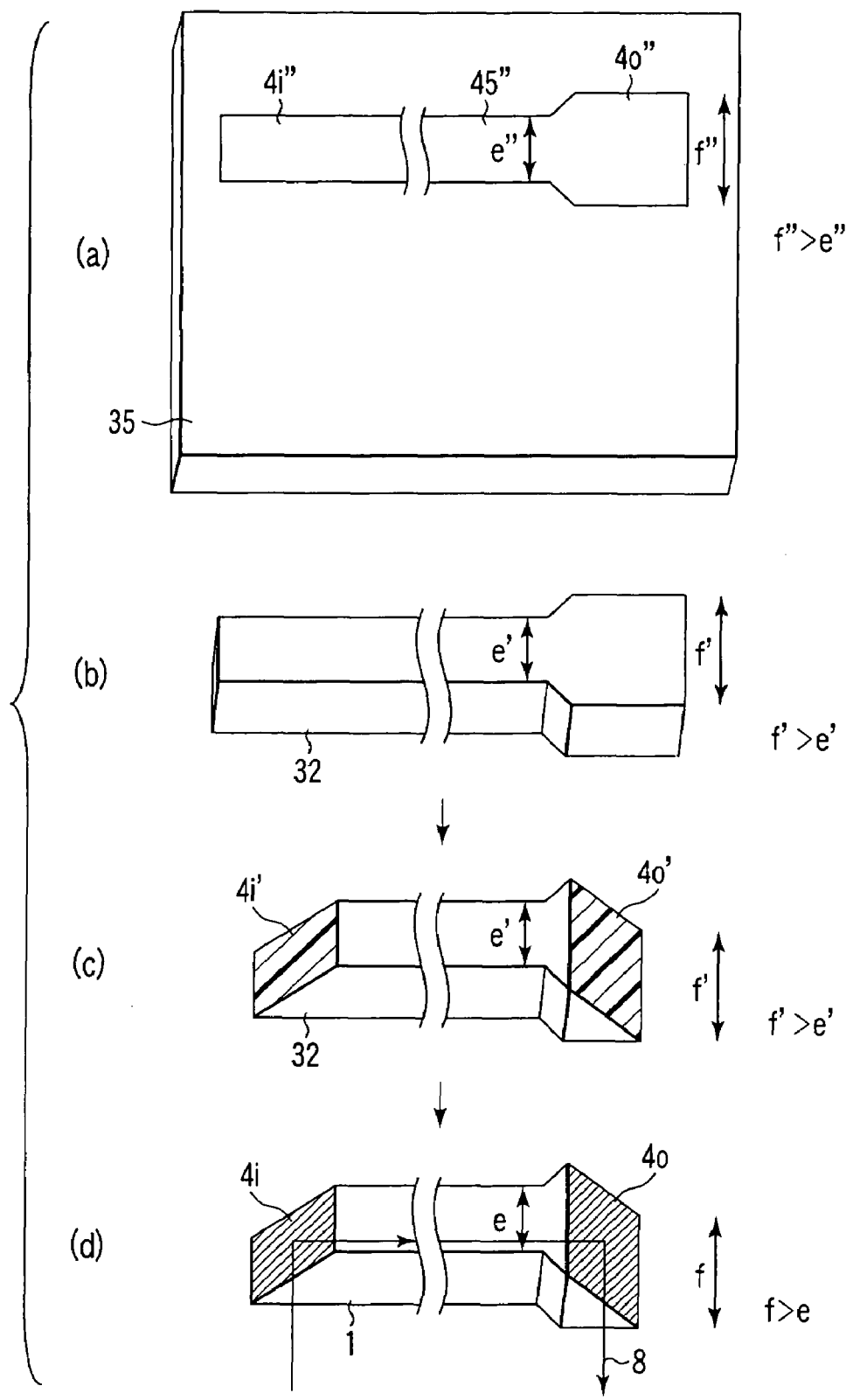

A third characterizing feature of the fourth embodiment is the core width of the inclined mirrors 4. As FIG. 29 shows, a core 1 is formed on the first clad 2. Reflecting films 6 are formed on those parts of the core 1 which will be inclined mirrors 4 and in-plane mirrors 5. A second clad 3 is then formed, covering the first clad 2 and the core 1. A waveguide is thereby manufactured. The shapes of the mirrors are important to the method of manufacturing of this waveguide. In this method, the core width f of each inclined mirror 4 may be greater than the core width e of the straight waveguide 45 as is illustrated in FIG. 33. Then, the loss of light at the inclined mirror 4 can be reduced. It may suffice to make the core width of only the output-side mirror 4o greater than the core width e, as depicted in FIG. 34.

Why it should be so will be explained. In any waveguide, light guided at a little cladside from the boundary, so most of light travels in the core of the waveguide, but a little in cladside. If the core width f of the inclined mirror 4 is equal to the core width e of the straight waveguide 45, the part of the light in the clad will not be reflected. It would inevitably be lost or become a crosstalk. In the present embodiment, a loss of light is small. This is because the light in the clad temporarily enters the core since the core width f of the inclined mirror 4 is greater than the core width e of the straight waveguide 45 as shown at (d) in FIG. 33.

Another function is performed. The core pattern may be made by means of photolithography, and the inclined-mirror pattern 4" of the photomask 35 may have width f" equal to the width e" of the straight waveguide pattern 45. Nevertheless, the mirror-equivalent surface 4' of the photosensitive resin layer 32 of the projection mold 30 will have a projected width f' that is less than the width e' of the straight waveguide as is illustrated at (b) to (c) in FIG. 35. The projected width f of the inclined mirror 4 formed on the core 1 becomes less than the width e of the straight waveguide as is shown at (d) in FIG. 35. This phenomenon is likely to occur due to diffraction and defocus or fast development at any end portion. Nonetheless, this phenomenon can be cancelled out if the core width f" of the photomask 35, for the inclined mirror 4", is made greater than the core width e" of the straight waveguide 45" as is illustrated in FIG. 33 and FIG. 34.

EXAMPLE 20

Process

Example 20 according to the fourth embodiment will be described with reference to FIG. 29. FIG. 29 shows one core of the optical waveguide as shown in FIG. 26.

First, a dry film resist having a thickness of 40 µm was laminated to the substrate 31 (made of glass). Using a photomask having patterns of straight waveguides that intersect with one another at right angles and patterns of the in-plane mirrors included in these waveguides, the structure was exposed to light and developed.

A projecting pattern, or a photosensitive resin pattern 32, was thereby formed. As shown at (a) in FIG. 29, this pattern had straight-waveguide equivalents 45' and surfaces 5' equivalent to in-plane mirrors.

Next, laser beams were obliquely applied, thereby forming surfaces 4' equivalent to inclined mirrors as is depicted at (b) in FIG. 29. Thus, a projecting mold 30 was produced.

Then, silicone resin in liquid state was applied to the projecting mold 30 and cured, thus forming a silicone layer. The silicon layer was peeled off. As a result, a recessed mold 10 was produced as shown at (c) in FIG. 29.

As shown at (d) in FIG. 29, a substrate 20 (made of glass) was prepared. An epoxy resin layer having a thickness of 30 µm was formed, as a clad 2, on the substrate 20. Thereafter, using the recessed mold 10 made of silicone, a core 1 made of epoxy resin was formed.

Then, as shown at (e) in FIG. 29, aluminum (Al) was mask-deposited, forming reflecting films 6 and thus providing mirrors 4 and 5. As depicted at (f) in FIG. 29, an epoxy resin layer was formed as clad 3. A waveguide was thereby formed, which were peeled from the substrate.

EXAMPLE 21

Waveguide 1

The same process as employed in Example 20 was performed, manufacturing a waveguide shown in FIG. 26. In producing the mold, surfaces 5' equivalent to in-plane mirrors were formed by photolithography, and surfaces 4' equivalent to inclined mirrors were formed by obliquely applying laser beams. Since the inclined mirrors were oriented in only three directions, it sufficed to set the sample three times only. A single-mode fiber was placed near the inclined mirror 4 provided at one end of the waveguide. Infrared light having a wavelength of 0.85 μm was applied from the fiber to this inclined mirror 4. It was confirmed that infrared light emerged from the inclined mirror 4 provided at the other end of the waveguide.

EXAMPLE 22

In-Plane Mirror 1

The process of Example 20 was performed, in which a photomask 35 shown at (a) in FIG. 30 was used, thereby forming an in-plane mirror 5 as is illustrated at (b) to (c) in FIG. 30. Width a was 40 μm, and width b was 50 μm. A single-mode fiber was placed near one end of the waveguide. Infrared light having a wavelength of 0.85 μm was applied from the fiber to this end of the waveguide. The light emerging from the other end of the waveguide was applied to a hard polymer cladding fiber. The loss made in a waveguide having the same length was subtracted from the loss made in the waveguide having the in-plane mirror 5. As a result, the loss at the in-plane mirror 5 was estimated to be about 1 dB.

EXAMPLE 23

In-Plane Mirror 2

The process of Example 20 was performed, in which a photomask 35 shown at (a) in FIG. 31 was used, thereby forming an in-plane mirror 5 as is illustrated at (b) to (c) in FIG. 31. Width a was 40 μm, width b was 50 μm, width c was 50 μm, and width d was 50 μm. A single-mode fiber was placed near one end of the waveguide. Infrared light having a wavelength of 0.85 μm was applied from the fiber to this end of the waveguide. The light emerging from the other end of the waveguide was applied to a hard polymer cladding fiber. The loss made in a waveguide having the same length was subtracted from the loss made in the waveguide having the in-plane mirror 5. As a result, the loss at the in-plane mirror 5 was estimated to be about 1 dB.

COMPARATIVE EXAMPLE

In-Plane Mirror 3

Figure 32:
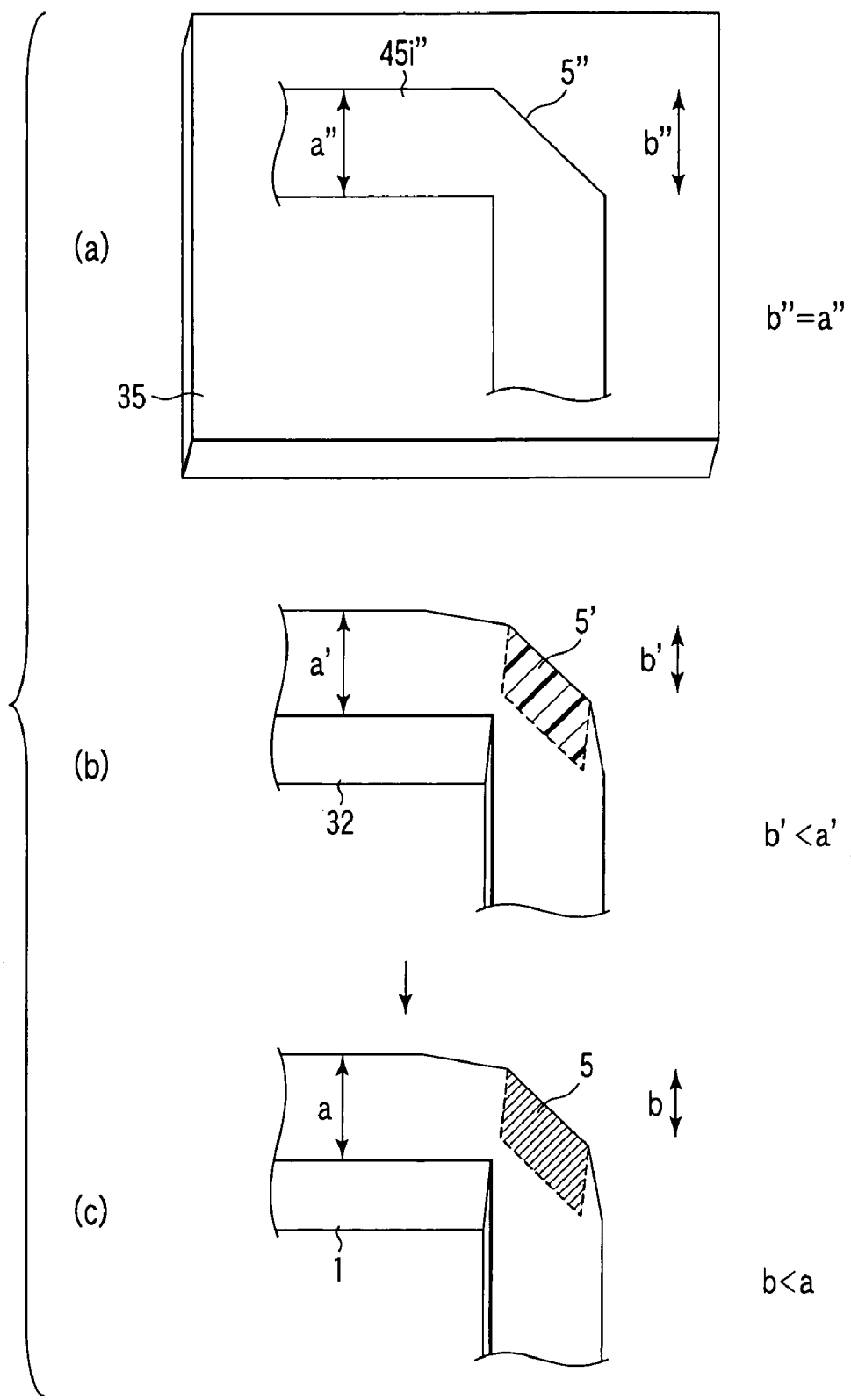
FIG. 32 is perspective views depicting the shape of an ordinary in-plane mirror and a method of forming the ordinary in-plane mirror.

The process of Example 20 was performed, in which a photomask 35 shown at (a) in FIG. 32 was used, thereby forming an in-plane mirror 5 as is illustrated at (b) to (c) in FIG. 32. Width a was 40 μm, and width b was 35 μm. A single-mode fiber was placed near one end of the waveguide. Infrared light having a wavelength of 0.85 μm was applied from the fiber to this end of the waveguide. The light emerging from the other end of the waveguide was applied to a hard polymer cladding fiber. The loss made in a waveguide having the same length was subtracted from the loss made in the waveguide having the in-plane mirror 5. As a result, the loss at the in-plane mirror 5 was estimated to be about 2 dB.

EXAMPLE 24

Inclined Mirror 1

The process of Example 20 was performed, in which a photomask 35 shown at (a) in FIG. 33 was used, thereby forming an inclined mirror 4 as is illustrated at (b) to (d) in FIG. 33. Width a was 40 μm, and width b was 50 μm. A single-mode fiber was placed near one end of the waveguide. Infrared light having a wavelength of 0.85 μm was applied from the fiber to this end of the waveguide. The light emerging from the inclined mirror provided on the other end of the waveguide was applied to a hard polymer cladding fiber. The loss made in a waveguide having the same length was subtracted from the loss made in the waveguide, as measured at the inclined mirror 4 used as output side. As a result, the loss at the inclined mirror 4 was estimated to be about 1 dB.

COMPARATIVE EXAMPLE 3

Inclined Mirror 2

Figure 35:
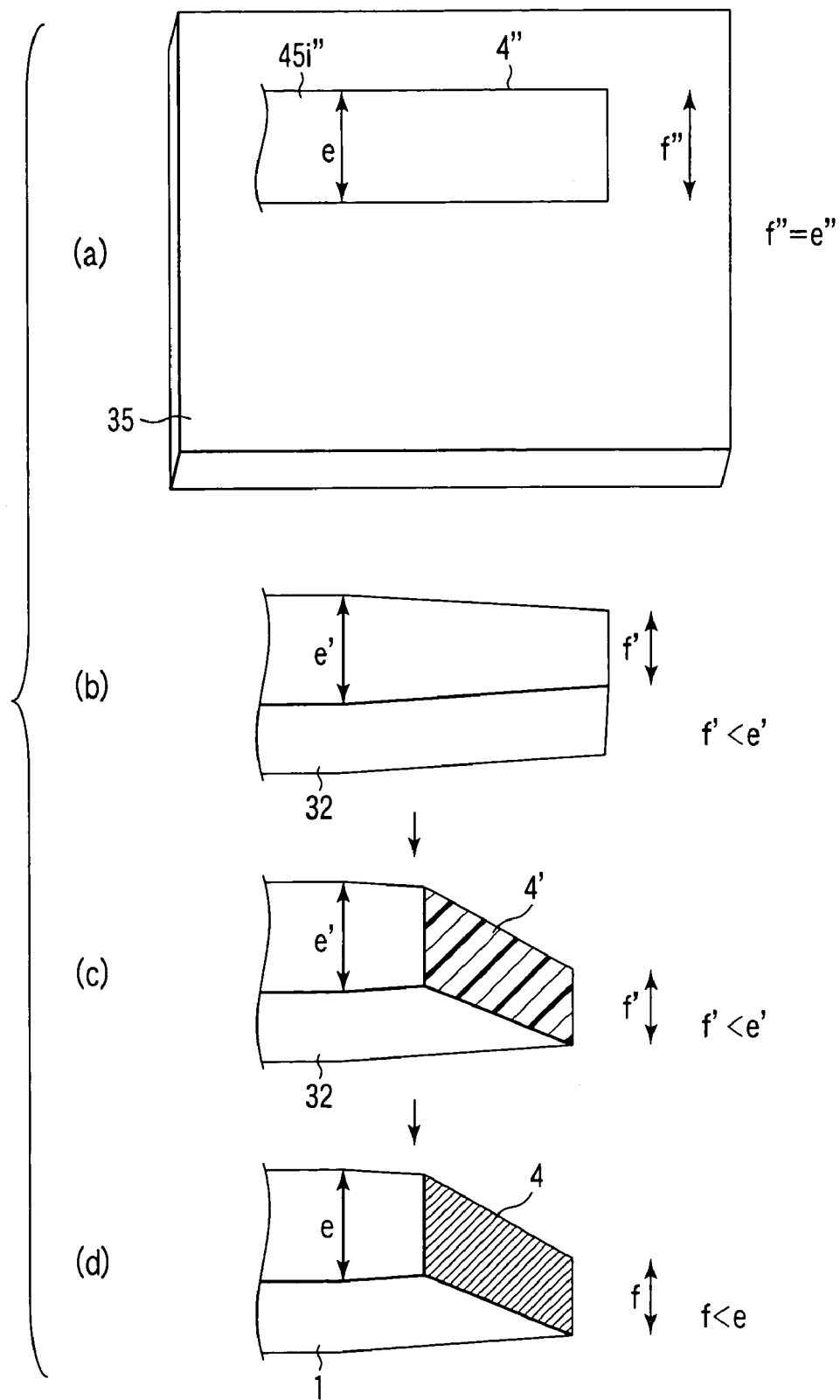
FIG. 35 is perspective view showing the shape of an ordinary inclined mirror and a method of forming the ordinary inclined mirror.

The process of Example 20 was performed, in which a photomask 35 shown at (a) in FIG. 35 was used, thereby forming an inclined mirror 4 as is illustrated at (b) to (d) in FIG. 35. Width a was 40 μm, and width b was 35 μm. A single-mode fiber was placed near one end of the waveguide. Infrared light having a wavelength of 0.85 μm was applied from the fiber to this end of the waveguide. The light emerging from the inclined mirror provided on the other end of the waveguide was applied to a hard polymer cladding fiber. The loss made in a waveguide having the same length was subtracted from the loss made in the waveguide, as measured at the inclined mirror 4 used as output side. As a result, the loss at the in-plane mirror 4 was estimated to be about 2 dB.

EXAMPLE 25

Inclined Mirror 3

The process of Example 20 was performed, in which a photomask 35 shown at (a) in FIG. 34 was used, thereby forming an inclined mirror 4 as is illustrated at (b) to (d) in FIG. 34. Width a was 40 μm, and width b was 50 μm. A single-mode fiber was placed near the inclined mirror 4i. Infrared light having a wavelength of 0.85 μm was applied from the fiber to the waveguide. The light emerging from the inclined mirror 4o provided on the other end of the waveguide was applied to a hard polymer cladding fiber. The loss made when the light was applied in a reverse direction was about 1 dB greater than the loss made when the light was applied in the designed direction.

The fourth embodiment and Examples 20 to 25, all described above, can achieve the following advantages.

First, the in-plane mirror can decrease the area that is required to change the direction. Second, since the straight waveguides are orientated in a limited number of directions, the number of orientations of the in-plane mirrors and inclined mirrors can be decreased. This renders it easy to manufacture the waveguides. Third, the in-plane mirrors and inclined mirrors can have a large width, which helps to reduce the loss.

Hence, it is possible to provide optical waveguides in which a core can be easily formed to connect many given points.

FIFTH EMBODIMENT

A fifth embodiment of the present invention will be described. In the fifth embodiment, spacers and/or alignment bases are used to provide a gap and/or a position between an optical waveguide and another substrate when the waveguide, which is of the same type as the first to fourth embodiments, is bonded to another substrate.

Figure 36:
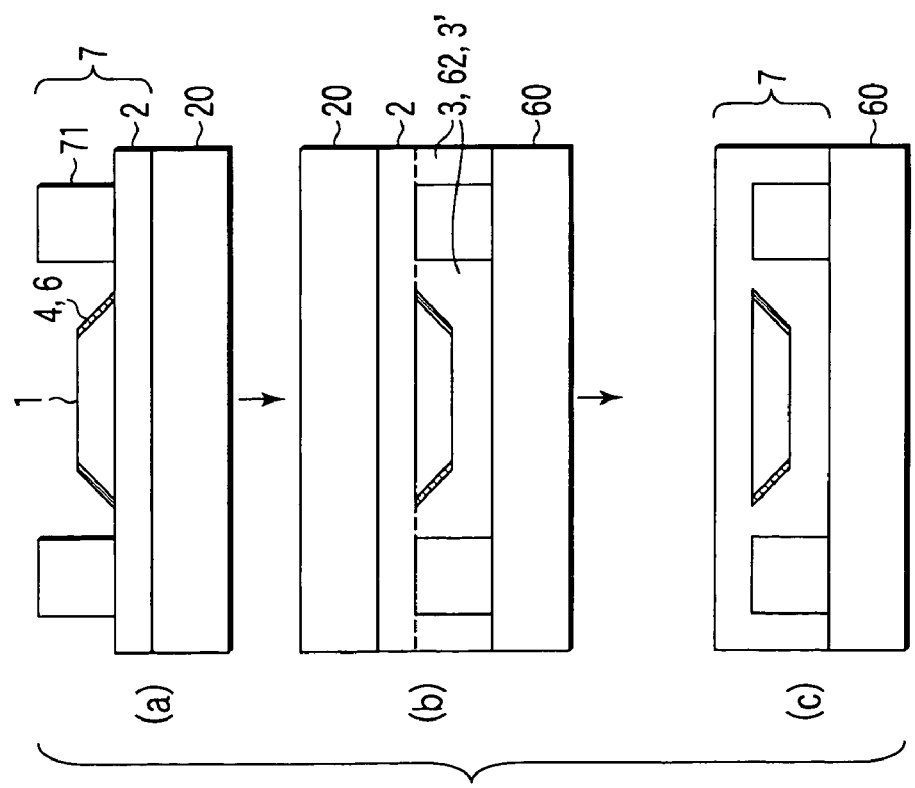

As shown at (a) in FIG. 36, an optical waveguide 7 has spacers 71 that are taller than the core 1. The optical waveguide 7 is bonded to another substrate 60 by using clad material 3' as is illustrated at (b) in FIG. 36. After the waveguide 7 is so bonded, the difference (hs−hc) between the height hs of the spacers 71 and the height hc of the core 1 determines a thickness for the second clad 3. The distance from the separate substrate 60 to the core 1 can therefore precisely be controlled. When the substrate 20 is peeled from the optical waveguide 7, a laminated structure is obtained as is depicted at (c) in FIG. 36.

Figure 38:
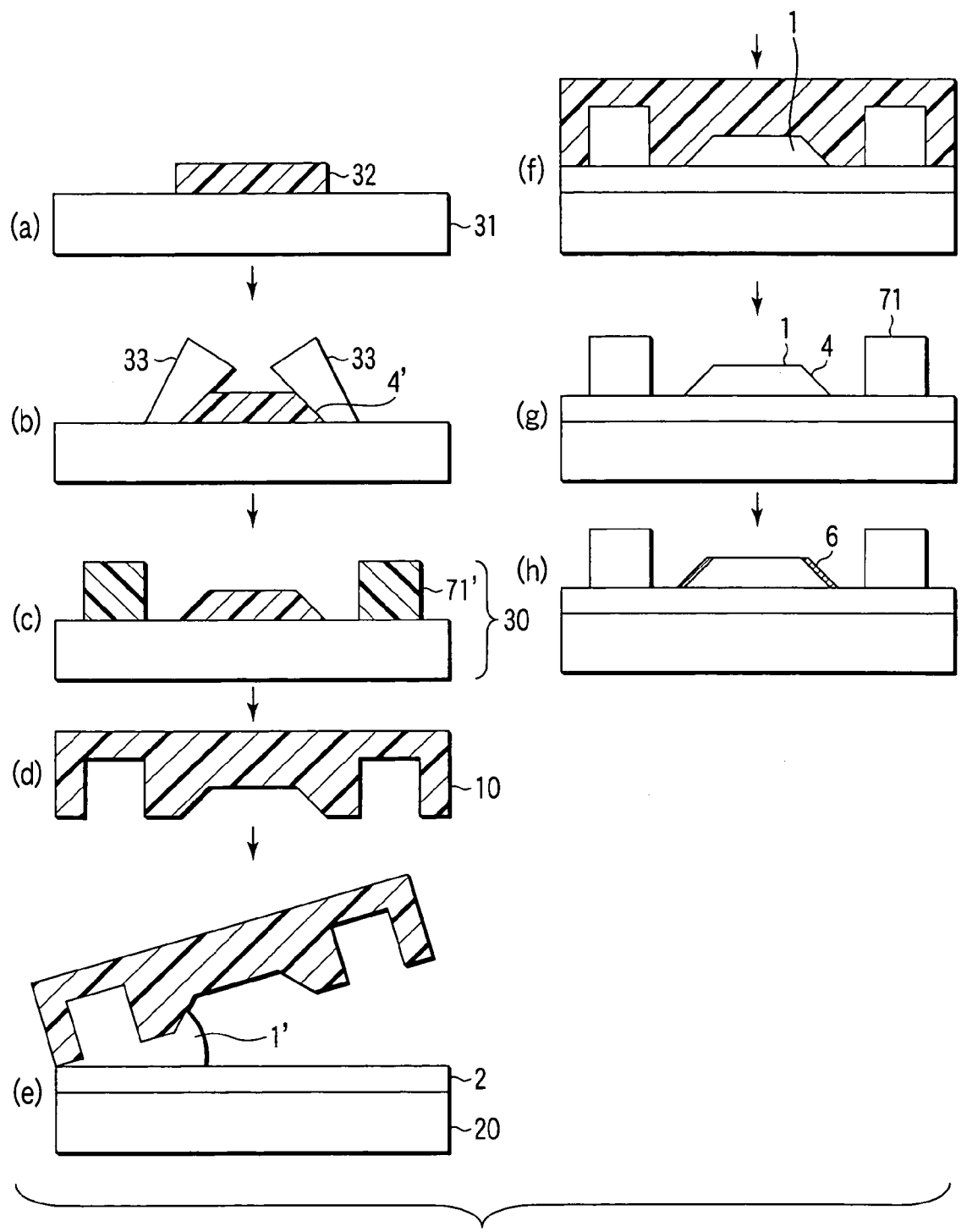

The spacers 71 may be made of a material different from the core 1. It is desired, nonetheless, that the spacers 71 be made of the same material as the core 1. If they are made of the same material as the core 1, such a process as depicted in FIG. 38 can be carried out. As shown at (a) in FIG. 38, a resist pattern 32 for the core is formed on a substrate 31 by means of photolithography. As shown at (b) in FIG. 38, laser beams 33 are obliquely applied, forming inclined surfaces 4' at the ends of the resist pattern 32. Next, as shown at (c) in FIG. 38, members 71' having a predetermined thickness are bonded to the substrate 31, not to the core, thus making a projecting mold 30. As depicted at (d) in FIG. 38, silicone is applied to the projecting mold 30, thus forming a silicone mold 10. As shown at (e) in FIG. 38, a core material 1' is applied between the silicon mold 10 and the substrate 20 having a first clad 2. The core material 1' is cured as is illustrated at (f) in FIG. 38. The silicone mold 10 is peeled. Spacers 71 are thereby made at the same time the core pattern 1 is produced. As shown at (h) in FIG. 38, metal films 6 are formed on the inclined surfaces 4' of the core pattern 1. The metal films 6 serve as mirrors.

The metal films 6 can be formed by various steps, such as (i) mask vapor deposition, (ii) photo-lithography and etching performed after deposition of metal film, or (iii) photolithography, deposition and lift-off process. The metal films 6 may be made of Al, Au, Pt, Ag, Cu or Ti, or an alloy of these metals. Made of any one of these materials, the films 6 can make desirable mirrors.

Alternatively, such a method as shown in, for example, FIG. 39 may be carried out. As depicted at (a) in FIG. 39, a first negative-type resist is formed on the substrate 31. A core pattern 32 and spacer molds 71a', all provided on the substrate 31, are exposed to light. A second negative-type resist is then formed. Spacer molds 71b' provided on the spacer molds 71a' are exposed to light. The resultant structure is developed in its entirety. Spacer molds 71' are thereby formed. The spacer molds 71' are taller than the photosensitive resin layer 32 having the same shape as the core to be formed.

As illustrated at (b) in FIG. 39, laser beams 33 are obliquely applied, thereby forming, at the ends of the core pattern 32, surfaces 4' which are equivalent to inclined mirrors. As a result, a projecting mold 30 is made. Thereafter, a core 1 and spacers 71 are formed on the first clad 2 of the substrate 20 as shown at (c) to (f) in FIG. 39, in the same way as is illustrated at (d) to (g) in FIG. 38.

Next, as shown at (g) in FIG. 39, metal films, or reflecting films 6, are formed on the surfaces 4 of the core pattern, which are equivalent to the inclined mirrors.

Figure 37:
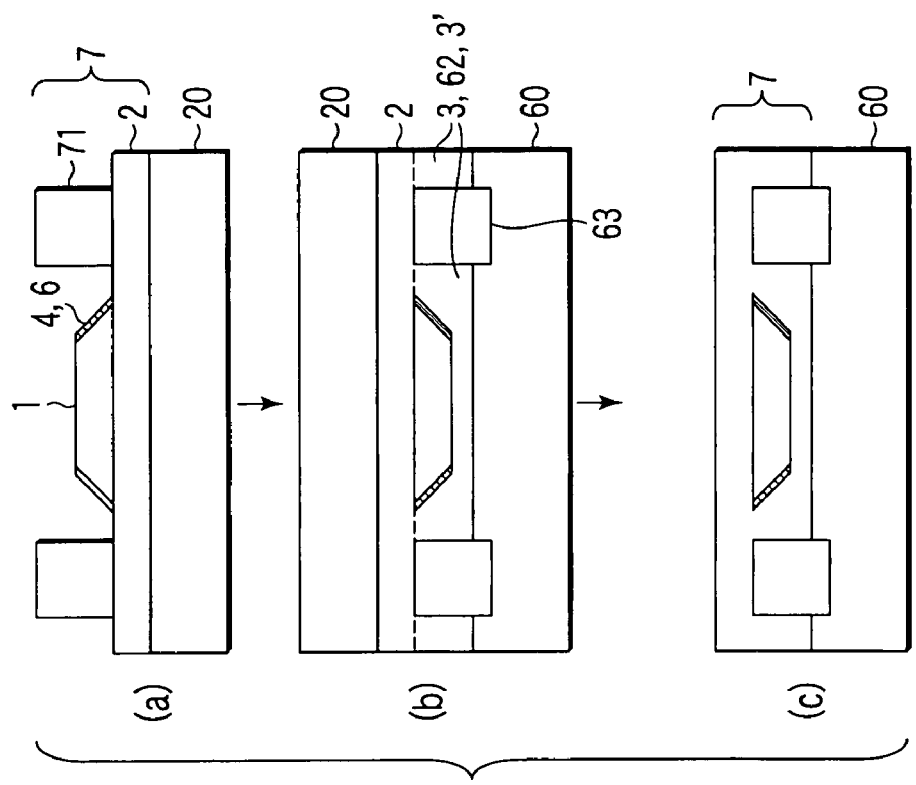

When the optical waveguide 7 is bonded to another substrate 60 by using clad material 3' as shown at (a) to (c) in FIG. 37, the spacers 71 are fitted into the recesses 63 made on the separate substrate 60. Thus, the optical waveguide 7 is automatically aligned with the substrate 60, providing a laminated structure.

The fifth embodiment has alignment marks 70, which facilitate the mutual positioning of the optical waveguide 7 and another substrate 60. More precisely, the optical waveguide 7 according to this embodiment has alignment marks 70. As shown at (a) in FIG. 40 or at (a) in FIG. 41, the alignment marks 70 are provided at the same level as, or at a level higher than, the core 1.

Figure 41:
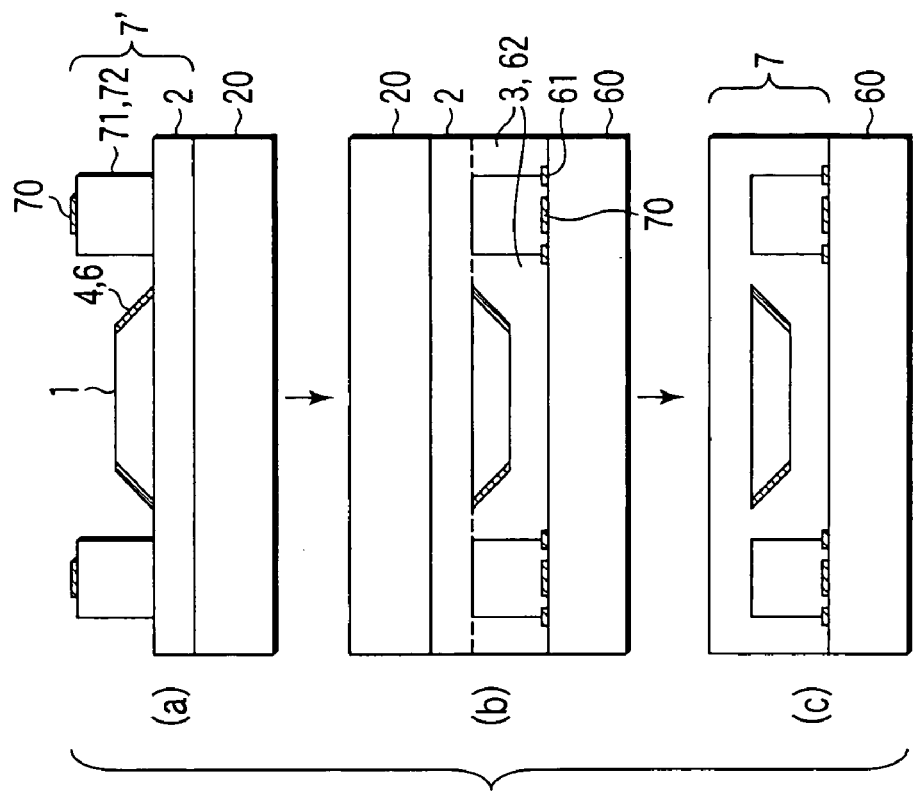
Figure 40:
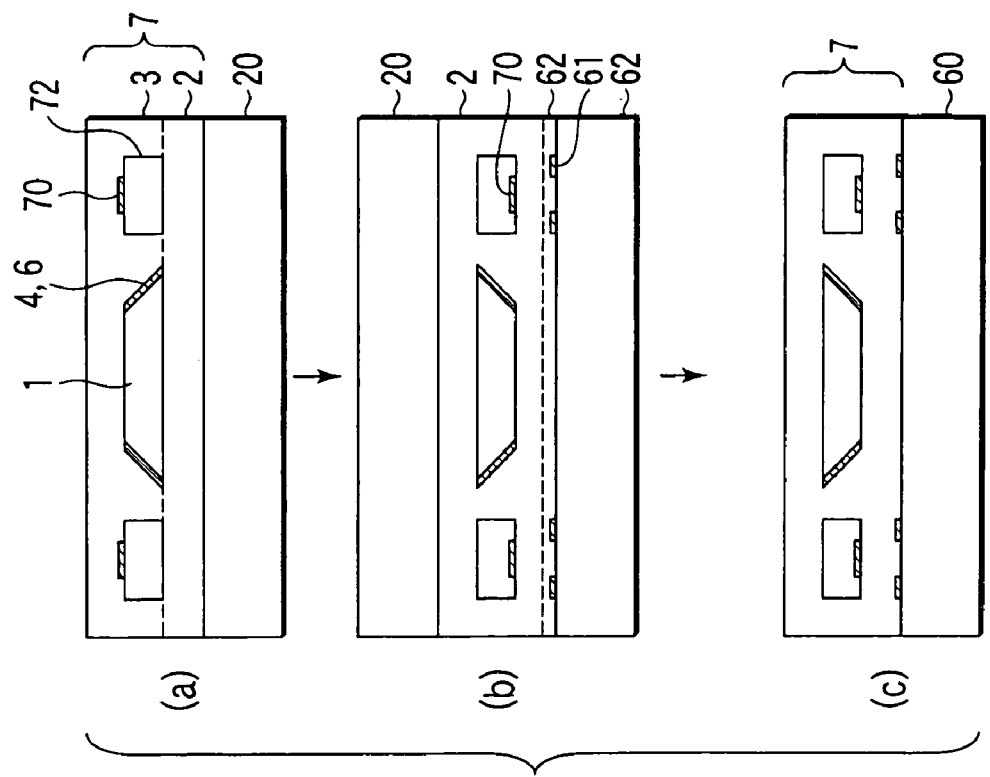

As depicted at (b) in FIG. 40 or at (b) in FIG. 41, the optical waveguide 7 can be accurately positioned when it is bonded to another substrate 60. This is because each alignment mark 70 is spaced a little from the corresponding alignment mark 61. Then, the substrate 20 is peeled from the optical waveguide 7. A laminated structure is thereby obtained, as illustrated at (c) in FIG. 40 or at (c) in FIG. 41.

Figure 42:
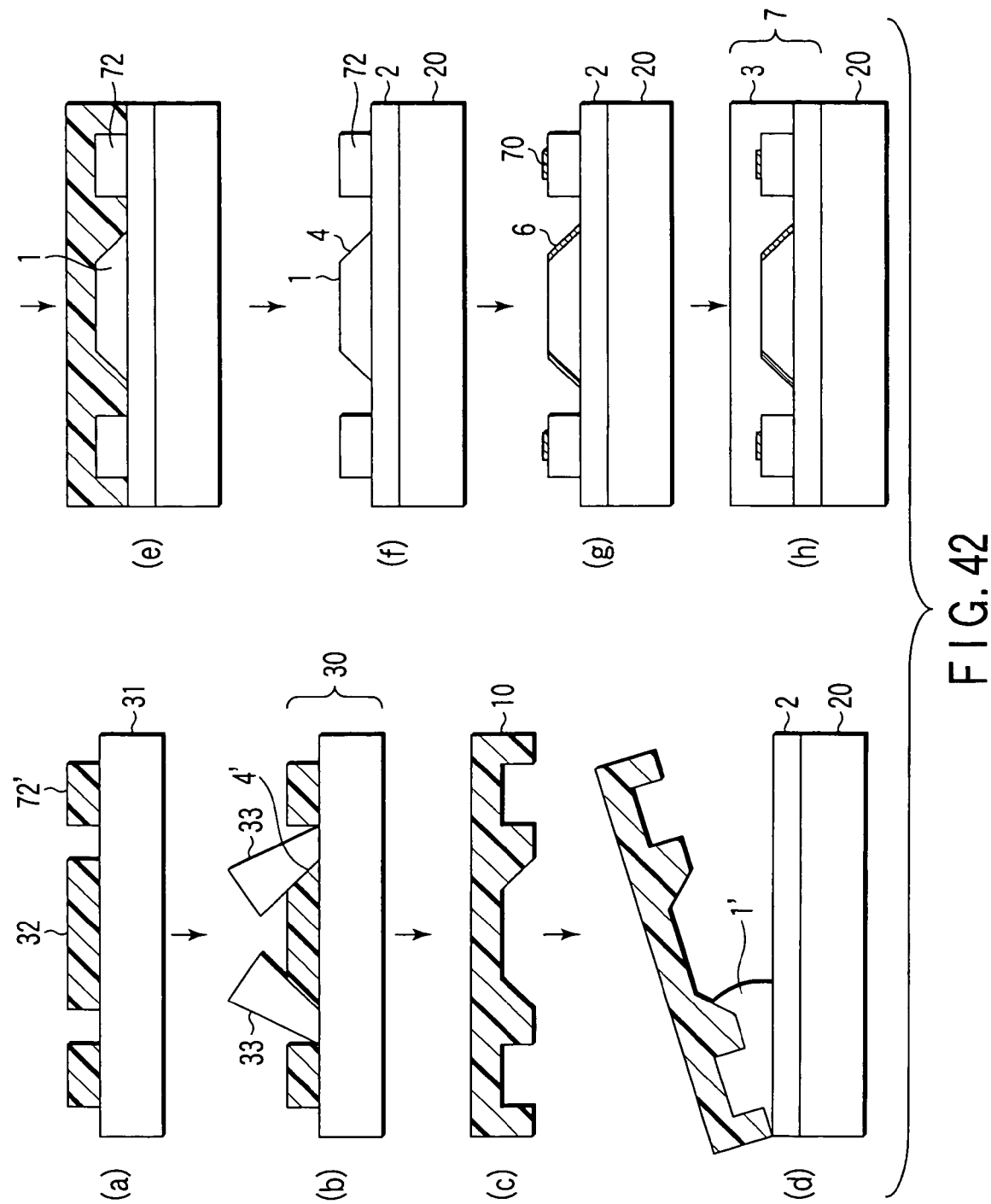

The material of alignment marks 70 can be the same as the metal films 6 for mirrors, or different. If they are the same, it will be easier to manufacture the waveguide as seen from FIG. 42. For example, such a step as shown in FIG. 42 may be performed. As shown at (a) in FIG. 42, a resist pattern is formed on the substrate 31 by photolithography, thus providing a core pattern 32 and alignment mark bases 72'. Note that the core pattern 32 and the bases 72' for the alignment marks are made of the same resist and therefore have the same height. Thereafter, as depicted at (b) to (f) in FIG. 42, the core pattern 1 and the bases 72 for the alignment marks are formed on the first clad 2 provided on the substrate 20, in the same manner as illustrated at (b) to (f) in FIG. 38.

Next, as shown at (g) in FIG. 42, metal films are formed on the inclined surfaces 4 of the core pattern 1 and on the alignment bases 72. Mirrors and alignment marks 70 are thereby formed. Then, as shown at (h) in FIG. 42, a second clad 3 is formed, covering the core pattern 1, bases 72 and first clad 2. As a result, an optical waveguide 7 is formed on the substrate 20 as is illustrated at (g) or (h) in FIG. 42.

Figure 43:
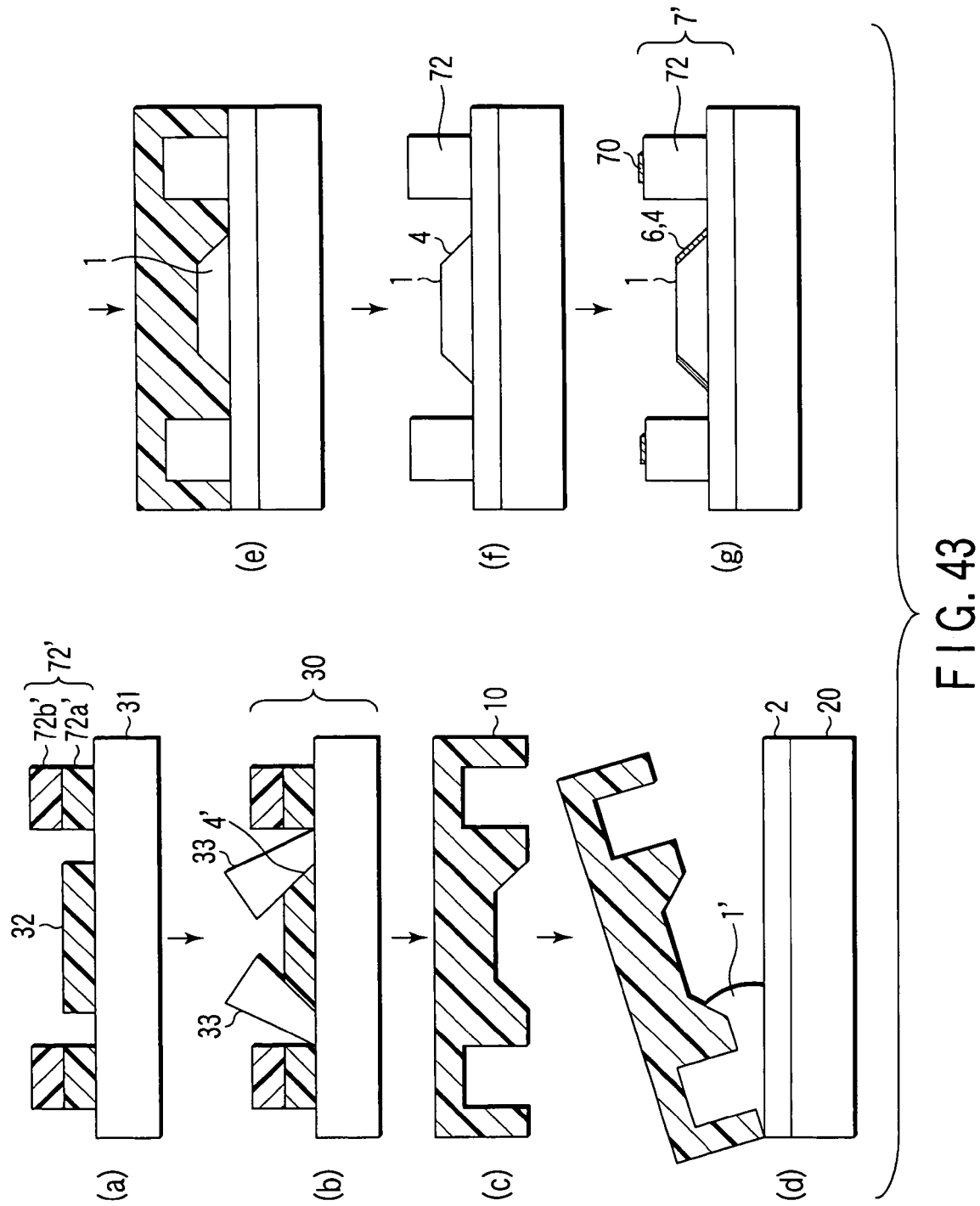
Figure 44:
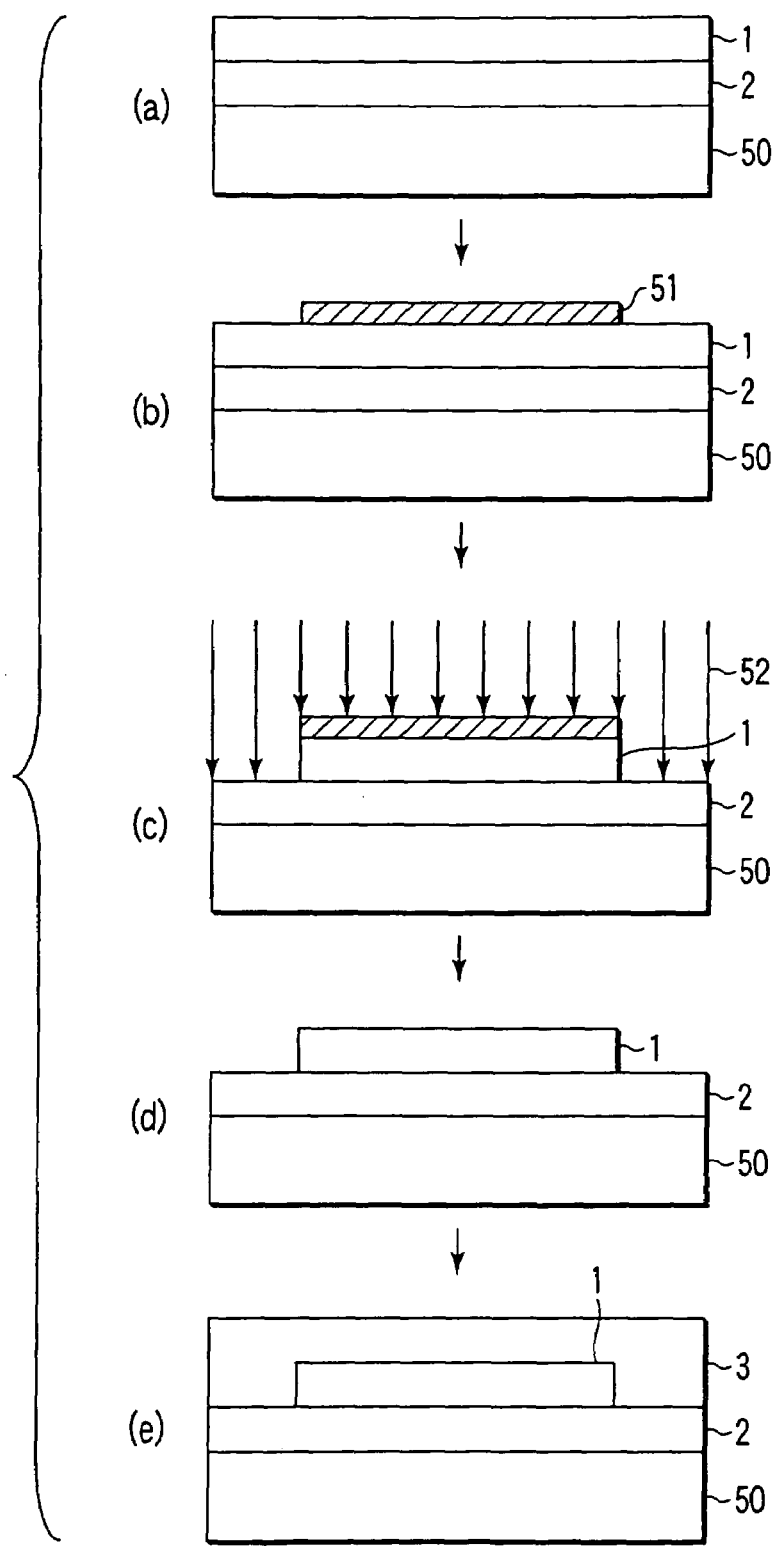
FIG. 44 is sectional views showing a conventional method of manufacturing an optical waveguide.
Figure 45:
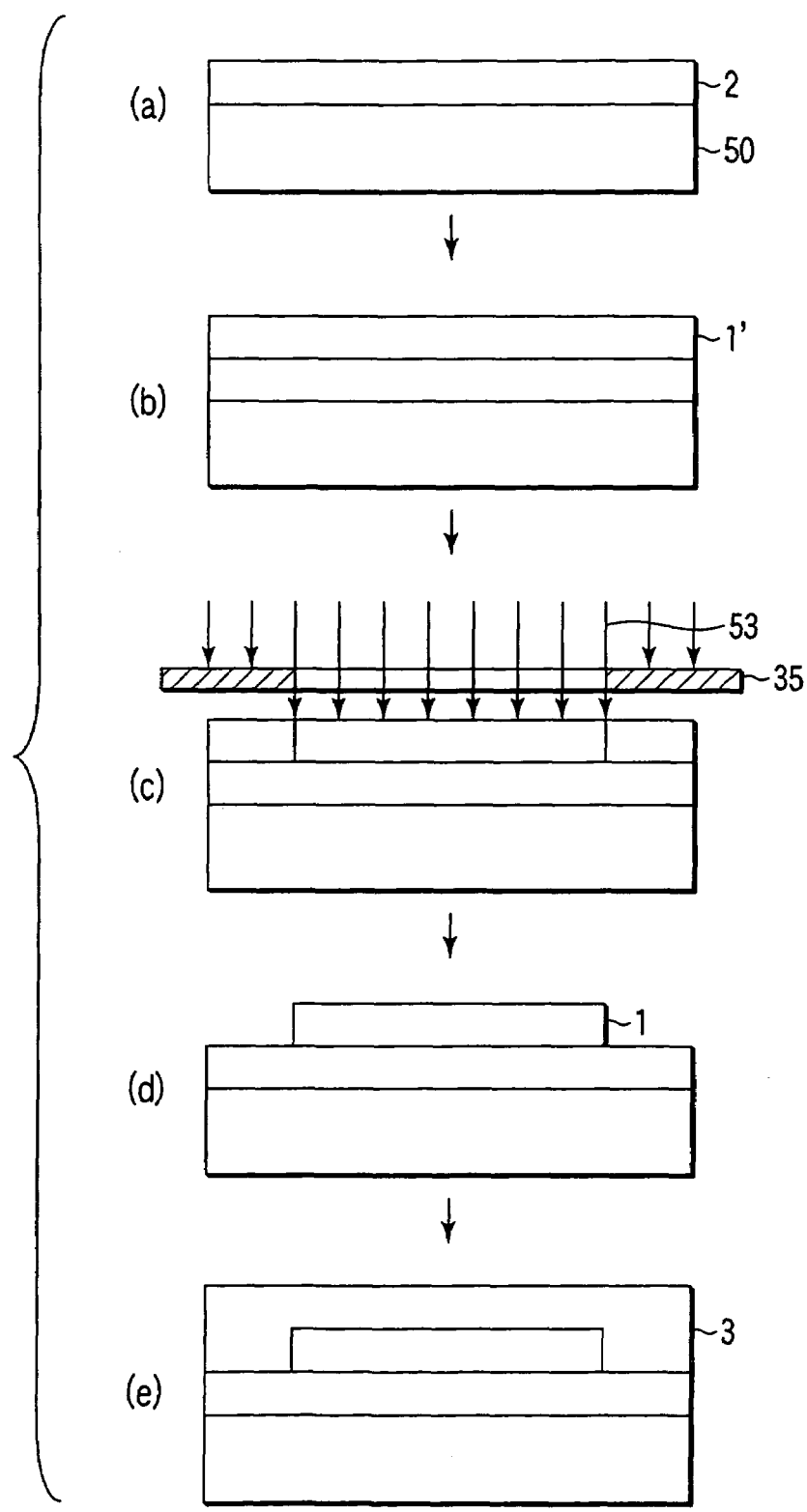
FIG. 45 is sectional views illustrating another conventional method of manufacturing an optical waveguide.
Figure 46:
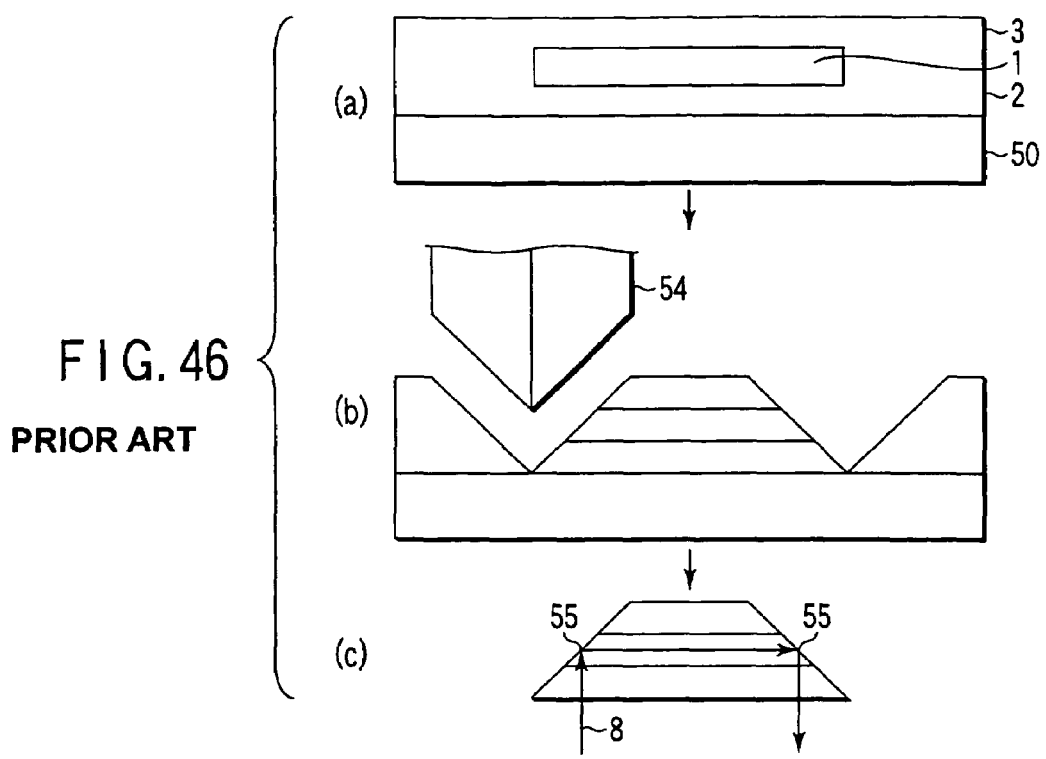
FIG. 46 is sectional views showing a conventional method of manufacturing a mirror.

Alternatively, the waveguide may be manufactured by, for example, the method shown in FIG. 43. As depicted at (a) in FIG. 43, a first negative-type resist is formed on the substrate 31. Then, the core pattern 32 and the bases 72a' for alignment marks are exposed to light. A second negative-type resist is formed, and the bases 72b' on the bases 72a' are exposed to light. Then, the entire structure is developed. Bases 72' are thereby formed, which are taller than the core pattern 32 by the height of he second negative-type resist.

As shown at (b) in FIG. 43, laser beams 33 are obliquely applied, forming, at the ends of the core pattern 32, surfaces 4' which are equivalent to inclined mirrors. As a result, a projecting mold 30 is made. Thereafter, a core 1 and bases 72 for alignment marks are formed on the first clad 2 of the substrate 20 as shown at (c) to (f) in FIG. 43, in the same way as is illustrated at (c) to (f) in FIG. 38.

Next, as shown at (g) in FIG. 43, metal films, or reflecting films 6 are formed on the surfaces 4 of the core pattern, and at the same time, alignment marks 70 are formed on the bases 72. In this case, the bases 72 for the alignment marks can serve as spacers.

The metal films 6 and 70 can be formed by carrying out steps (i) to (iii) that have been described earlier. The material of these films may be one of the metals specified above or an alloy thereof. Then, desirable mirrors and desirable alignment marks 70 can be formed. The positions of the alignment marks 70 are determined on the basis of the position of the core pattern 1 and the positions of the mirrors 4. The alignment marks 70 made of metal may be determined on the basis of other alignment marks (not shown) made of core material.

Hitherto described are optical waveguides each having mirrors at its ends. Each waveguide may be replaced by an optical waveguide that has no mirrors or an optical waveguide that has in-plane mirrors.

EXAMPLE 26

Optical Waveguide Having Spacers

Example 26 of the fifth embodiment will be described, with reference to FIG. 38. As shown at (a) in FIG. 38, a dry film resist was laminated to the substrate 31 (made of glass). The resist was exposed to light through photomask and developed, thus forming a resist pattern 32. The resist pattern 32 was shaped like a waveguide to be formed and its height and width were 40 μm.

Next, as illustrated at (b) in FIG. 38, laser beams 33 were obliquely applied from a KrF excimer laser, thus forming inclined surfaces 4' at the ends of the resist pattern 32.

Then, as shown at (c) in FIG. 38, a tape of 70 μm thick was bonded to the substrate 31, providing spacers 71'. A projecting mold 30 was thereby produced.

Further, silicone resin in liquid state was applied to the projecting mold 30 and cured, thus forming a silicone layer. The silicon layer was peeled off. As a result, a recessed mold 10 was produced as shown at (d) in FIG. 38. Then, a substrate 20 (made of glass) was prepared. Ultraviolet-curable epoxy resin was applied, as clad material 2', to the entire surface by means of spin-coating. Ultraviolet rays are applied to the entire surface at intensity 4 J/cm$^2$. The clad material 2' was thereby cured, forming a film having a thickness of 30 μm (not shown).

Then, as shown at (e) to (f) in FIG. 38, ultraviolet-curable epoxy resin was dripped, as core material 1' onto the recessed mold 10. The substrate 20 having a clad 2 was laid on the recessed mold 10 and pressed. The core material 1' was thereby embedded into the recess of the recessed mold 10. In the condition shown at (f) in FIG. 38, ultraviolet rays 12 were applied through the substrate 20 at intensity of 8 J/cm$^2$. The core material 1' was cured, forming a core pattern 1.

The recessed mold 10 was peeled off as shown at (g) in FIG. 38. As depicted at (h) in FIG. 38, Al was deposited on the inclined surfaces 4 of the by means of masked vapor deposition.

EXAMPLE 27

Transfer of the Optical Waveguide Having Spacers

Example 27 of the fifth embodiment will be described, with reference to FIG. 36. As depicted at (a) in FIG. 36, ultraviolet-curable epoxy resin was applied on an optical waveguide 7. The waveguide 7 was laid on another substrate 60. Ultraviolet rays were applied through the substrate 20 at intensity 4 J/cm$^2$ as is illustrated at (b) in FIG. 36. A second clad 3, or adhesive layer 62, was thereby cured. As shown at (c) in FIG. 36, the substrate 20 was peeled off, thus providing a laminated structure.

EXAMPLE 27A

Optical Waveguide 2 Having Spacers

Example 27A of the fifth embodiment will be described, with reference to FIG. 39. As depicted at (a) in FIG. 39, a dry film resist was laminated to the substrate 31 (made of glass). A core pattern 32 and the spacer mold 71b' were exposed to light. Further, a second dry film resist was bonded, and the spacer mold 71a' was exposed to light. Thereafter, the structure was developed, producing a spacer mold 71' that had a core pattern 32 and a height of 70 μm. The core pattern 32 had height and width of 40 μm.

Next, as depicted at (b) in FIG. 39, laser beams 33 were obliquely applied from a KrF excimer laser, thus forming inclined surfaces 4' at the ends of the resist pattern 32 made of photosensitive resin. As a result, a projecting mold 30 was made.

Silicone resin in liquid state was applied to the projecting mold 30 and cured at room temperature. Then, the projecting mold 30 was peeled off. A recessed mold 10 was thereby made as is illustrated at (c) in FIG. 39.

Then, a substrate 20 (made of glass) was prepared. Ultraviolet-curable epoxy resin was applied, as clad material 2' by means of spin-coating. Ultraviolet rays are applied to the entire surface at intensity 4 J/cm$^2$. The clad material 2' was thereby cured, forming a layer (not shown) having a thickness of 30 Ξm.

As shown at (d) to (e) in FIG. 39, ultraviolet-curable epoxy resin was dripped, as core material 1' onto the recessed mold 10. The substrate 20 having a clad 2 was laid on the recessed mold 10 and pressed. The core material 1' was thereby embedded into the recess of the recessed mold 10.

In the condition shown at (e) in FIG. 39, ultraviolet rays were applied through the substrate 20 at intensity of 8 J/cm$^2$. The core material 1' was cured, forming a core pattern 1 and spacers 71. Next, as depicted at (f) in FIG. 39, the recessed mold 10 was peeled off, and Al was vapor-deposited on the entire surface, forming resist patterns on the surfaces 4 that are equivalent to inclined mirrors. Etching using mixture of phosphorus acid and nitric acid was carried out, and the resist was removed. As a result, reflecting films 6 were formed as is illustrated at (g) in FIG. 39.

EXAMPLE 27B

Transfer 2 of the Optical Waveguide Having Spacers

Example 27B of the fifth embodiment will be described, with reference to FIG. 37. As depicted at (a) in FIG. 37, ultraviolet-curable epoxy resin was applied to an optical waveguide 7. The waveguide was laid on another substrate 60 having recesses 63, with spacers 71 fitted in the recesses 63. The waveguide and the substrate 60 were automatically positioned with respect to each other. Ultraviolet rays are applied through the substrate 20 to the entire surface at intensity 4 J/cm$^2$. The second clad 3, or adhesive 62, was thereby cured. As shown at (c) in FIG. 37, the substrate 20 was peeled off, thus providing a laminated structure.

EXAMPLE 28

Optical Waveguide Having Alignment Marks

Example 28 of the fifth embodiment will be described, with reference to FIG. 42. As depicted at (a) in FIG. 42, a dry film resist was laminated to the substrate 31 (made of glass). The resist was exposed to light and developed, forming a resist pattern 32 and bases 72' for alignment marks. The resist pattern 32 had a cross section shaped like a waveguide to be made. The height and width were 40 µm.

Next, laser beams 33 were obliquely applied from a KrF excimer laser, thus forming inclined surfaces 4' at the ends of the resist pattern 32. As a result, a projecting mold 30 was made.

Silicone resin in liquid state was applied to the projecting mold 30 and cured at room temperature. Then, the projecting mold 30 was peeled off. A recessed mold 10 was thereby made as is illustrated at (c) in FIG. 42.

Then, a substrate 20 (made of glass) was prepared. Ultraviolet-curable epoxy resin was applied, as clad material 2' by means of spin-coating. Ultraviolet rays are applied to the entire surface at intensity of 4 J/cm$^2$. The clad material 2' was thereby cured, forming a layer (not shown) having a thickness of 30 µm.

As shown at (d) to (f) in FIG. 42, a core pattern 1 and bases 72 were formed on the first clad 2 provided on the substrate 20, in the same way as is illustrated at (e) to (g) in FIG. 38.

Al was vapor-deposited on the entire surface, forming resist patterns on the bases 72 for alignment marks and on the surfaces 4 that are equivalent to inclined mirrors. Etching using the mixture of phosphoric acid and nitric acid was carried out, and the resist was removed. As a result, alignment marks 70 and reflecting films 6 were formed as is illustrated at (g) in FIG. 42. Ultraviolet-curable epoxy resin was applied to the entire surface of the resultant structure. Ultraviolet rays were then applied at intensity 4 J/cm$^2$, thus manufacturing a second clad 3, as is illustrated at (h) in FIG. 42.

EXAMPLE 29

Transfer of the Optical Waveguide Having Alignment Marks

Example 29 of the fifth embodiment will be described, with reference to FIG. 40. As shown at (a) in FIG. 40, ultraviolet-curable epoxy resin was applied to an optical waveguide 7. The waveguide was laid on another substrate 60. The waveguide was positioned with respect to the substrate 60, by using alignment marks 70. Ultraviolet rays are applied through the substrate 20 to the entire surface at intensity 4 J/cm$^2$. An adhesive layer 62 was thereby cured as shown at (b) in FIG. 40. Finally, the substrate 20 was peeled off, thus providing such a laminated structure as depicted at (c) in FIG. 40.

EXAMPLE 30

Optical Waveguide Having Spacers and Alignment Marks

Example 30 of the fifth embodiment will be described, with reference to FIG. 43. A dry film resist was laminated to the substrate 31 (made of glass). A core pattern 32 and bases 72a' for alignment marks (or spacer molds) were exposed to light. Further, a second dry film resist was laminated, and base molds 72b' (or spacer mold) were exposed to light. Thereafter, the structure was developed, producing alignment-mark base mold 72' (which was also spacer mold) and core pattern 32 as depicted at (a) in FIG. 43. Height of the base mold was 70 µm and the height and width of the core pattern 32 were 40 µm.

Next, as shown at (b) in FIG. 43, laser beams 33 were obliquely applied from a KrF excimer laser, thus forming inclined surfaces 4' on the resist pattern 32. As a result, a projecting mold 30 was made.

Silicone resin in liquid state was applied to the projecting mold 30 and cured at room temperature. Then, the projecting mold 30 was peeled off. A recessed mold 10 was thereby made as is illustrated at (c) in FIG. 43.

Then, a substrate 20 (made of glass) was prepared. Ultraviolet-curable epoxy resin was applied, as clad material 2' by means of spin-coating. Ultraviolet rays are applied to the entire surface at intensity 4 J/cm$^2$. The clad material 2' was thereby cured, forming a film (not shown) having a thickness of 30 µm.

As shown at (d) to (e) in FIG. 43, ultraviolet-curable epoxy resin was dripped, as core material 1' onto the recessed mold 10. The substrate 20 having a clad 2 was laid on the recessed mold 10 and pressed. The core material 1' was thereby embedded into the recesses of the recessed mold 10.

In the condition shown at (e) in FIG. 43, ultraviolet rays were applied through the substrate 20 at intensity of 8 J/cm$^2$. The core material 1' was cured, forming a core pattern 1 and bases 72 for alignment marks base 72 (or spacers 71). Next, as depicted at (f) in FIG. 43, the recessed mold 10 was peeled off, and Al was vapor-deposited on the entire surface, forming resist patterns at the positions where alignment marks are to be formed and on the surfaces 4 that are equivalent to inclined mirrors. Etching using the mixture of phosphoric acid and nitric acid was carried out, and the resist was removed. As a result, alignment marks 70 and reflecting films 6 were formed as is illustrated at (g) in FIG. 43.

EXAMPLE 31

Transfer of the Optical Waveguide Having Spacers and Alignment Marks

Example 31 of the fifth embodiment will be described, with reference to FIG. 41. Ultraviolet-curable epoxy resin was applied to an optical waveguide 7 as depicted at (a) in FIG. 41. As shown at (b) in FIG. 41, the waveguide was laid on another substrate 60, and ultraviolet rays are applied through the substrate 20 to the entire surface at intensity 4 J/cm$^2$, thereby curing the second clad 3, or adhesive layer 62. Finally, the substrate 20 was peeled off as is illustrated at (c) in FIG. 41. As a result, a laminated structure was obtained.

The fifth embodiment and Examples 26 to 31 thereof, all described above, can achieve the following advantages.

First, the use of spacers can precisely control the height of the optical waveguide, and the second clad, which serves as an adhesive layer, can simplify the manufacture of the waveguide. Second, the alignment marks can precisely control the position of the optical waveguide, because they lie at a level as same as or higher than the top of the core.

Hence, the optical waveguide and another substrate can be accurately spaced apart and positioned with respect to each other. Thus, the optical waveguide is fit to be bonded to another substrate.

The present invention can provide a method of manufacturing an optical waveguide which is inexpensive and in which the core is used at high efficiency and scarcely deformed. Further, the invention can provide an optical waveguide that excels in mirror-connection efficiency, which has a large tolerance for element displacement and which is simple in structure and inexpensive. In addition, this invention can provide an optical waveguide in which a core can be easily formed to connect many given points. Moreover, the invention can provide an optical waveguide which can be spaced from, and positioned with respect to, another substrate and is suitable for piling up.

What is claimed is:

1. A method of manufacturing an optical waveguide having a core and a clad, comprising
    forming a first clad by applying a resin on a substrate and curing the resin;
    applying a core material between a recessed mold which has a recess having a shape identical to a shape of the core and the first clad which is provided on the substrate;
    curing the core material applied, thereby forming a core pattern having a shape identical to that of the recess;
    peeling the recessed mold from the core pattern and the first clad; and
    removing a thin core layer from the surface of the first clad after completion of the peeling the recessed mold.

2. The method of manufacturing an optical waveguide, according to claim 1, wherein removing a thin core layer is performed by using an oxygen-plasma process.

3. A method of manufacturing an optical waveguide having a core and a clad, comprising:
    forming a first clad by applying a resin on a substrate and curing the resin;
    applying a core material between a recessed mold which has a recess having a shape identical to a shape of the core and the first clad which is provided on the substrate;
    curing the core material applied, thereby forming a core pattern having a shape identical to that of the recess; and
    peeling the recessed mold from the core pattern and the first clad, wherein:
    the recessed mold has, at the ends of the recess, surfaced inclined at about 45° which are equivalent to inclined mirrors; and
    the core pattern has ends to which the surfaces equivalent to inclined mirrors have been transferred.

4. The method of manufacturing an optical waveguide, according to claim 3, further comprising forming reflecting films on the mirror-equivalent surfaces of the recessed mold before applying a core material,
    wherein peeling the recessed mold includes transferring the reflecting films to the ends of the core pattern.

5. A method of manufacturing an optical waveguide, having a core and a clad, comprising:
    forming a first clad by applying a resin on a substrate and curing the resin;
    applying a core material between a recessed mold which has a recess having a shape identical to a shape of the core and the first clad which is provided on the substrate;
    curing the core material applied, thereby forming a core pattern having a shape identical to that of the recess; and
    peeling the recessed mold from the core pattern and the first clad,
    wherein the recess of the recessed mold is shaped like a spacer and is deeper than the depth of core pattern.

6. A method of manufacturing an optical waveguide having a clad and a core, comprising:
    forming a first clad by applying a resin on a substrate and curing the resin;
    applying a core material between a recessed mold which has a recess having a shape identical to a shape of the core and the first clad which is provided on the substrate;
    curing the core material applied, thereby forming a core pattern having a shape identical to that of the recess;
    peeling the recessed mold from the core pattern and the first clad; and performing a surface treatment on the recessed mold before applying a core material, thereby to make the recessed mold have more affinity for the core material.

7. The method of manufacturing an optical waveguide, according to claim 6, wherein the surface treatment is an oxygen-plasma process.

8. The method of manufacturing an optical waveguide, according to claim 6, wherein the contact angle of the core material to the recessed mold is 45° or less.

9. A method of manufacturing an optical waveguide having a clad and a core, comprising:
    forming a first clad by applying a resin on a substrate and curing the resin;
    applying a core material between a recessed mold which has a recess having a shape identical to a shape of the core and the first clad which is provided on the substrate;
    curing the core material applied, thereby forming a core pattern having a shape identical to that of the recess;
    peeling the recessed mold from the core pattern and the first clad forming a projecting mold by providing a projection shaped like a core pattern, on a substrate; and
    applying a resin to the projecting mold curing the resin and peeling the projected mold from the resin, thereby providing a recessed mold.

10. The method of manufacturing an optical waveguide, according to claim 9, wherein the projection of the projecting mold comprises two straight parts connected together, inclined at right angles to each other, and surfaces equivalent to in-plane mirrors and designed to connect the straight parts optically.

11. The method of manufacturing an optical waveguide, according to claim 10, wherein the surfaces of the projection, which are equivalent to in-plane mirrors, are formed by a laser process.

12. The method of manufacturing an optical waveguide, according to claim 10, wherein the projection has surfaces at ends, which are equivalent to inclined mirrors.

13. The method of manufacturing an optical waveguide, according to claim 12, wherein the surfaces of the projection, which are equivalent to inclined mirrors, are inclined convex surfaces.

14. The method of manufacturing an optical waveguide, according to claim 12, wherein the surfaces of the projection, which are equivalent to inclined mirrors, are formed by a laser process.

15. The method of manufacturing an optical waveguide, according to claim 13, wherein forming a projecting mold further comprises:
    forming a projection made of a resist pattern and shaped like a core pattern, on the substrate by means of photolithography;

forming the inclined convex surface by obliquely applying a laser beam to the ends of the projection and thereby evaporating the ends of the projections in part, said laser beam defining a substantially circular shadow.

16. The method of manufacturing an optical waveguide, according to claim 13, wherein forming a projecting mold further comprises:
   forming a projection made of a resist pattern and shaped like a core pattern, on the substrate by means of photolithography; and
   forming the inclined convex surfaces by obliquely applying a laser beam to the ends of the projection a number of times, each time in a different direction, and thereby evaporating the ends of the projections in part.

17. The method of manufacturing an optical waveguide, according to claim 13, wherein forming a projecting mold further comprises:
   forming a projection made of a resist pattern and shaped like a core pattern, on the substrate by means of photolithography;
   forming inclined surface on the ends of the projection by obliquely applying a laser beam to the ends of the projection and thereby evaporating the ends of the projections in part; and
   forming the inclined convex surfaces by raising a temperature after applying the laser beam, thereby causing the resist to flow.

* * * * *

UNITED STATES PATENT AND TRADEMARK OFFICE
CERTIFICATE OF CORRECTION

| | |
|---|---|
| PATENT NO. | : 7,050,691 B2 |
| APPLICATION NO. | : 10/874292 |
| DATED | : May 23, 2006 |
| INVENTOR(S) | : Mamoru Ishizaki et al. |

It is certified that error appears in the above-identified patent and that said Letters Patent is hereby corrected as shown below:

Col. 33, line 15, after "comprising" insert --:--

Col. 33, line 44, change "surfaced" to --surfaces--

Signed and Sealed this

Third Day of April, 2007

JON W. DUDAS
*Director of the United States Patent and Trademark Office*